United States Patent [19]
Ebert et al.

[11] Patent Number: 5,890,131
[45] Date of Patent: Mar. 30, 1999

[54] PROJECT ORGANIZATION AND OPTIMIZATION TOOL AND METHOD OF USE THEREOF

[75] Inventors: Justin C. Ebert; Scott H. Collins, both of Boulder, Colo.; John P. Arnold, Cuddy; Stephen L. David, Pittsburgh, both of Pa.; Susan D. Dwyer, Lexington, Ky.; Michael D. Mills, Pittsburgh, Pa.; Patricia Shanahan, Oberlin, Ohio

[73] Assignee: SkyMark Corporation, Pittsburgh, Pa.

[21] Appl. No.: 634,961

[22] Filed: Apr. 19, 1996

[51] Int. Cl.[6] ............................................. G06F 17/60
[52] U.S. Cl. ................................ 705/7; 705/8; 705/9
[58] Field of Search ................... 705/7, 8, 9; 364/705.08

[56] References Cited

U.S. PATENT DOCUMENTS 5,530,861  6/1996  Diamant et al. ............................. 705/8

OTHER PUBLICATIONS

Marshall, Patrick. "Meeting Maker XP beefs up back end," InfoWorld, vol. 17, No. 35, pp. 95–6, Aug. 28, 1995.
Lent, Amy Fisher. "Information Sharing: Get Your Group Organized," PC World, vol. 13, No. 4, p. 213, Apr. 1995.
Kawamoto, Wayne. "PIMs That Can Save Your Day," Computer Shopper, vol.15, No. 5, pp. 530–538, May 1995.
Marshall,Tom, et al. "You Can Pick Your Friends: Personal Information Managers," InfoWorld, vol. 17, No. 32, p. 50–59, Aug. 7, 1995.
Cryan, Shelly. "Microsoft Project 4.0: Online Assistance Helps Business Users Over the Hurdles of Project Management," MacUser, vol. 11, No. 10, pp. 52–53, Oct. 1995.
Blackwood, Jonathan. "Power PIM's New Personality," Windows Magazine, vol. 6, No. 10, p. 150, Sep. 1995.

*Primary Examiner*—Tariq R. Hafiz
*Assistant Examiner*—Jason W. Rhodes, Jr.
*Attorney, Agent, or Firm*—Bartony Hare & Edson

[57] ABSTRACT

The present invention provides a project optimization software tool in which a single window in a graphical user interface serves as a tool for planning future actions, reviewing past actions, organizing meetings and launching executable software tools. A project pathway window supports: 1) the listing and viewing of sequences of pathway steps, which, if accomplished, lead towards a defined project goal, 2) the ability to link software tools to those pathway steps, and launch the software tools for execution, 3) the creation of meeting agendas, each of which may encompass several pathway steps, without demoting the included pathway steps, and 4) the marking of the status of pathway steps.

18 Claims, 17 Drawing Sheets

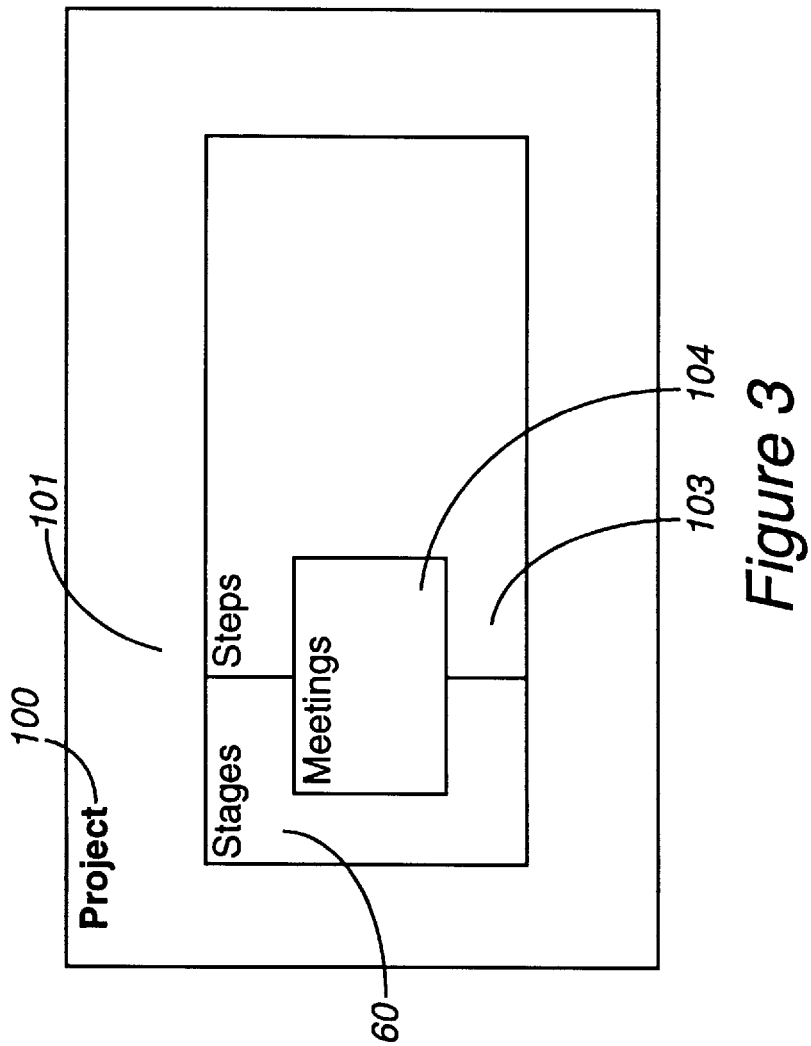

PROJECT ORGANIZATION AND OPTIMIZATION TOOL AND METHOD OF USE THEREOF

FIELD OF THE INVENTION

The present invention relates to a project organization and optimization tool and to a method of use thereof, and, more particularly, to a project organization and optimization tool suitable for enhancing project performance in projects involving the use of a number of distinct software tools and to a method of using such a project organization optimization tool.

BACKGROUND OF THE INVENTION

In the personal computer software market, there have long been four main areas of software development: word processing, spreadsheets, databases, and graphic design/drawing. More recently, there has been a proliferation of offerings in three other areas:

1. groupware, a category of software designed to help people work together, of which Lotus Development Corporation's Notes® package is an example,
2. personal information managers (PIM's), which help people organize their schedules, appointments, lists of things to do, etc., and
3. diagramming tools, such as flowcharting packages.

The expansion of software development activity indicates an ongoing endeavor to harness the power of the computer to help people work more effectively and efficiently, both as individuals and as team members. This endeavor is spurred not only by economic necessity, but by advances in the theory of organization management. Management experts indicate that as much as 50% of the work performed in organizations is unnecessary. Many case studies demonstrate that this waste can be cut dramatically by using modern total quality management (TQM), process reengineering, and strategic planning methods.

These methods typically require the cooperation of several people from various departments within an organization; in many cases a formal team is organized specifically to improve a work process or solve a problem. The work of problem-solving or process improvement generally benefits from a systematic approach, involving a cycle or cycles of diagramming processes, analyzing root causes, seeking creative solutions, choosing promising ideas, testing them, collecting and analyzing data, and instituting the changes that work best.

In many ways, this systematic approach to work improvement is derived from the scientific method described by Francis Bacon, and later by John Dewey. The modern theorists who have had the most influence on this type of work have been W. Edwards Deming and Joseph Juran. Deming and Juran have propounded detailed cycles of systematic effort to improve processes, but organizations have tended to modify their suggestions to suit their own needs, leading to a multiplicity of methods which are in active use in all sectors of the economy.

However, organizations which employ these methodologies encounter a fairly consistent set of constraints or problems, including the following 1. Project teams, formed to conceive and implement process improvements, become overly concerned with the use of the improvement/management tools available to them, and lose sight of long-term objectives.
2. Meeting agendas and minutes, as well as progress reports, create heavy paperwork burdens.
3. Data collected about processes are often incomplete or flawed, and analysis is, therefore, prone to error.
4. Many standard quality improvement tools are very tedious when used manually.

A number of software developers supply software packages designed to reduce or eliminate one or more of these constraints. However, none of these software packages provides thorough utility to overcome the constraints listed above.

As common in all projects requiring the use of several distinct software tools, project organization is lacking. For example, it is very difficult for the project team to keep track of the overall project during its progression. Moreover, organizing work files becomes a daunting task when several or numerous members of a project team must access several software tools.

It is, therefore, very desirable to develop a project organization and optimization tool that provides thorough utility to support quality improvement activities. More generally, it is desirable to develop a project organization and optimization tool for use in projects including one or more process steps involving the use of one or more specific, executable software tools.

SUMMARY OF THE INVENTION

Accordingly, the present invention provides a project organization and optimization method and tool for use in projects comprising process steps utilizing several distinct software tools. As used herein the term "project" refers to any actions designed to accomplish an end result (goal or goals). Such goal(s) may be completely predetermined at the beginning of the project, but may also change as the project continues towards completion. A "project pathway" or "pathway" comprises a sequence of pathway steps to be performed to accomplish the goal(s). Each of the pathway steps corresponds to a specific executable software tool operable to accomplish a defined task. Examples of specific executable software tools include, but are not limited to, (i) word processing software, (ii) database software, (iii) spreadsheet software, (iv) graphic design/drawing software, and (v) flowchart/diagramming software. Such software tools may be integrated into the project organization and optimization tool or may be executable independently of the project organization and optimization tool (for example, third party, independently executable software such as Microsoft® Word® for word processing). In general, the sequence of pathway steps comprises a chronological ordering of tasks or processes required to accomplish the goal(s).

In general, the present invention provides a method of operating a computer to enhance, organize and/or optimize the performance/completion of a project in which a number of software tools are to be used. The computer comprises generally a processing unit in communicative connection with a memory for storing information. The computer further comprises a display for displaying information to a user and input means for input of information by the user. Both the display and the input means are in communicative connection with the processing unit.

The method comprises generally the step of creating a project pathway to be displayed by the display. The project pathway comprises a sequence of pathway items comprising a schedule of project progression. Among the pathway items are included pathway steps. The project pathway preferably comprises a sequence of pathway steps inserted by the user at user determined points in the project pathway (for example, ordered chronologically in terms of scheduling preference). Each pathway step comprises a link (for example, an icon) corresponding to one of a plurality of software tools. Multiple links corresponding to a particular software tool may be inserted within the project pathway. Each link (upon selection thereof) is suitable for initiating execution of the corresponding software tool.

The step of creating the project pathway preferably includes the steps of: (i) selecting via the input means one of the software tools and (ii) inserting the link corresponding to the selected software tool on the project pathway to create a pathway step. A list of software tools available for use is preferably included in a menu or upon a tool bar as such menus and tool bars are known in the art. Each software tool is stored in the memory and is executable by the processing unit upon the user selecting any link corresponding to the software tool displayed on the project pathway.

The method of the present invention also preferably includes the step of storing data input and created during execution of the software tools in the memory. The data input and created during execution of the software tool of each pathway step is associated with the corresponding link of the pathway step such that the data can be reviewed and revised upon selection of the corresponding link.

The method of the present invention preferably further includes the step of creating a meeting. The meeting preferably includes at least one pathway step selected by the user. A graphical representation of the meeting is preferably displayed on the display and indicates any pathway step selected to be included in the meeting. A meeting agenda software tool is preferably associated with each meeting and is executed by selecting a meeting agenda link, displayed on the display and corresponding to the meeting. The meeting agenda software tool includes a list of agenda topics to be addressed in a real-time meeting corresponding to the meeting displayed on the project pathway.

The present invention also provides a project optimization tool for execution on a computer as described above. The present project optimization tool comprises generally means for creating a project pathway as described above via the input means. The present project optimization tool also comprises means for associating the software tool corresponding to each link to that link such that execution of the software tool corresponding to the link is initiated by selection the link.

The present invention is preferably designed for real time use in meetings. The meeting agenda tool preferably interacts smoothly with the other software tools. Preferably, the meeting tool comprises means for scheduling and managing meetings, each of which meetings may include one or more pathway steps. The meeting tool also preferably comprises means to create and provide display and provide access to a meeting agenda associated with each meeting.

As common with many software tools designed to operate within a graphical user interface, software tools incorporated within or communicating with the present invention preferably readily exchange data, enabling copying and pasting (or "drag and drop" editing) of data between tools. Project files created under the present invention may be stored upon a file server for data sharing and remote cooperation.

The present invention provides a significant advance over the prior art, allowing individuals and groups engaged in a project involving the use of several computer-based tools to improve quality and/or productivity by planning and executing the projects processes (pathway steps) with: (1) a reduced risk of being sidetracked, (2) reduced paperwork, (3) an accessible group record of project advancement and completion and (4) rapid access to computer-based tools required to complete the project.

Scheduling and record-keeping are greatly improved by the present invention. Instead of covering meeting room walls with flipchart paper, or spending numerous man-hours organizing results obtained using a variety of software tools, the present invention organizes such results as the project team completes them. Individual process steps are easily ordered and reordered, while keeping in view the overall scheduling and performance of the entire project.

The present project organization and optimization tool can be used, for example, in: process improvement, strategic planning, negotiation, product design and development, quality function deployment, work assignments, and control of routine tasks (for example, accounting and engineering/architecture). In general, the present invention is useful in any situation where it is beneficial to list the pathway steps in any process, to associate software tools with each pathway step, to attach launch buttons for each pathway step, and to record events in each pathway step, all preferably in a single window.

BRIEF DESCRIPTION OF THE DRAWINGS

FIG. 3 is a Venn Diagram which describes a conceptual model underlying one embodiment of the present invention.

DETAILED DESCRIPTION OF THE INVENTION

Although the present invention is suitable for use with any number of software tools for completing essentially any type of project, a number of details of the present invention will be discussed in connection with an embodiment thereof for use with a number of software tools designed to effect total quality management techniques.

Figure 1:
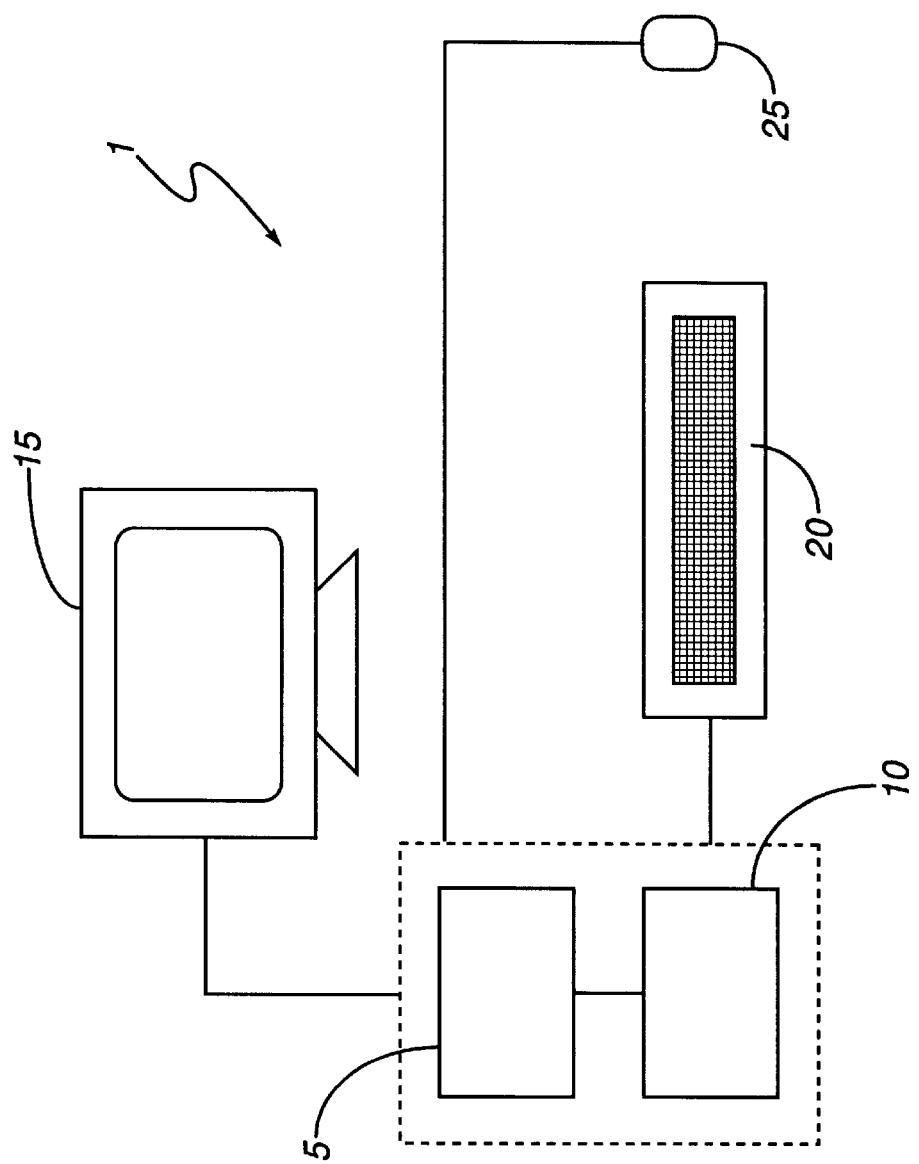
FIG. 1 is a schematic illustration of a digital computer for use with the present invention.

Preferably, the present project organization and optimization tool comprises a method and tool executable on a digital computer (for example, an IBM® compatible personal computer). As illustrated in FIG. 1, such a digital computer 1 generally comprises at least one processing unit 5 in communicative connection with one or more memory units 10 for storing information or data. Digital computer 1 also generally comprises a display 15 such as a CRT for displaying information to an operator and one or more means for input of data, such as a keyboard 20 and/or a mouse 25.

Figure 2A:
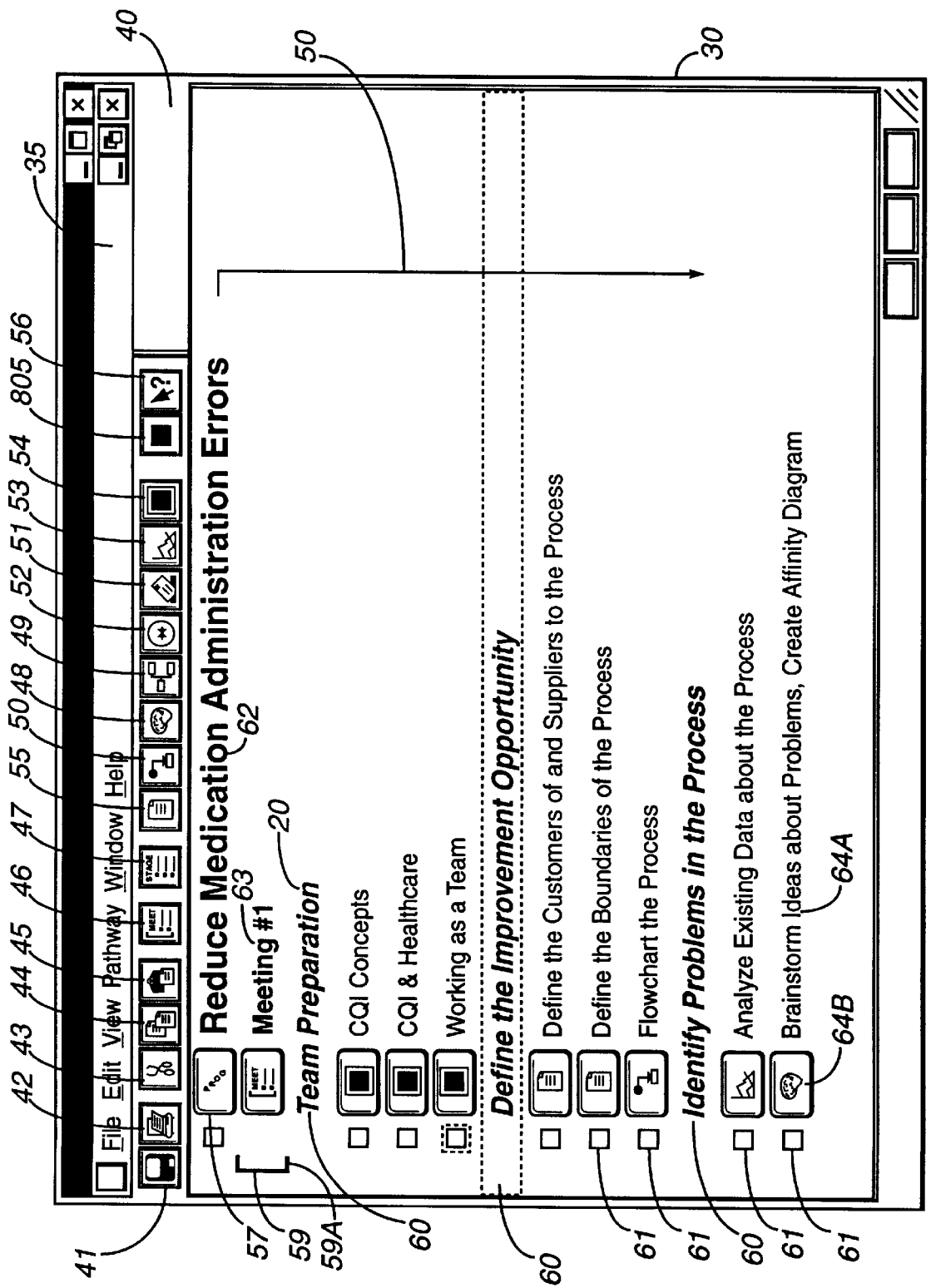
FIG. 2A is a screen capture illustrating an embodiment of a project pathway window under the present invention.

As depicted in FIG. 2A, a preferred embodiment of the present invention comprises a project pathway window 30 operating as a computer software graphical user interface (GUI) such as that designed to operate under the Microsoft® Windows® interface. Project pathway window 30 exhibits many of the standard features common to Windows applications. Such features will not be described in detail as they are well documented and widely understood in the art. For example, such features are described in detail in Windows 3.1 or Windows 95 developer's manuals. *Programming the Windows 95 User Interface* by Nancy Cluts and *Programming Windows* 3.1 by Charles Petzold are examples of such developers manuals. Windows standards and user interface specifications are also set forth in *The Windows Interface*, ISBN 1-55615-439-9, available from Microsoft Press. Moreover, Windows standards, specifications and utilities are described in Microsoft Developers Network CD-ROMs, available from Microsoft Corporation.

Project pathway window 30 preferably includes a menu bar 35 as typically associated with a standard GUI such as Windows or Windows 95. Project pathway window 30 also preferably provides the user or operator with control buttons located on a toolbar 40 typically associated with a standard GUI such as Windows 3.1 or Windows 95. As illustrated in FIG. 2A, tool bar 40 preferably, includes, for example: (i) a save button 41 for saving user-created software files to memory means 10 such as to disk storage, (ii) a print button 42 for printing selected items, (iii) a cut button 43 for cutting selected items from the current window, and placing them on a software "clipboard," (iv) a copy button 44 for copying selected items to the software clipboard, leaving the copied item in place, (v) a paste button 45 for pasting an item from the clipboard to a place selected by the user, and (vi) a help button 56 for launching or initiating execution of a context-sensitive help application.

The embodiment illustrated in FIGS. 2A through 2D also preferably includes control buttons 46–55 which, while their specific functions are unique to the present invention, nonetheless have a base set of characteristics in common with other control buttons typical to their GUI. In that regard, each of control buttons 46–55 may be activated by selecting the desired control button with an input or selection device such as mouse 25. When activated, each of control buttons 46–55 causes a change of state within the computer software which remains in effect until some additional user action de-activates that state.

The interior of window 30 in FIGS. 2A through 2D preferably contains a project pathway 50. Project pathway 50 may include, for example, items or components of the types represented by components 57–65. These components will be described in detail below.

Before discussing these various components in detail, however, a preferred structure of project pathway 50 will be discussed with reference to FIG. 3. In that regard, FIG. 3 illustrates a preferred organizational structure of several preferred elements of the present project optimization tool.

In general, the present organization and optimization tool presupposes the existence of a project 100 comprising a series of tasks to be performed to achieve a desired result or goal. For each project 100, a project pathway 101 is created using the present organization and optimization tool. Project pathway 101 is an algorithm or methodology for organizing and improving processes, solving problems, planning strategy, or in some way accomplishing work. Project pathway 101 preferably includes all the tasks/work to be completed from the inception of project 100 to its completion. Preferably, standard project pathway templates are provided for use as is or for modification. However, not all projects 100 must follow similar project pathways 101. Thus, project pathway templates need not be used, and if used, may be readily modified as the user(s) feel appropriate to accommodate their circumstances. User-customized project pathways may be saved as templates for future use.

Project pathway 101 preferably comprises stages 60 and pathway steps 103. Typically, stages 60 are used to group pathway steps 103, and are somewhat analogous to headings in an outline or to comments in computer code. Stages 60 thus function to allow the user to keep a hierarchical perspective of overall progress along project pathway 101. A hierarchy of stages 60 (for example, similar to the hierarchy of heading is an outline) may also be easily created. Stages 60 need not contain pathway steps 103, however, and are not required in a project pathway.

In many projects, much of the work is done by groups or teams, often requiring a series of team meetings. Preferably, the present optimization tool comprises means for organizing groups of pathway steps 103 and/or stages 60 into meetings. Meetings 104 are preferably incorporated into project pathway 101 and can include one or more pathway steps 103 and/or stages 60. Preferably, display of meetings 104 does not, however, supersede display of pathway steps 103 or stages 60 comprising a meeting. In that regard, the pathway is preferably essentially "flat." All pathway items preferably appear in the display, with nothing hidden or contained in something else.

As clear to one skilled in the art, however, various portions (for example, stages) of pathway 101 may be "collapsible" to "hide" the items grouped thereunder until "expanded" by the user(s). In collapsing a portion of pathway 101, the user first selects a portion of pathway 101 to be collapsed (for example, a stage or a group of stages). As known in the art, by selecting a provided control button (not shown) such as a minus sign, the user is enabled to collapse the selected portion of pathway 101. The view of pathway 101 is then preferably automatically edited to eliminated the shapes, icons, text etc. associated with the collapsed portion of pathway 101. A new view of pathway 101 is preferably generated that includes a symbol representing the collapsed portion of pathway 101. The user is preferably provided with a text area or box in which the user may input text to identify the collapsed portion. A control button such as a plus sign is preferably provided to enable the collapsed portion to be "expanded" to its original state. Upon selection of the expansion control button associated with a particular collapsed portion, the pathway view is preferably automatically edited to redisplay the shapes, icons, text etc. originally depicted in that portion of pathway 101.

With reference to FIG. 2A, project pathway 50 includes pathway components 57–65. Control buttons 46–55 are preferably used to create project pathway components 57–65 as described below.

Project Information

Project pathway 50 preferably includes, as its first component or item, a project information form tool, which is opened by selecting the project information form tool launch button 57. The user may complete this form, wherein the user may assign a name to the project, list people involved in the project, and/or record other information relevant to the project. Other software tools associated with the present invention may reference and use such information. Preferably, a brief project description is entered into a description area 62.

Stages

Selection of stage creation button 47 initiates creation of a stage 60 in project pathway 50. Drag and drop technology may be employed so that new stage 60, indicated by a draggable symbol or icon, may be placed at a desired point in pathway 50 (for example, as determined by a pointing device such as mouse 25). Alternatively, selection of stage creation button 47 may result in insertion of a stage 60 at a previously chosen position (for example, subsequent to a pathway step 103 selected/highlighted via mouse 25) within pathway 50. As discussed above, stages 60 are essentially descriptive and preferably comprise an editable text area 20. Although not required, stages 60 are useful to summarize the information of the pathway steps grouped under stages 60, thereby providing an overall view or summary of collective parts of the project. Three stages 60 are illustrated in FIGS. 2A through 2D. Stages 60 in FIGS. 2A through 2D are described by text areas 20 as follows: (i) "Team Preparation"; (ii) "Define the Improvement Opportunity"; and (iii) "Identify Problems in the Process". The Define the Improvement Opportunity stage is shown to be selected or highlighted in FIG. 2A.

Steps

Pathway steps 103 are the operative building blocks of project pathway 50. Each pathway step 103 preferably comprises three components: a) an editable text area 64A in which a brief description of the task to be performed can be entered (for example, using keyboard 20), b) a tool-launch/link button or symbol 64B, preferably comprising a descriptive tool symbol or icon, and c) a status indication area 61 which indicates, for example, whether the corresponding pathway step 103 is completed. Status indication area 61 may, for example, be a two-state check-box indicating whether a pathway step 103 is completed or uncompleted. In FIG. 2C, for example, the three pathway steps under the "Team Preparation" stage are indicated by an "x" to be completed. As clear to one skilled in the art, however, numerous other methods of indicating the status of pathway steps 103 are possible. For example, a percentage of completion may be set forth in status indication area 61. Additionally, projected and actual beginning dates and completion dates may be entered to allow construction and display of Gantt charts as known in the art.

Pathway steps 103 are preferably created using pathway step creation buttons 48–54. As with stages 60, a desired pathway step 103 may be created by selecting the corresponding pathway step creation button. As with stages, well-known drag and drop methods may be used to place a pathway step 103 at a desired point in pathway 50. Likewise, selection of the appropriate pathway step creation button can result in creation of a corresponding pathway step 103 at a previously selected position within pathway 50 as described above in connection with stage creation button 47.

In FIGS. 2A through 2D, pathway step creation buttons 48–54 represent well known types of software tools used in total quality management techniques, including: a brainstorm/affinity pathway step creation button 48, a cause-and-effect diagram pathway step creation button 49, a flow-chart pathway step creation button 50, a consensus builder pathway step creation button 51, a force field analysis pathway step creation button 52, a data analyst pathway step creation button 53, a slide show pathway step creation button 54, and a form pathway step creation button 55. A user could, for example, select flowchart pathway step creation button 50 resulting in incorporation of the corresponding symbol or icon into pathway 50 at a desired point, thereby creating a new pathway step 103 with standard pathway step components elements 61, 64, and 65. A single software tool may be associated with numerous pathway steps 103 within pathway 50, each such pathway step 103 preferably being associated with unique data.

The software tools available in creating pathway steps 103 of the present invention may be integrally included within the code of the present project optimization and organization tool upon compilation thereof. All data entered in creating pathway 50 and all data entered into and created by the software tools integrally included within the code of the present tool (and associated with pathway steps 103 of pathway 50) are preferably stored in a single file.

One or more of software tools (for example, third party software tools such as Microsoft Excel® or Microsoft Access®), which are executable separately and independently from the present tool may also be incorporated as pathway steps 103 in the present invention. The incorporation of such software tools can be accomplished via a number of methods. Two such methods allow the user to launch such a software tool much like the method via which the Microsoft Windows File Manager (or its equivalent) launches programs (that is, by making use of a file extension association database). In that regard, within Microsoft Windows there is a database that stores associations between executable files (that is, software tools) and ".xxx" file name extensions. For example, files with a ".TXT" extension are typically associated with Notepad, files with a ".DOC" extension are associated with Microsoft Word, etc.

In the present invention, a special pathway item may be created (via, for example, a user-created button on toolbar 40 or via the pathway menu) which represents or denotes a separately compiled and separately executable software tool. The creation of such buttons or icons is well known in the art. Once the pathway item is created via selection of the button, a file choice dialog box (as familiar in the art) is preferably displayed, allowing the user to specify the name and location of the file to be called by the pathway step launch button associated with the software tool.

Selecting the launch button causes the present project organization and optimization tool to 1) read the specified file name and extension, 2) look up the extension in the file association database in Windows and read the associated application's main executable file, 3) run the executable file (that is, the software tool), and 4) read in the data of the specified file. The application launches outside the present tool in a new window. Likewise, the specified file opened exists outside of the present tool. If a data file or executable software tool file referenced by the present tool is deleted or moved, attempting to launch the filename preferably results in an error message indicating that the specified data file or software tool could not be found.

A second method is similar to that described above. Instead of adding a pathway step from menu bar 35 or toolbar 40 of the present tool, the user can drag a file from the Windows File Manager or its equivalent and drop it at a desired position in pathway window 30. Alternatively, the user could use the Edit >> Copy function in File Manager and an Edit >> Paste function in the present tool. Otherwise, the second method functions as described above for the first method.

A third method makes use of Object Linking and Embedding (OLE) technology. A detailed discussion of OLE is provided in Chapter 11 of Microsoft Corporation's *Windows Interface Guidelines for Software Design*. Under this method, the present tool is a container OLE document in which other OLE compliant formats may be included and edited within the confines of the present tool. Such functionality is preferably provided throughout the present tool. Within pathway 50, for example, the user may use a menu item (such as "Pathway >> Add Object") to call a standard Windows Insert Object dialog box and specify the insertion of a Microsoft Word document onto pathway 50. (See, for example, FIG. 2D.) If the user selects the launch button associated with this Microsoft Word document, a new window is displayed within the present tool, allowing the user to edit text exactly as would be possible within the Microsoft Word application itself. The data entered is preferably stored in the project file of the present tool, which (as described above) may include data from software tools integral to the code of the present tool.

In general, each project pathway step 103 preferably has a corresponding object in memory that stores information about that pathway step. The object can exist in RAM or on a storage device such as a hard drive. The object preferably contains all the information needed to recreate pathway step 103. This information includes the name of pathway step 103, its completion state, and the type of software tool it is. When the user presses a tool launch button corresponding to pathway step 103, the present tool reads the software tool type and brings up the view which is associated with that software tool type. That view then reads in the data (if any) that has been associated with that tool and displays the data in the active window. The data associated with the software tool of a particular pathway step comprises that data entered and/or created in executing the software tool to accomplish the task corresponding to the pathway step. For example, flowchart pathway steps launch a flowchart view, which reads in specific data items such as circles, squares, connections, colors etc. used in flowcharting.

Meetings

In addition to the creation of pathway stages 60 and pathway steps 103, the present project organization and optimization tool preferably includes means for creating meetings comprising, for example, meeting creation button 46. Meeting creation button 46 may be used to initiate the creation of a meeting agenda as described below in connection with FIGS. 4A through 4C. As described above for stages 60 and pathway steps 103, in one embodiment the user may move the cursor into pathway window 30 to select a beginning point (for example, directly above a certain stage 60 or a certain pathway step 103) for the meeting at any point in project pathway 50. Upon selection of meeting creation button 46, a meeting beginning point is inserted at that point. Subsequent to selecting the beginning point of the meeting the user is preferably provided with means to select an ending point for the meeting. The beginning point and the ending point of the meeting encompass pathway stages 60 and pathway steps 103 to be performed and/or discussed in the meeting.

Preferably, a graphical representation of a meeting is indicated on pathway 50 by, for example, a meeting inclusion bar or bracket 59. Preferably, the extent or agenda of a meeting can be defined by selecting and dragging a lower end 59A of meeting inclusion bar 59 to encompass pathway stages 60 and pathway steps 103 to be included in the meeting. When lower end 59A of meeting bar 59 is released, all pathway steps above lower end 59A of the meeting bar 59 but below the meeting agenda pathway step are preferably automatically included in the meeting agenda. A pathway step 103 may also be included in a meeting by inserting such pathway step 103 into an existing meeting by inserting (or, for example, cutting and pasting) such pathway step 103 after the first item in the meeting (the meeting agenda item) and before the last item in the meeting. Once again, such pathway step 103 is preferably automatically included in the meeting agenda.

Figure 2B:
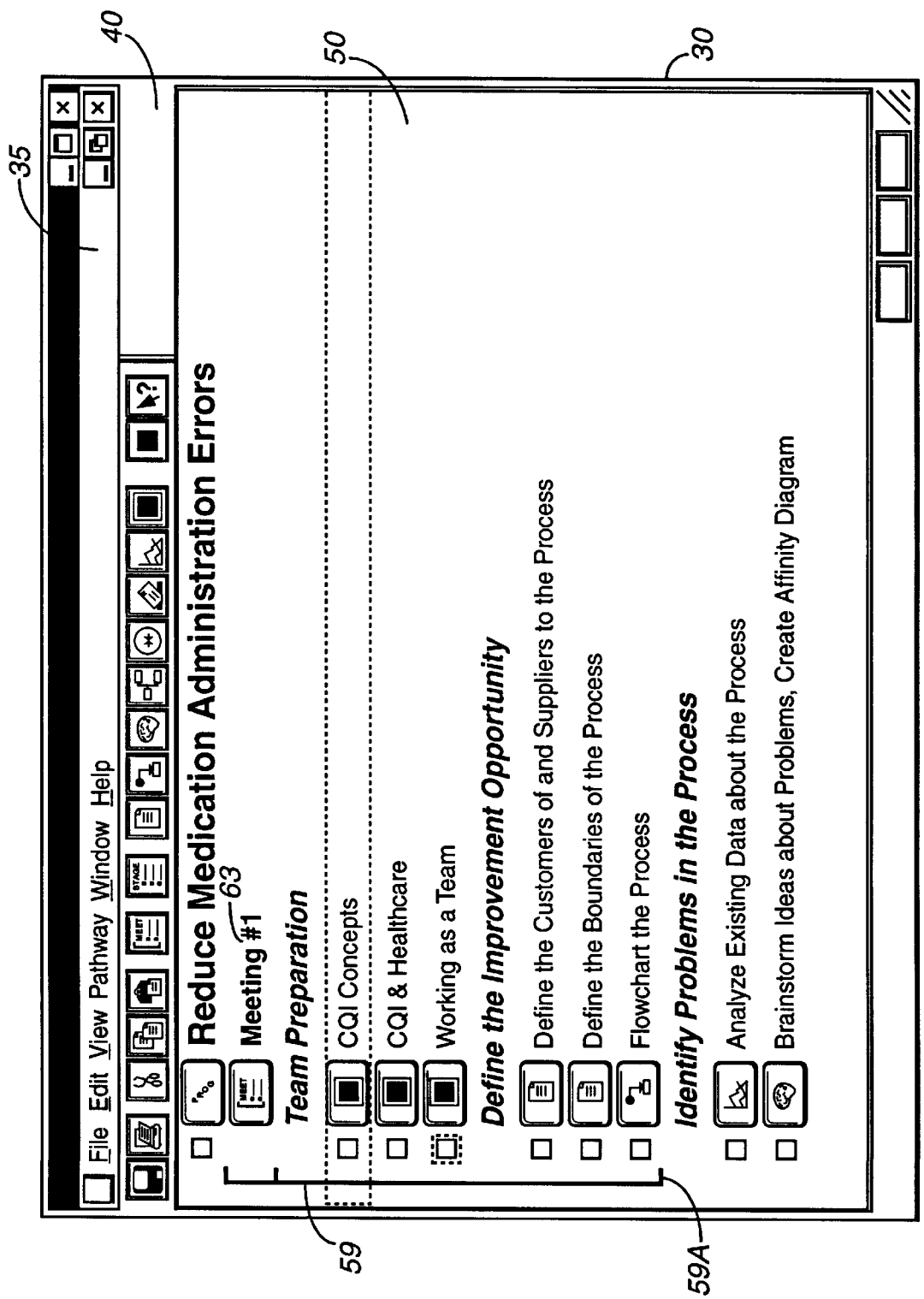
FIG. 2B is a screen capture illustrating the embodiment of FIG. 2A in which the project pathway has been edited to include a number of stages and pathway steps within the agenda of Meeting #1.
Figure 2C:
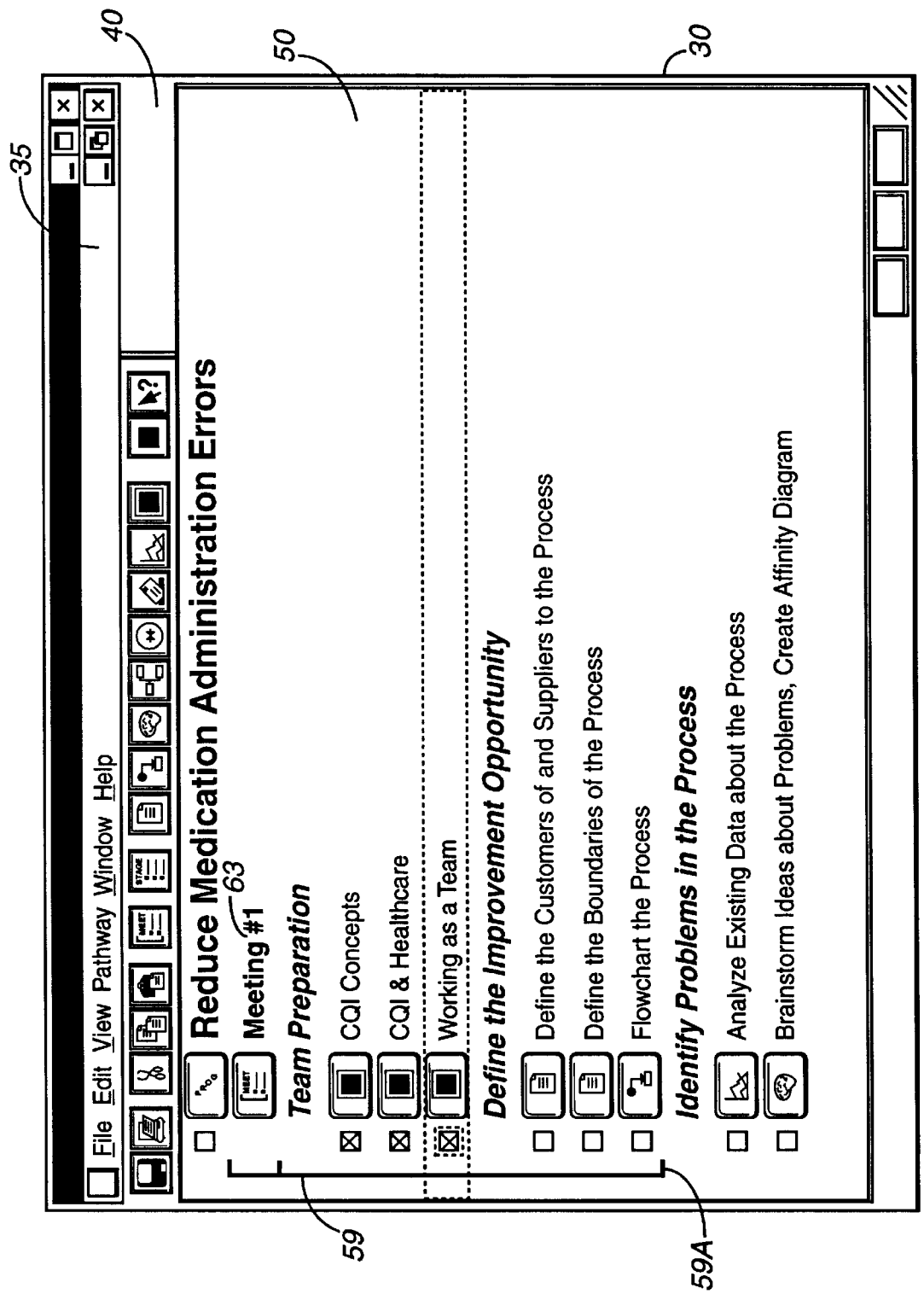
FIG. 2C is a screen capture illustrating editing of the project pathway of FIG. 2B in which a pathway step described by the text "Flowchart the Process" has been moved to a later stage of the process.
Figure 2D:
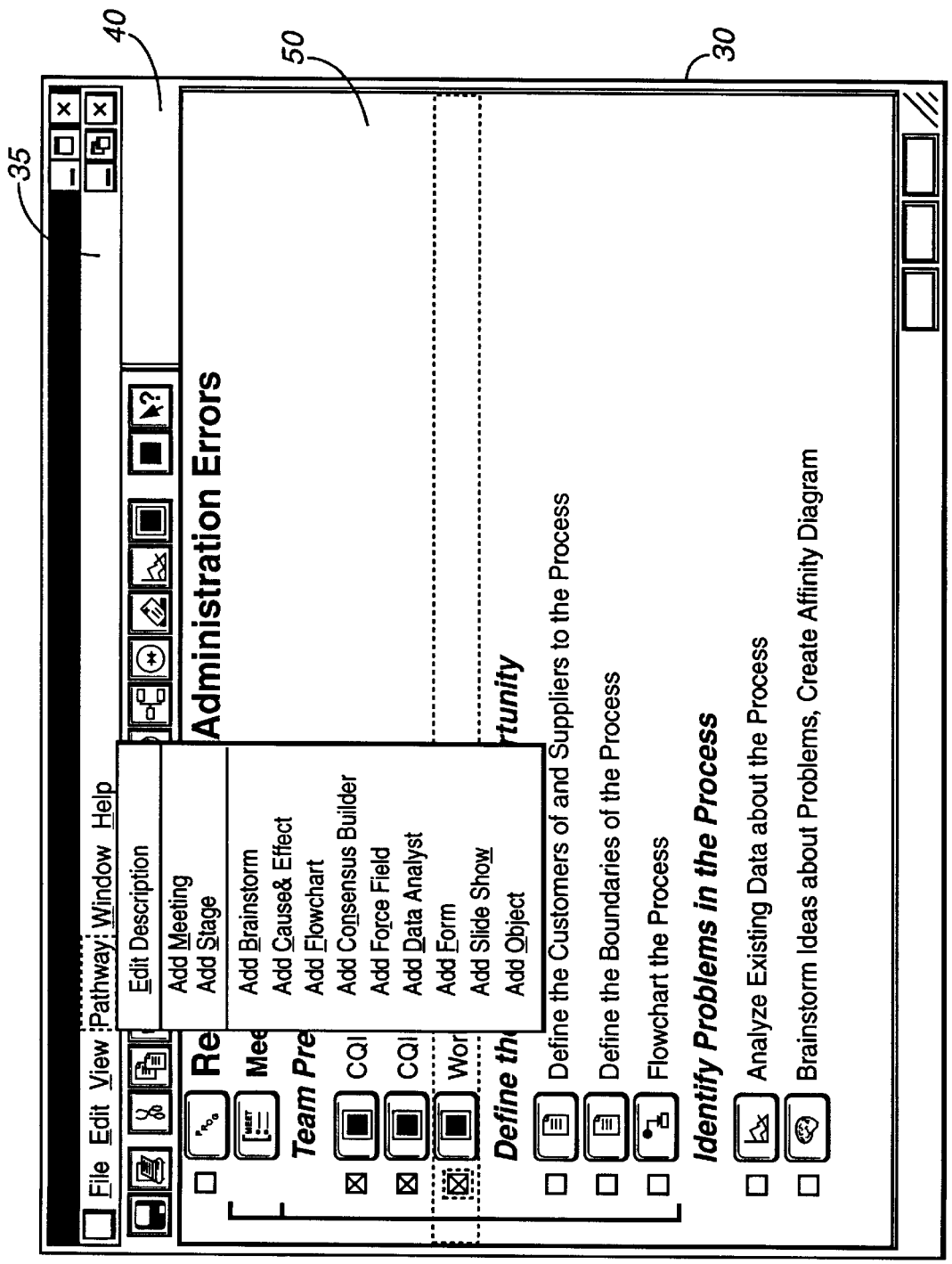
FIG. 2D is a screen capture illustrating the project pathway window of FIG. 2C in which the <Pathway> menu item has been selected.
Figure 4A:
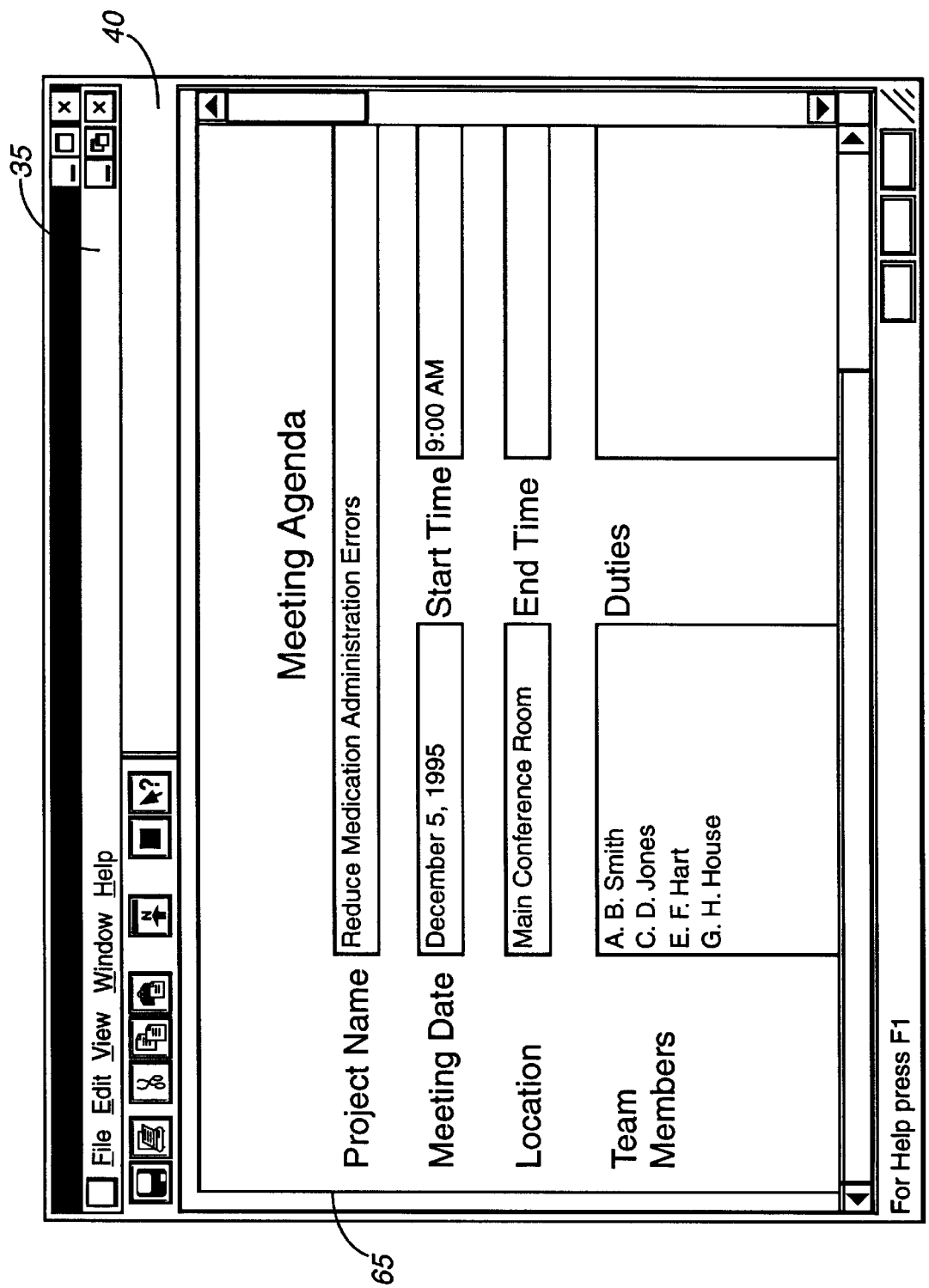
FIG. 4A is a portion of screen capture illustrating an embodiment of a meeting agenda display created by a meeting tool under the present invention.
Figure 4B:
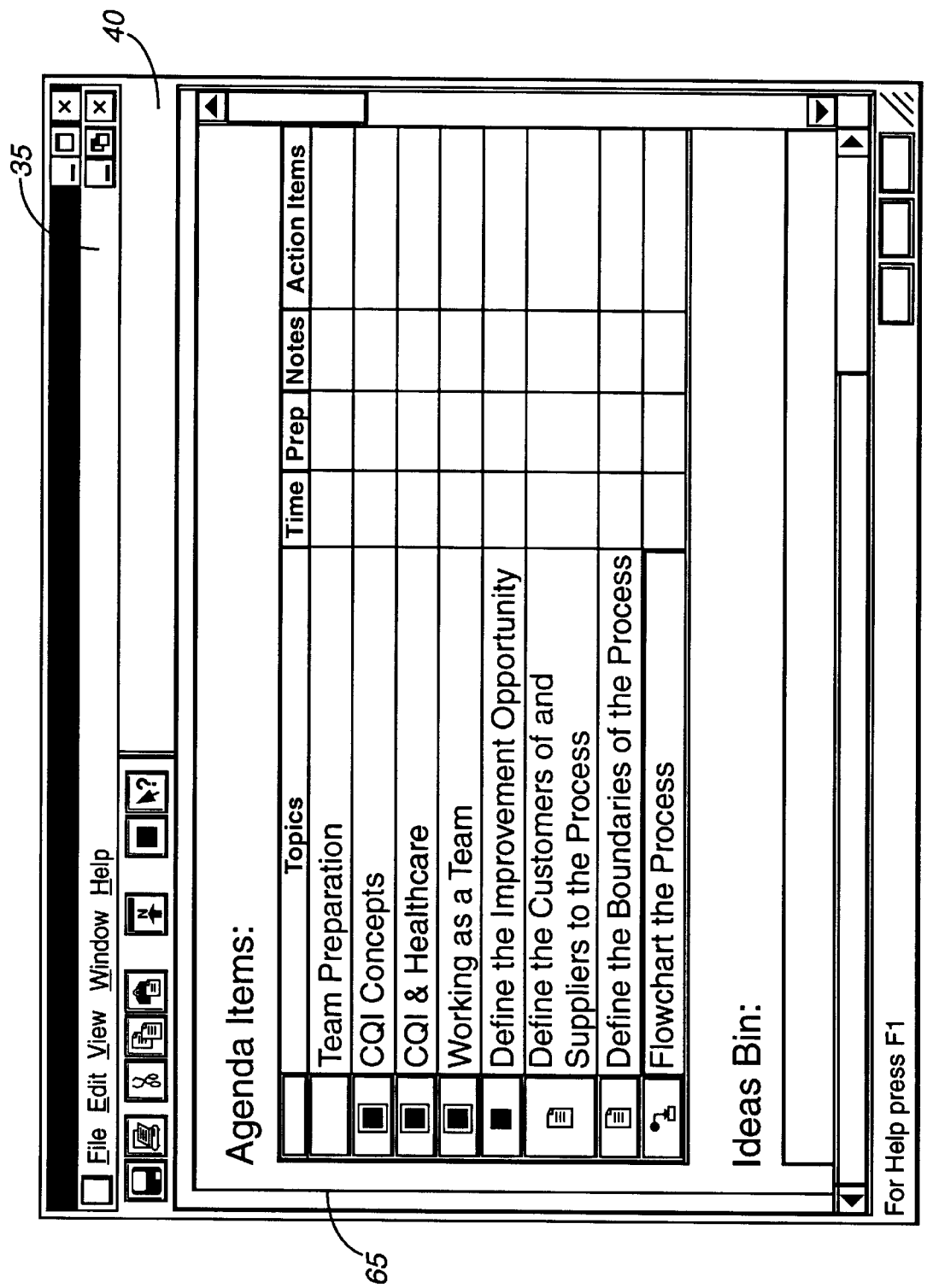
FIG. 4B is another portion of the meeting agenda display of FIG. 4A illustrating the meeting agenda topics automatically created by positioning of the meeting inclusion bar as illustrated in FIG. 2B.

Comparing FIGS. 2A and 2B, for example, lower end 59A of meeting inclusion bar 59 has been extended in FIG. 2B such that Meeting #1 includes stages 60 described by the text "Team Preparation" and "Define the Improvement Opportunity", respectively. A meeting agenda 65 associated with the Meeting #1 is illustrated in FIGS. 4A and 4B. FIG. 4B illustrates the automatic inclusion of stages 60 and pathway steps 103 encompassed within meeting inclusion bar 59 as agenda topics. As illustrated, meeting agenda 65 preferably allows the user to fill in details such as time, location, attendees, leaders and non-pathway items. Some of such information can be taken automatically from other resources of the present tools, such as from the project information tool.

Meeting agenda 65 corresponding to a particular meeting may preferably be opened at any time via selecting agenda launch button 58 associated with that meeting. Preferably, each meeting may also be described in an editable text area 63 as illustrated in FIGS. 2A through 2D. As with other software tools, editable text area 63 is preferably positioned beside agenda launch button 58. When meetings are held, attendees may preferably use project pathway 50 in concert with meeting agenda 65 to launch tools corresponding to pathway steps 103 which are included in the meeting. Discussion points, decisions, and action items may be recorded. Meeting agenda 65 may thus become the minutes of the meeting. These minutes may be reviewed at any time by activating meeting agenda launch button 58 associated with a given meeting. Project pathway 50 may preferably contain an unlimited number of different meeting agendas 65, each comprising distinct data associated with its corresponding meeting agenda launch button 58 and meeting inclusion bar 59.

In addition to storing information required to recreate a pathway step 103, each pathway step 103 also preferably stores data regarding its inclusion (if any) in a meeting. If a particular pathway step 103 is included in a meeting, that pathway step occupies a row in meeting agenda 65, functioning essentially as a record in a meeting database. In the embodiment illustrated in FIGS. 4A through 4C, each pathway step 103 references data for the following fields: topic, time allotted, preparation required, notes, and action items. Table 1 sets forth a brief summary of data preferably included in memory regarding a flowchart software tool.

TABLE 1

| Flowchart Information | Meeting Agenda Information |
| --- | --- |
| Circles | Topic |
| Squares | Time |
| Diamonds | Preparation Required |
| Connections | Notes |
| — | Action Items |

Figure 4C:
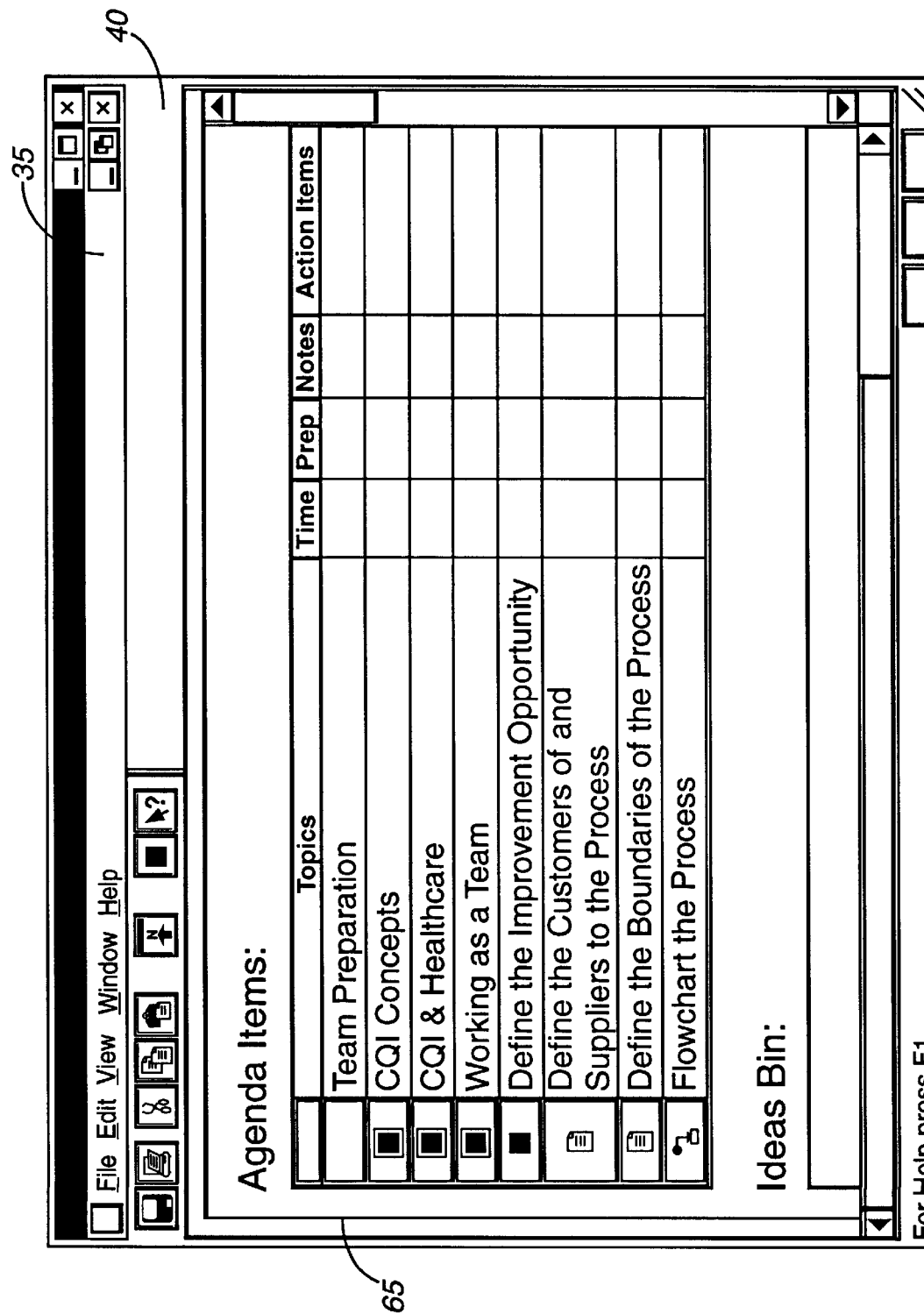
FIG. 4C illustrates the automatic changes in the meeting agenda topics arising after editing of the project pathway as illustrated in FIG. 2C.

When a pathway step 103 is added to a meeting, the meeting item references that pathway step's agenda information (if any). This reference/association allows the pathway step's agenda information to be modified in the agenda form. Then, if that pathway step is moved or copied, the agenda information remains intact. When the meeting item is displayed, it takes the agenda information from each included pathway step and displays this information on the meeting agenda form. Comparing FIGS. 2B and 2C, the pathway step corresponding to "Flowchart the Process" has been cut from the Define the Improvement Opportunity stage and pasted into the Identify Problems in the Process stage (that is, removed from the scope of Meeting #1). As illustrated in FIG. 4C, meeting agenda 65 associated with Meeting #1 is preferably automatically edited to remove the cut pathway step from the agenda topics. Preferably, however, any agenda information that had been entered in meeting agenda 65 regarding the cut pathway step would be stored in association with that pathway step and automatically appear in any meeting into which that pathway step was inserted.

Document/View Architecture

In one embodiment, the present invention incorporates the document/view architecture set forth in Microsoft Foundation Class (MFC) 4.0. Visual C++ and MFC 4.0 standards, specifications and utilities are described, for example, in Microsoft Visual C++ Version 4.0 on CD-ROM, the disclosure of which is incorporated herein by reference. Under this architecture, the document stores the information about the project and the view displays this information. The main part of document class of the present invention (designated, for example as CPathMakerDoc) is an array of software tools. These software tools are derived from the base class (designated, for example, as CPathwayItem). CPathwayItem contains information needed by all meetings, steps, and stages. Table 2 describes this information.

TABLE 2

| CString m_sDescription | The tool's description |
| --- | --- |
| MeetingStatus m_MeetingStatus | An enumerated type that specifies if the tool is part of meeting. It can have one of the following values: |
| MeetingNone | The tool is not in a meeting |
| MeetingOnly | The Meeting Tool is the only tool in the meeting |
| MeetingStart | The Meeting Tool is the start of the tool, the next item(s) in the list are also in the meeting |
| MeetingMiddle | The Tool is a tool in the middle of a meeting |

TABLE 2-continued

| MeetingEnd | The Tool is the last tool in the meeting |
| --- | --- |
| BOOL m_Complete | True if the tool's completion checkbox is checked |
| ToolType m_ToolType | Describes the type of tool. It can have one of the following values: |
| ProjectLine | Project Information Tool-Top line in the Pathway. |
| MeetingLine | Meeting Agenda Tool |
| StageLine | Stage Line |
| ToolLine | Step Line |

The project pathway view class (designated, for example CPathwayView) uses the array of CPathwayItems to display the pathway window. All other views have their own view classes, for example, CBrainView for a brainstorm tool and CCauseView for a cause & effect diagram tool. Each of these views are derived from CShapeView which is derived from MFC's CScrollView. All CShapeViews contain a pointer to the CPathwayItem which it is displaying. For example, the CPathwayItem for CBrainView's points to a CBrianTool. CBrainTool is derived from CPathwayItem but it also contains information needed to represent the brainstorm Tool.

The meeting tool (designated, for example CMeetingTool) determines what items belong to it by first locating itself in the array of CPathwayItems. If its m_MeetingStatus is equal to MeetingOnly, it determines that there are no items in the meeting. Otherwise the meeting tool looks at each of the following items in the array, adding them to the meeting tool until the array item's m_MeetingStatus is equal to MeetingEnd.

When the user selects/presses a tool link or activation button in the project pathway, the CPathwayView determines the CPathwayItem that corresponds to the button pressed. It then looks at all open views comparing this CPathwayItem to the CPathwayItem stored in each view. If they are equal, the view is brought to the top, otherwise, the view for the tool selected is opened and displayed.

The present tool thereby provides a single window interface in which the user(s) can construct a chronological pathway, track progress toward stated goals, launch software tools necessary to achieve such goals, launch instructional slide shows, fill in forms, prepare meeting agendas, and prepare reports of project highlights. The source code for operation of an embodiment of the present project organization and optimization tool is set forth in the Appendix hereto.

A number of software tools preferably included in a TQM tool under the present invention are described below.

TQM SOFTWARE TOOLS

The present inventors have determined that to provide thorough utility, a project optimization tool which purports to support quality improvement activities preferably provides one or more of the following:

1. "Just-in-time training" on demand, in major areas of TQM methods;
2. Integration of the common creative and analytical process improvement tools;
3. A means (that is, a software tool) for rapid data collection and analysis suitable for use by non-statisticians; and
4. Support for project scheduling, planning, and organizing, including support therein for meeting scheduling/planning.

A brief description of software tools preferably included in one embodiment of the present invention is set forth below.

Brainstorm/Affinity Diagram Tool

Figure 5A:
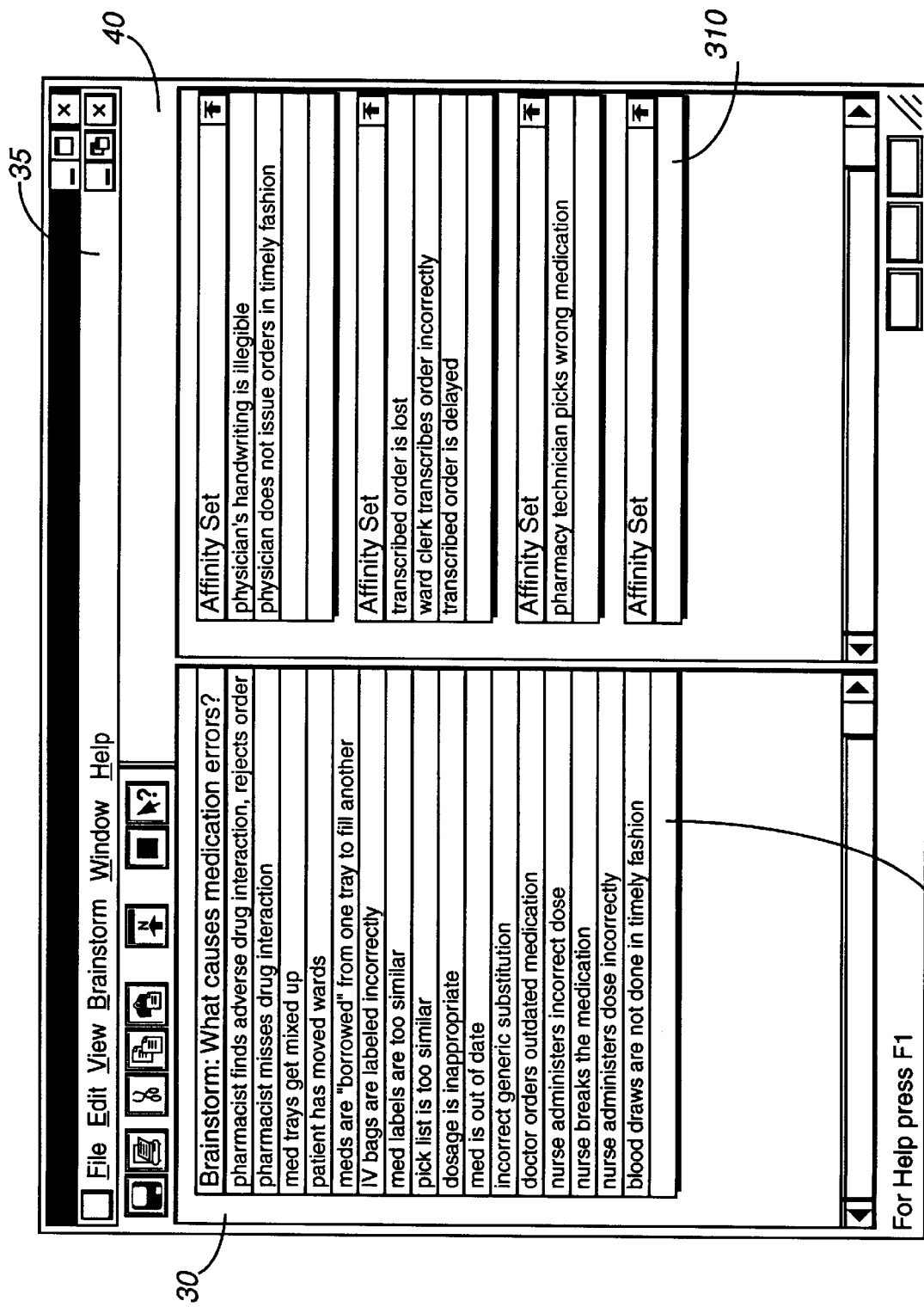
FIG. 5A is an illustration of a display associated with an embodiment of a brainstorm/affinity diagram tool under the present invention.

With reference to FIG. 5A, and as known in the art, a brainstorm/affinity tool combines two important creative processes in a split window 300. A brainstorm portion 305 permits easy recording of creative ideas that answer a central question. It is designed to allow the team recorder to keep pace with group thinking. Using, for example, a "drag and drop" technique, ideas can then be sorted into groups in an affinity diagram 310. Like the brainstorm, affinity groups preferably grow to accommodate any number of ideas. All ideas are preferably fully editable, as are the central question and affinity set headers. Data from the brainstorm/affinity tool preferably may be used to start a cause & effect diagram or for voting in a consensus builder as described below.

Cause & Effect Diagram

Figure 5B:
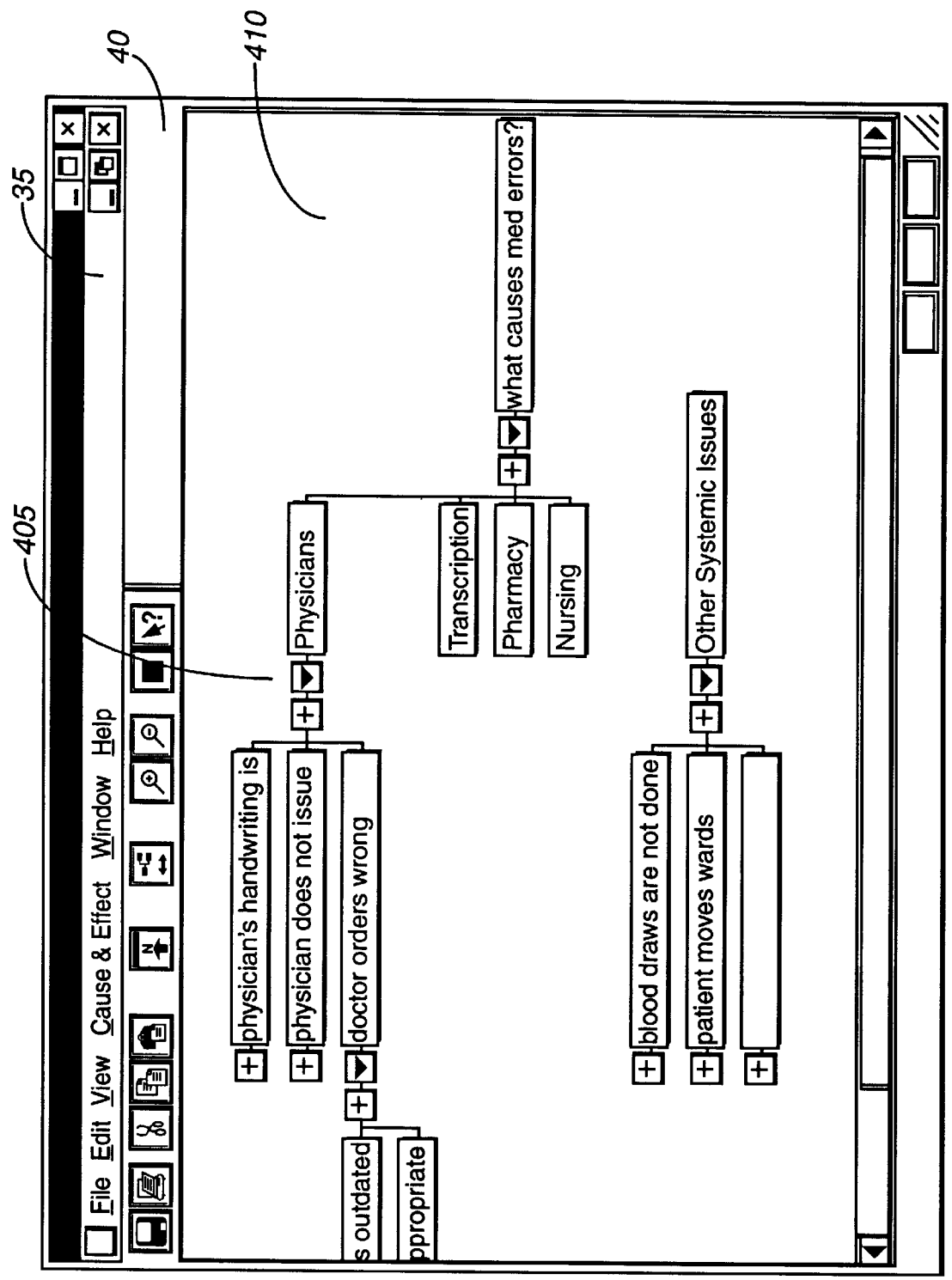
FIG. 5B is an illustration of a display associated with an embodiment of a cause & effect diagram tool under the present invention.

A cause & effect diagram tool captures the simple power of the cause & effect or Ishikawa diagram. The traditional fishbone shape is preferably replaced by a right-angled structure as illustrated in FIG. 5B. The right-angled structure is generally easier to construct, read, and use. Zooming in and out (accomplished as known in the art) permits viewing either the "forest or the trees," and branches can preferably be collapsed and expanded, for example, using control button 405. A diagram 410 may preferably be built from scratch or from data copied from a brainstorm or affinity diagram (by, for example, cutting and pasting). The tree can flow from left to right or in the reverse direction. This tool can also be used as a tree diagram, a contingency planner, a classifier, and an organization chart maker.

Force Field Diagram

Figure 5C:
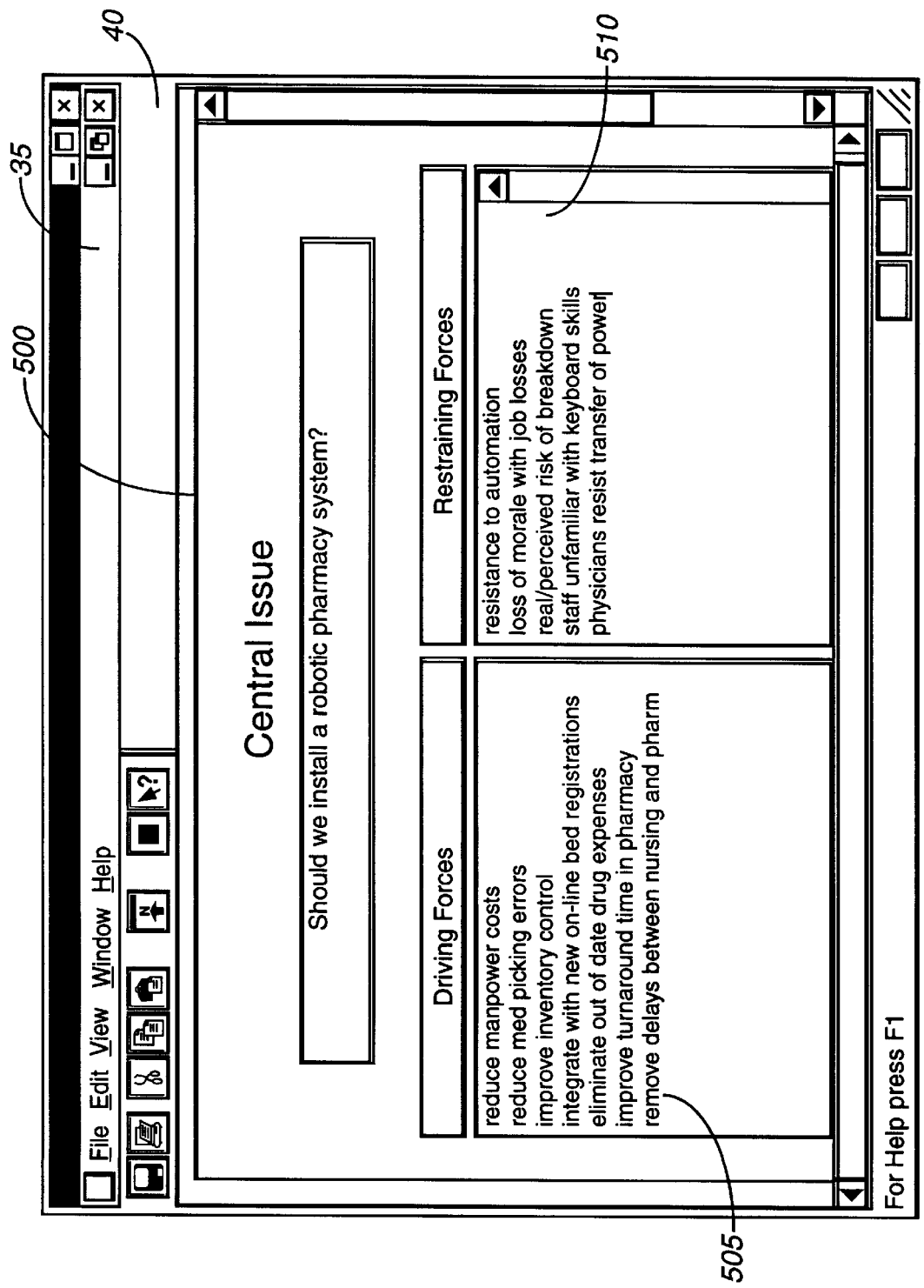
FIG. 5C is an illustration of a display associated with an embodiment of a force field diagram tool under the present invention.

Developed by the American social psychologist Kurt Lewin, a force field diagram 500 helps in decision-making or contingency planning. Force field diagram 500 as illustrated in FIG. 5C is designed upon the idea that forces—habits, customs, attitudes—both drive and restrain change. As illustrated in FIG. 5C, force field diagram 500 is constructed with driving forces 505 on the left and restraining forces 510 on the right. All of this information is entered by the project team and is preferably fully editable. Force field diagram 500 can help a team make wiser decisions about implementing change. The balance structure also allows the tools to be used to list pros and cons, strengths and weaknesses, actions and reactions, and so on.

Flowchart

Figure 5D:
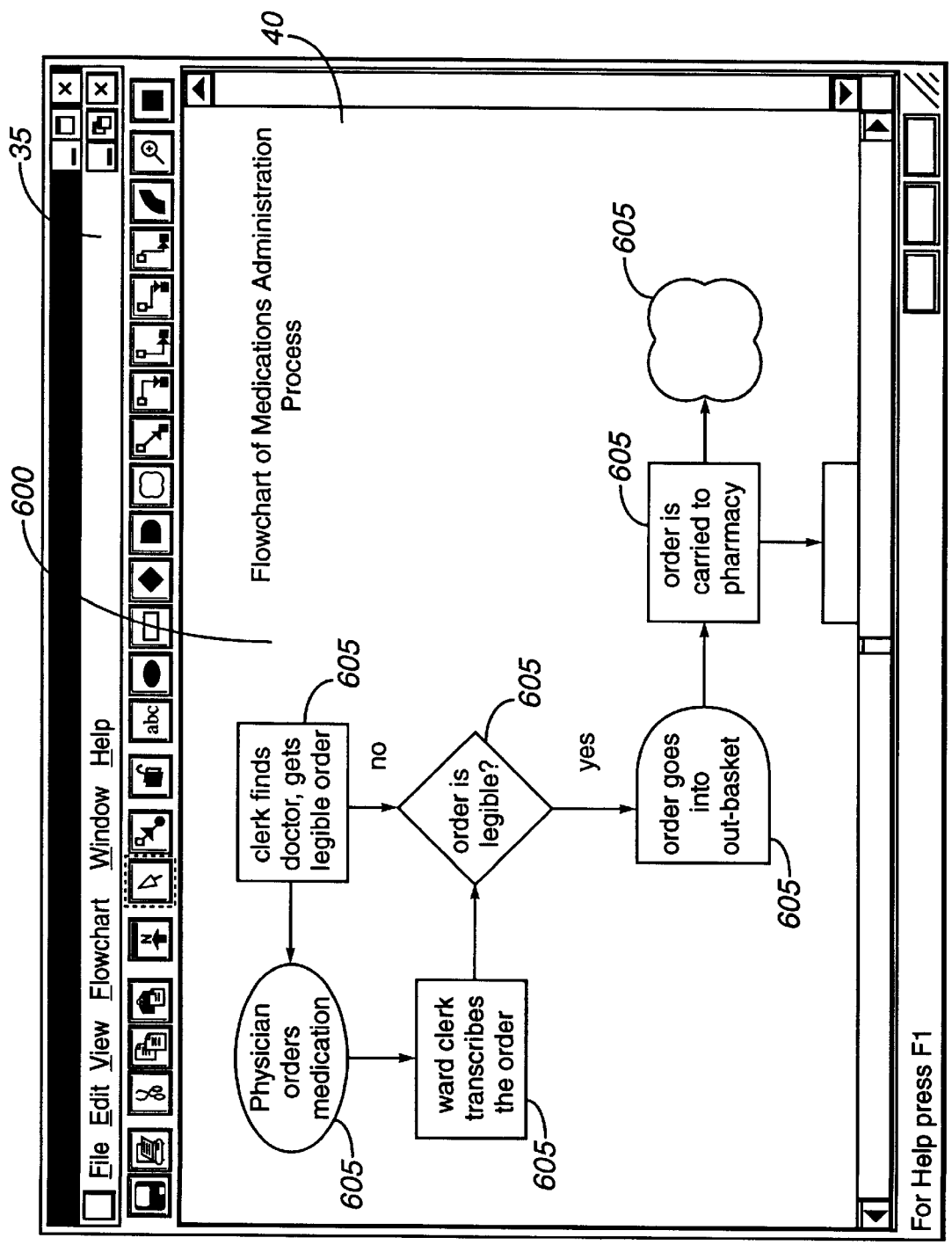
FIG. 5D is an illustration of a display associated with an embodiment of a flowchart tool under the present invention.

With a flowchart tool as illustrated in FIG. 5D, one can easily create both flow diagrams 600 or interrelationship webs. Symbols 605 offered in the flowchart tool preferably include rectangles, circles, ovals, diamonds, squares, delays and clouds. Colors and text characteristics can preferably be specified by the user. Shapes are preferably automatically resizable to fit text.

Consensus Builder

Figure 5E:
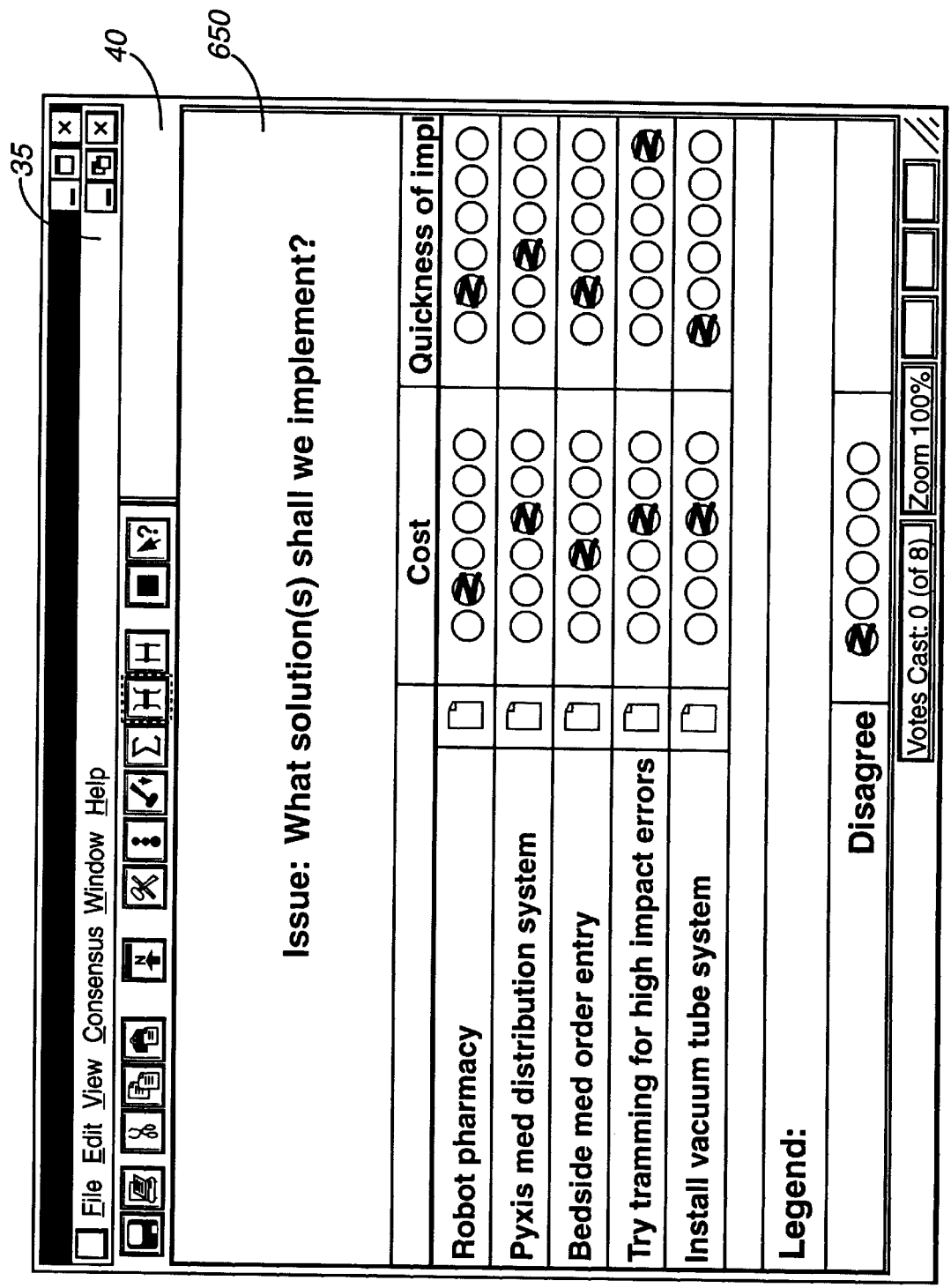
FIG. 5E is an illustration of a display associated with an embodiment of a consensus builder tool under the present invention.

The purpose of a consensus builder tool as illustrated in FIG. 5E is to help project teams to discover "shared thoughts" through voting and discussion. The consensus builder tool helps teams reduce long lists, choose the best options, and reach the point where a well-considered decision can be made. A unique matrix 650 that is the framework for the consensus builder tool preferably allows multi-voting, simple rating, and multi-criteria rating in a single tool. The present design minimizes the conformity effect and offers rapid iterative voting, anonymity, and quick overall tallies or results. It also encourages the taking of notes respecting each alternative being considered, and flags divisive issues.

Data Analyst

Figure 5F:
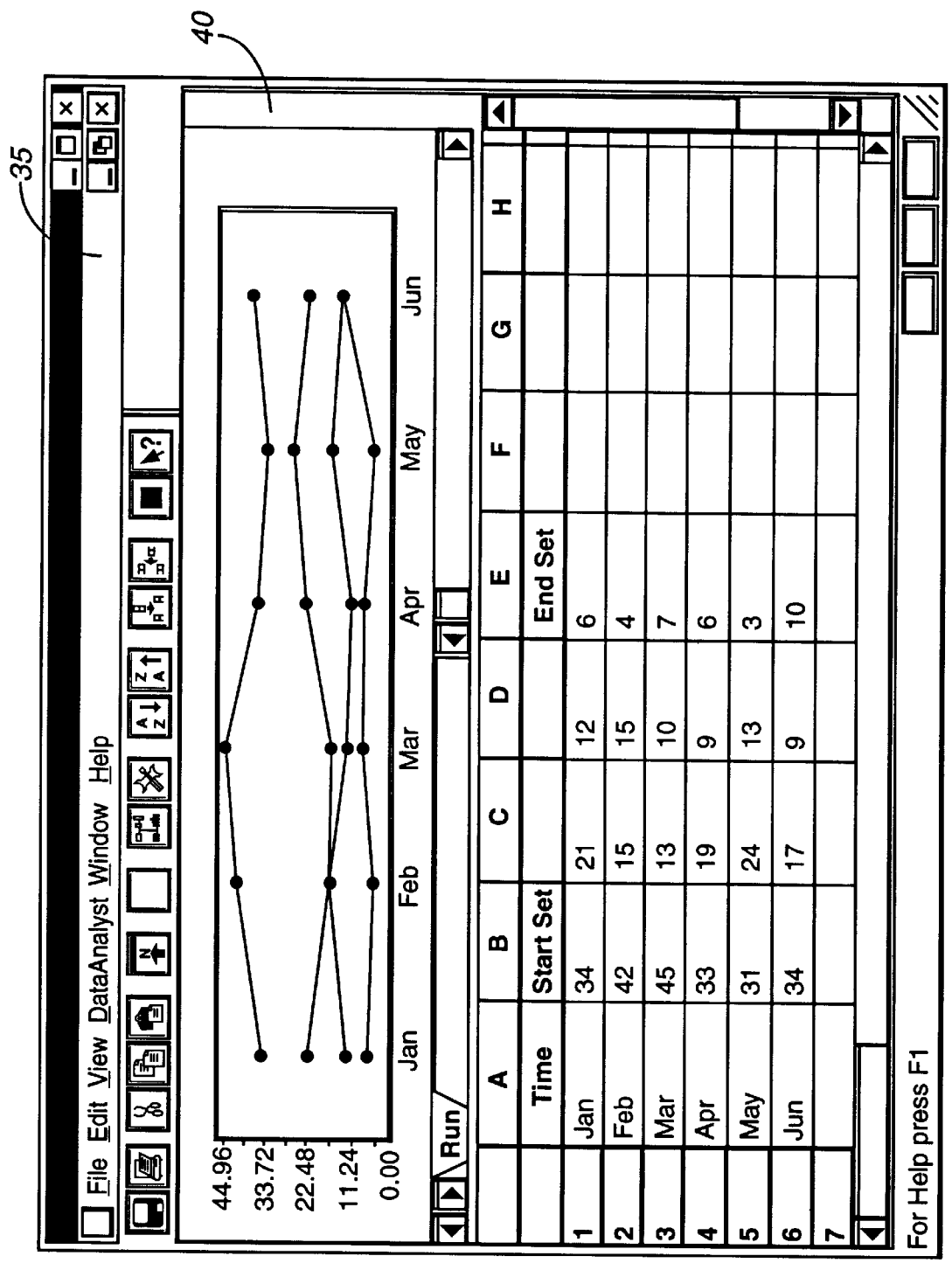
FIG. 5F is an illustration of a display associated with an embodiment of a data analyst tool under the present invention.

The data analyst tool as illustrated in FIG. 5F provides the capability to integrate actual process data with the management and planning tools provided. Collection of data is preferably done via flexible spreadsheet templates. Sorting and stratification functions preferably allow for the automated generation of run charts, scatter plots, histograms, Pareto charts, and numerous common control charts. Guidelines for both data collection and interpretation are preferably given in simple language, which assumes no prior knowledge of statistical process control (SPC). Data used in the data analyst can preferably be copied to and from other software tools, including major spreadsheet and database software packages.

Forms

Figure 5G:
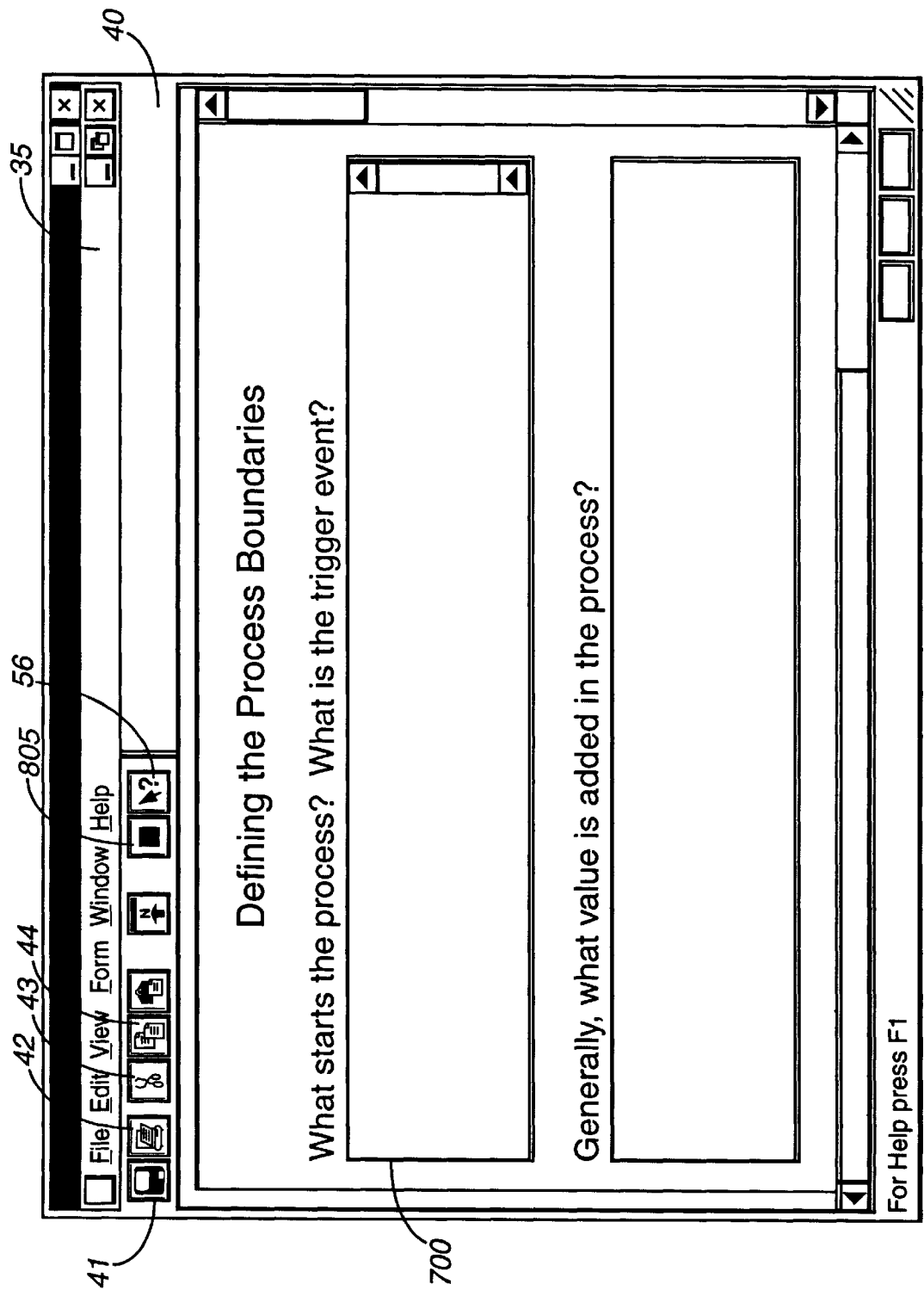
FIG. 5G is an illustration of a display associated with an embodiment of a form tool under the present invention.

FIG. 5G provides an example of one of many standard forms 700 easily made available within the present invention. Form 700 illustrated in FIG. 6, corresponds with the form tool pathway step described with the text "Define the Boundaries of the Process" in FIGS. 2A through 2D. Such forms 700 may, for example, comprise guiding questions or information to which the project team may enter responses. Forms 700 are preferably designed to help project teams or individuals step through pathways 50 in an optimal thought sequence. Forms 700 may be placed on pathway 50 ahead of time or inserted as needed. All the information entered on form 700 is preferably editable. Preferably, a number of predefined form templates are provided within the present invention. The present invention also preferably allows the user to create and use custom form templates that reflect the unique approach or interests of a project team or an organization.

Slide Shows

Figure 5H:
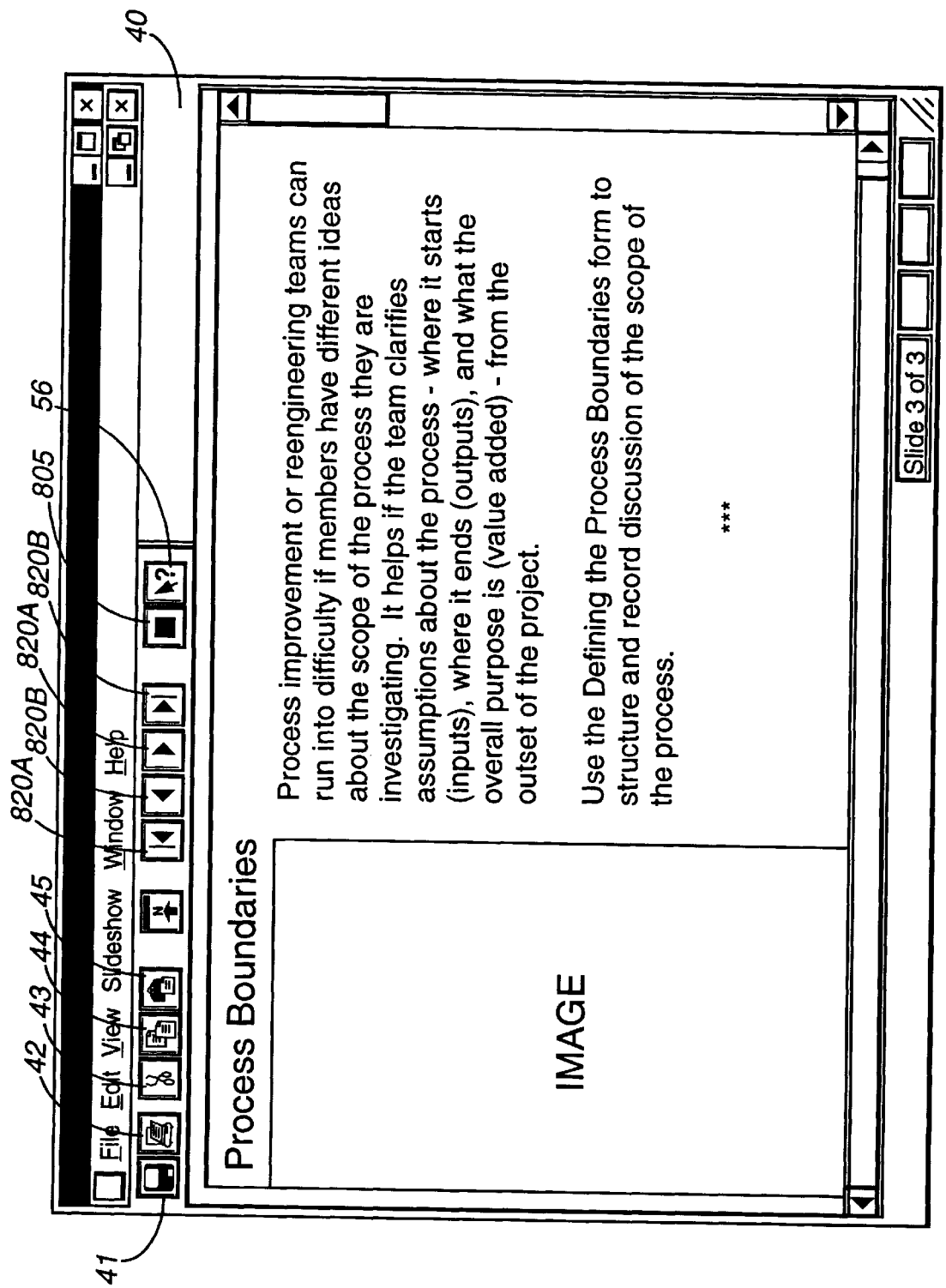
FIG. 5H is an illustration of a display associated with an embodiment of a graphical slide show tool under the present invention.

Each software tool and pathway 50 of the present invention also preferably includes a graphical tool enabling the viewing of training/educational slides. A slide show corresponding to pathway 50 or a particular software tool is preferably launched via a slide show launch button 805 on tool bar 40 of pathway 50 or a particular software tool. For example, FIG. 5H illustrates one frame 810 of a slide show corresponding to a Defining the Process Boundaries form tool as illustrated in FIG. 5G. One of the classic problems of quality training, for example, has been the lag between training and action. Slide shows provide just-in-time training on a wide variety of subjects, covering everything from the basics of quality improvement and teamwork to how to use each software tool. Slide shows may preferably be launched from pathway 50 or from toolbar 40. One may preferably move through the slide show at one's own pace (for example, via control buttons 820A through 820D as known in image viewing software arts) and exit at any time. As illustrated in FIG. 5H, each slide of a slide shows may comprise images as well as text.

Although the present invention has been described in detail in connection with the above examples, it is to be understood that such detail is solely for that purpose and that variations can be made by those skilled in the art without departing from the spirit of the invention except as it may be limited by the following claims.

APPENDIX

Pathdoc.h

Defines main PathMaker object.

```
#ifndef _PATHDOC_H_
#define _PATHDOC_H_

/******************************************************************

******************************************************************/

// pathdoc.h : interface of the CPathMakerDoc class
//
/////////////////////////////////////////////////////////////////////
   // HIWORD(lHint)             LOWORD(lHint)
#define HINT_SLIDE_LOAD_FILE         1   // TRUE if Opening for 1st time
#define HINT_SLIDE_CHANGE_PAGE       2   // New Page Number
define HINT_SLIDE_CHANGE_FONT       3   // Changing font in all forms define HINT_PATHWAY_SET_MEETING_STATUS  10   // New Meeting Status
define HINT_PATHWAY_SET_COMPLETE        11   // New Status
#define HINT_PATHWAY_SET_ITEM_DESCRIPTION 12  // UNUSED
#define HINT_PATHWAY_ADD_TOOL            13   // nIndex of new Tool
define HINT_PATHWAY_DELETE_TOOL         14   // nIndex of deleted Tool define HINT_ADD_STRING          20   // Index of add location
define HINT_INSERT_STRING_AT       21   // Index insert at
#define HINT_REMOVE_STRING_AT       22   // Index removed from
define HINT_SET_STRING_AT          23   // Index of string set class CShapeView;
class CPathwayItem;
class CSlideShowTool;
class CWindowInfo;

class CPathMakerDoc : public CDocument
{
    DECLARE_SERIAL(CPathMakerDoc)
  public:
    virtual void Serialize(CArchive& ar);
    CPathMakerDoc();

int GetPathwayItemCount() {
      int nReturn = m_pItemArray ? m_pItemArray->GetUpperBound() + 1 : 0;
      return(nReturn);
    }
```

36

```
CPathwayItem* GetPathwayItem(int a_nIndex) {
    ASSERT((a_nIndex >= 0) && (a_nIndex < GetPathwayItemCount()));
    CPathwayItem* pItem = (CPathwayItem*) m_pItemArray->GetAt(a_nIndex);
    return(pItem);
} void InsertPathwayItem(int a_nIndex, CPathwayItem* a_pItem) {
    ASSERT((a_nIndex >= 0) && (a_nIndex <= GetPathwayItemCount()));
    m_pItemArray->InsertAt(a_nIndex, (CObject*) a_pItem);
    UpdateAllViews(NULL, MAKELONG(HINT_PATHWAY_ADD_TOOL, a_nIndex), NULL);
} void DeletePathwayItem(int a_nIndex) {
    ASSERT((a_nIndex >= 0) && (a_nIndex < GetPathwayItemCount()));
    CObject* pwi=m_pItemArray->GetAt(a_nIndex);
    m_pItemArray->RemoveAt(a_nIndex);
    delete pwi;
    UpdateAllViews(NULL, MAKELONG(HINT_PATHWAY_DELETE_TOOL, a_nIndex), NULL);

// Have to call UpdateAllViews...
} int FindPathwayItem(CPathwayItem* a_pItem);

CWindowInfo *GetWindowInfo();
int GetLBCaretIndex() { return m_nCaretIndex;}
void SetLBCaretIndex(int anIndex) { m_nCaretIndex = anIndex; }
BOOL GetProjectDesc(const CString& aFileName,CString& aProjDesc);

enum PathMakrFileType { Pathway, Template };
void SetPathMakrFileType(PathMakrFileType aType = Pathway) {m_eFileType = aType;}
PathMakrFileType GetPathMakrFileType() { return m_eFileType;}
void SetSlideHelpFile(const CString& aString);
void ShowSlideHelp();
BOOL IsPathwayWindowMaximized();
CShapeView* FindView(CPathwayItem* a_pItem);
CShapeView* FindPathwayView();
void CreateView(CPathwayItem* a_pItem);
void ActivateView(CPathwayItem* a_pItem);
void ActivateView(int a_nIndex);
void CreatePathwayItem(int a_nIndex, CPathwayItem* a_pItem,
            BOOL a_bCreateView = TRUE);
BOOL OnSaveDocument(LPCTSTR lpszPathName);
int GetMeetingEnd(int a_nIndex); // Returns the index to the end of the meeting or -1
                // to denote that it is not in a meeting.

int GetMeetingStart(int a_nIndex); // Returns the index to the Start of the meeting or -1
                // to denote that it is not in a meeting. The
                // Index should point to a meetingtool pathway item.
virtual ~CPathMakerDoc();
virtual BOOL CanCloseFrame(CFrameWnd* pFrame);
void SetMakrPathName(CString aPathName) {m_strPathName=aPathName;}
CString GetProjName();
CString GetTeamMembers();
```

37

```
#ifdef _DEBUG
    virtual void AssertValid() const;
    virtual void Dump(CDumpContext& dc) const;
endif
  protected:
    virtual BOOL OnNewDocument();
    virtual BOOL OnOpenDocument(const char* pszPathName);
    BOOL PathDoSave(LPCTSTR lpszPathName, BOOL bReplace=TRUE);

enum PathItemIndex { ProjectToolIndex = 0 };
    CPathwayItem *GetProjectTool() // Returns the project tool
            {
              return GetPathwayItem((int)ProjectToolIndex);
            } public:
    CObArray* m_pItemArray;
    CObArray m_ActivePathItems;
    CWindowInfo* m_pPathwayWindowInfo; // XXX
    int m_nCaretIndex;
    CFontAttribPtrArray m_FontAttribArray;

private:
    PathMakrFileType m_eFileType;
    CSlideShowTool* m_pSlideHelp;

// Generated message map functions
  protected:
    //{{AFX_MSG(CPathMakerDoc)
        afx_msg void OnFileSave();
        afx_msg void OnFileSaveAs();
        afx_msg void OnFileSaveAsTemplate();
        //}}AFX_MSG
    DECLARE_MESSAGE_MAP()

};

///////////////////////////////////////////////////////////// endif // _PATHDOC_H_
```

38

Pathdoc.cpp

Implements main PathMaker object.

```
/*****************************************************************
 *
 *
 *****************************************************************/

// pathdoc.cpp : implementation of the CPathMakerDoc class
// include "stdafx.h"
include "pathmakr.h"
#include "pathitem.h"
#include "pathdoc.h"
#include "shape.h"
#include "pathvw.h"
#include "projdoc.h"
#include "slidedoc.h"
#include "serhelp.h"

IMPLEMENT_SERIAL( CPathMakerDoc, CDocument, 0)

#ifdef _DEBUG
undef THIS_FILE
static char BASED_CODE THIS_FILE[] = __FILE__;
endif /////////////////////////////////////////////////////////////////////
// CPathMakerDoc //IMPLEMENT_DYNCREATE(CPathMakerDoc, CDocument)

BEGIN_MESSAGE_MAP(CPathMakerDoc, CDocument)
        //{{AFX_MSG_MAP(CPathMakerDoc)
        ON_COMMAND(ID_FILE_SAVE, OnFileSave)
        ON_COMMAND(ID_FILE_SAVE_AS, OnFileSaveAs)
        ON_COMMAND(ID_FILE_SAVE_AS_TEMPLATE, OnFileSaveAsTemplate)
        //}}AFX_MSG_MAP
END_MESSAGE_MAP()

/////////////////////////////////////////////////////////////////////
// CPathMakerDoc construction/destruction CPathMakerDoc::CPathMakerDoc()
{
  m_pItemArray = NULL;
  this->SetPathMakrFileType(CPathMakerDoc::Pathway); // assume it is a pathway file
  m_pSlideHelp = NULL;
  m_pPathwayWindowInfo = new CWindowInfo;
```

39

```
    this->SetLBCaretIndex(0);
}

CPathMakerDoc::~CPathMakerDoc()
{
  if (m_pItemArray) {
    for (int nIndex = GetPathwayItemCount() - 1; nIndex >= 0; nIndex--) {
      delete GetPathwayItem(nIndex);
    }
    m_pItemArray->RemoveAll();
    delete m_pItemArray;
  } int nCount = m_FontAttribArray.GetSize();
  while (nCount-- > 0) {
    delete (m_FontAttribArray.GetAt(0));  // Remove the contents of the item
    m_FontAttribArray.RemoveAt(0);
  } if ( m_pSlideHelp != NULL ) {
    delete m_pSlideHelp;
  }
  delete m_pPathwayWindowInfo;

} void CPathMakerDoc::SetSlideHelpFile(const CString& aString)
{
  if ( m_pSlideHelp == NULL ) {
    m_pSlideHelp = new CSlideShowTool;
  }
  m_pSlideHelp->SetFileName(aString,this);
} void CPathMakerDoc::ShowSlideHelp()
{
  ASSERT(m_pSlideHelp != NULL);
  CShapeView* pShapeView = FindView(m_pSlideHelp);
  if ( pShapeView == NULL ) {
    m_pSlideHelp->SetCurrentPage(0,this);
    this->CreateView(m_pSlideHelp);
  } else {
    this->ActivateView(m_pSlideHelp);
  }
}

BOOL CPathMakerDoc::OnNewDocument()
{
        if (!CDocument::OnNewDocument())
                return FALSE;

CString String;
  m_pItemArray = new CObArray();
```

40

```
  // Allow user to select a default pathway here!!!

CreatePathwayItem(0, new CProjectTool(this), FALSE);

return TRUE;
}

BOOL CPathMakerDoc::OnOpenDocument(const char* pszPathName)
{
        if (!CDocument::OnOpenDocument(pszPathName))
                return FALSE;
  CShapeView* pShapeView = FindView((CPathwayItem*) 0xFFFFFFFF);
  if ( pShapeView && GetWindowInfo()->WinInfoSet()) {
    pShapeView->RestoreWindowPlacement(GetWindowInfo()-
>GetWindowPlacement(),GetWindowInfo()->GetWindowScrollPosition());
  }
  for(int ii=0;ii < m_ActivePathItems.GetSize(); ++ii) {
    CreateView((CPathwayItem *) m_ActivePathItems.GetAt(ii));
  } return TRUE;
}

BOOL CPathMakerDoc::CanCloseFrame(CFrameWnd* pFrame)
{
  CShapeView* pShapeView = (CShapeView*) pFrame->GetActiveView();
  if ( pShapeView->IsKindOf(RUNTIME_CLASS(CShapeView))) {
    CPathwayItem* pPathwayItem = pShapeView->GetPathwayItem();
    BOOL bRet = TRUE;
    if (pPathwayItem == (CPathwayItem*) 0xFFFFFFFF) {
      bRet = CDocument::CanCloseFrame(pFrame);
      if (bRet) {
        pShapeView->CloseAll(FALSE);
      }
    }
    return(bRet);
  } else {
    return TRUE;
  }
}

/////////////////////////////////////////////////////////////////
// CPathMakerDoc diagnostics ifdef _DEBUG
void CPathMakerDoc::AssertValid() const
{
        CDocument::AssertValid();
} void CPathMakerDoc::Dump(CDumpContext& dc) const
{
        CDocument::Dump(dc);
}
```

41

```
#endif //_DEBUG

///////////////////////////////////////////////////////////////
// CPathMakerDoc commands int CPathMakerDoc::FindPathwayItem(CPathwayItem* a_pItem)
{
  ASSERT(a_pItem);
  for (int nIndex = GetPathwayItemCount() - 1; nIndex >= 0; nIndex--) {
    if (GetPathwayItem(nIndex) == a_pItem) {
      return(nIndex);
    }
  }
  return(-1);
}

CShapeView* CPathMakerDoc::FindView(CPathwayItem* a_pItem)
{
  POSITION pos = GetFirstViewPosition();
  CShapeView* pShapeView;
  CRuntimeClass* pViewClass = RUNTIME_CLASS(CShapeView);
  while (pos != NULL) {
    pShapeView = (CShapeView*) GetNextView(pos);
    if (pShapeView->IsKindOf(pViewClass)) {
      if (pShapeView->GetPathwayItem() == a_pItem) {
        return(pShapeView);
      }
    }
  }
  return(NULL);
}
CShapeView* CPathMakerDoc::FindPathwayView()
{
  POSITION pos = GetFirstViewPosition();
  CShapeView* pShapeView;
  CRuntimeClass* pViewClass = RUNTIME_CLASS(CShapeView);
  while (pos != NULL) {
    pShapeView = (CShapeView*) GetNextView(pos);
    if (pShapeView->IsKindOf(pViewClass)) {
        return(pShapeView);
    }
  }
  return(NULL);
} void CPathMakerDoc::CreateView(CPathwayItem* a_pItem)
{
  CDocTemplate* pDocTemplate = a_pItem->GetDocTemplate();
  ASSERT(pDocTemplate);
  CMDIChildWnd* pNewFrame = (CMDIChildWnd*) pDocTemplate->CreateNewFrame(this,
    NULL);
  if (pNewFrame != NULL) {
    ASSERT(pNewFrame->IsKindOf(RUNTIME_CLASS(CMDIChildWnd)));
    pDocTemplate->InitialUpdateFrame(pNewFrame, this, FALSE);
```

42

```
    CShapeView* pShapeView = (CShapeView*) pNewFrame->GetActiveView();
    ASSERT(pShapeView);
    if ( pShapeView->IsKindOf(RUNTIME_CLASS(CShapeView))) {
      if (a_pItem->WinInfcSet() ) {
        pShapeView->RestoreWindowPlacement(a_pItem->GetWindowPlacement(),a_pItem-
>GetWindowScrollPosition());
      }
      pShapeView->SetPathwayItem(a_pItem);
      pDocTemplate->InitialUpdateFrame(pNewFrame, this, TRUE);
      pShapeView->SetTitle();
    } else {
    // This is for views that are not CShapeView derived, such
    // as in DA
      pNewFrame->SendMessage(WM_USER_PATHWAY_ITEM,0,(LPARAM)a_pItem);
      pDocTemplate->InitialUpdateFrame(pNewFrame, this, TRUE);
    }
  }
}

BOOL CPathMakerDoc::IsPathwayWindowMaximized()
{
  if (GetPathwayItemCount() <= 0)
    return(FALSE);
  else
    return(FindView((CPathwayItem*) 0xFFFFFFFF)->GetParentFrame()->IsZoomed());
} void CPathMakerDoc::ActivateView(CPathwayItem* a_pItem)
{
  SetModifiedFlag();
  CShapeView* pShapeView = FindView(a_pItem);
  if (pShapeView) {
    CFrameWnd* pFrame = pShapeView->GetParentFrame();
    if (pFrame->IsIconic()) {
      if (IsPathwayWindowMaximized()) {
        pFrame->ActivateFrame(SW_MAXIMIZE);
      } else {
        pFrame->ActivateFrame(SW_RESTORE);
      }
    } else {
      pFrame->ActivateFrame(SW_SHOW);
    }
  } else {
    CreateView(a_pItem);
  }
} void CPathMakerDoc::ActivateView(int a_nIndex)
{
  ActivateView(GetPathwayItem(a_nIndex));
} void CPathMakerDoc::CreatePathwayItem(int a_nIndex, CPathwayItem* a_pItem,
                  BOOL a_bCreateView)
```

43

```
{
  ASSERT((a_nIndex >=0) && (a_nIndex <= GetPathwayItemCount()));
  ASSERT(FindPathwayItem(a_pItem) == -1);
  ASSERT(FindView(a_pItem) == NULL);

InsertPathwayItem(a_nIndex, a_pItem);
  ASSERT((a_pItem->GetToolType() != StageLine) || (a_bCreateView == FALSE));
  SetModifiedFlag();
  if (a_bCreateView) {
    CreateView(a_pItem);
  }
}
BOOL CPathMakerDoc::OnSaveDocument(LPCTSTR lpszPathName)
{
  if (m_pItemArray) {
    POSITION pos = GetFirstViewPosition();
    CShapeView* pShapeView;
    CRuntimeClass* pViewClass = RUNTIME_CLASS(CShapeView);

pShapeView = (CShapeView*) GetNextView(pos); // the first view is the pathway...

if (pShapeView->IsKindOf(pViewClass)) {
      pShapeView->PutEditStringIntoDocument();
    }

WINDOWPLACEMENT wp;
    int rv = pShapeView->GetParentFrame()->GetWindowPlacement(&wp);
    CPoint ScrollPt = pShapeView->GetScrollPosition();

if ( rv != 0 ) {
      GetWindowInfo()->SetWindowPlacement(wp,ScrollPt);
    }
    // Dangerous cast below...
    this->SetLBCaretIndex(((CPathwayView*)pShapeView)->GetLBCaretIndex());

// Now update any pathitems that have view and update the view list in the document.
    // We can just clear out the m_ActivePathItems since it is a reference array
    m_ActivePathItems.RemoveAll();
    CPathwayItem* pPathwayItem = NULL;
    CPathwayItem* pPrevItem = NULL;
    while (pos != NULL) {
      pShapeView = (CShapeView*) GetNextView(pos);
      pPathwayItem = pShapeView->GetPathwayItem();
      if (pShapeView->IsKindOf(pViewClass) && pPathwayItem != pPrevItem) {
        pShapeView->PutEditStringIntoDocument();
        pShapeView->UpdateWindowPlacement();
        m_ActivePathItems.Add(pPathwayItem);
      }
      pPrevItem = pPathwayItem;
    }
  }
  return CDocument::OnSaveDocument(lpszPathName);
}
```

44

```
void CPathMakerDoc::Serialize(CArchive& ar)
{
  // Serialize the Project Info Description,
  // this allows for easy access to Project names
  // for template selection. Here it's just ignored.
  // NOTE: MAKE SURE THAT THE STRING IS THE FIRST THING
  // SERIALIZED (or change the GetProjectDesc method.
  CString sProgDesc;
  if ( ar.IsStoring()) {
    sProgDesc = ((CPathwayItem*)(m_pItemArray->GetAt(0)))->GetItemDescription();
    ar << sProgDesc;
  } else {
    ar >> sProgDesc;
  }

CDocument::Serialize(ar);
  m_FontAttribArray.Serialize(ar);
  CPathMakerDoc::PathMakrFileType ePathType = this->GetPathMakrFileType();
  if (ar.IsStoring() && ePathType == CPathMakerDoc::Template ) {
    m_pPathwayWindowInfo->WinInfoUnSet();
  } m_pPathwayWindowInfo->Serialize(ar);
  WORD nVerMajor=1,nVerMinor=0;
  if ( ar.IsStoring()) {
    ar << nVerMajor << nVerMinor;
    ar << m_nCaretIndex;
    ar << (WORD) m_eFileType;
    ar << m_pItemArray;
  } else {
    ar >> nVerMajor >> nVerMinor;
    ar << m_nCaretIndex;
    WORD tmp_Word;
    ar >> tmp_Word;
    m_eFileType = (PathMakrFileType) tmp_Word;
    ar >> m_pItemArray;
  }
  m_ActivePathItems.Serialize(ar);
}

// Returns the index to the end of the meeting or -1
// to denote that it is not in a meeting.
int CPathMakerDoc::GetMeetingEnd(int a_nIndex) {
  CPathwayItem* pPathItem = this->GetPathwayItem(a_nIndex);
  MeetingStatus eMeetStat = pPathItem->GetMeetingStatus();

switch(eMeetStat){
    case MeetingOnly:
      return a_nIndex;
      break;
    case MeetingNone: return -1; break;

case MeetingEnd: return a_nIndex; break;
```

45

```
        case MeetingMiddle:
        case MeetingStart:
          int nLookAheadMeetingIndex = a_nIndex+1;
          int nCount = this->GetPathwayItemCount();
          while(nLookAheadMeetingIndex < nCount ) {
            if (this->GetPathwayItem(nLookAheadMeetingIndex)->GetMeetingStatus() == MeetingEnd){
              return nLookAheadMeetingIndex;
            }
            ++nLookAheadMeetingIndex;
          }
          return -1;
          break;
      }
      return -1; // Default return value.
    }
    int CPathMakerDoc::GetMeetingStart(int a_nIndex)
    {
      CPathwayItem* pPathItem = this->GetPathwayItem(a_nIndex);
      MeetingStatus eMeetStat = pPathItem->GetMeetingStatus();

switch(eMeetStat){
        case MeetingOnly:
          return a_nIndex;
          break;
        case MeetingNone: return -1; break;

case MeetingStart: return a_nIndex; break;

case MeetingMiddle:
        case MeetingEnd:
          int nItemIndex = a_nIndex-1;
          while(nItemIndex >= 0 ) {
            if (this->GetPathwayItem(nItemIndex)->GetMeetingStatus() == MeetingStart){
              return nItemIndex;
            }
            --nItemIndex;
          }
          return -1;
          break;
      }
      return -1; // Default return value.
    }

CWindowInfo* CPathMakerDoc::GetWindowInfo()
    {
      return m_pPathwayWindowInfo;
    } void CPathMakerDoc::OnFileSave()
    {
            // TODO: Add your command handler code here
            //CDocument::OnFileSave();
```

46

```
            DWORD dwAttrib = GetFileAttributes(m_strPathName);
            if (dwAttrib & FILE_ATTRIBUTE_READONLY)
            {
                    // we do not have read-write access or the file does not (now) exist
                    if (!PathDoSave(NULL))
                    {
                            TRACE0("Warning: File save with new name failed.\n");
                            return ;//FALSE;
                    }
            }
            else
            {
                    if (!PathDoSave(m_strPathName))
                    {
                            TRACE0("Warning: File save failed.\n");
                            return ;//FALSE;
                    }
            }
            return ;//TRUE;

}
// Proc: CPathMakerDoc::PathDoSave
//
// The PathDoSave is basicly a copy of the MFC CDocument::DoSave except
// for one chenage. I put up a file save dialog that would allow you to
// save the current pathway as a .pth (regular pathwat file) or a .ptt
// pathway template file.
BOOL CPathMakerDoc::PathDoSave(LPCTSTR lpszPathName, BOOL bReplace)
{
            CString newName = lpszPathName;
            if (newName.IsEmpty())
            {
                    CDocTemplate* pTemplate = GetDocTemplate();
                    ASSERT(pTemplate != NULL);

newName = m_strPathName;
                    if (bReplace && newName.IsEmpty())
                    {
                            newName = m_strTitle;
#ifndef _MAC
                            if (newName.GetLength() > 8)
                                    newName.ReleaseBuffer(8);
                            // check for dubious filename
                            int iBad = newName.FindOneOf(_T(" #%;/\""));
#else
                            int iBad = newName.FindOneOf(_T(":"));
#endif
                            if (iBad != -1)
                                    newName.ReleaseBuffer(iBad);

#ifndef _MAC
                            // append the default suffix if there is one
                            CString strExt;
                            if (pTemplate->GetDocString(strExt, CDocTemplate::filterExt) &&
```

47

```
                            !strExt.IsEmpty())
                        {
                            ASSERT(strExt[0] == '.');
                            newName += strExt;
                        }
endif
                    }
    // Now put up the file save dialog
    CString sSaveAsFilter;
    CString sExtDefault;
    if ( this->GetPathMakrFileType() == CPathMakerDoc::Pathway) {
      // A Pathway
      sSaveAsFilter.LoadString(IDS_PATHWAY_SAVE_FILTER);
      sExtDefault.LoadString(IDS_PATHWAY_DEF_EXT);
    } else {
      // A Template
      sSaveAsFilter.LoadString(IDS_TEMP_SAVE_FILTER);
      sExtDefault.LoadString(IDS_TEMP_DEF_EXT);
    }

CFileDialog dlg(FALSE, sExtDefault, NULL, OFN_OVERWRITEPROMPT |
OFN_HIDEREADONLY | OFN_FILEMUSTEXIST,
       sSaveAsFilter);
    if (dlg.DoModal() != IDOK) {
      return FALSE;
    }
    newName = dlg.GetPathName();
                //if (!AfxGetApp()->DoPromptFileName(newName,
                //    bReplace ? AFX_IDS_SAVEFILE : AFX_IDS_SAVEFILECOPY,
                //    OFN_HIDEREADONLY | OFN_PATHMUSTEXIST, FALSE, pTemplate))
                //        return FALSE;       // don't even attempt to save
        }

BeginWaitCursor();
        if (!OnSaveDocument(newName))
        {
                if (lpszPathName == NULL)
                {
                        // be sure to delete the file
                        TRY
                        {
                                CFile::Remove(newName);
                        }
                        CATCH_ALL(e)
                        {
                                TRACE0("Warning: failed to delete file after failed SaveAs.\n");
                                //DELETE_EXCEPTION(e);
                        }
                        END_CATCH_ALL
                }
                EndWaitCursor();
                return FALSE;
        }
```

```
        // reset the title and change the document name
        if (bReplace)
                SetPathName(newName);

EndWaitCursor();
        return TRUE;       // success
} void CPathMakerDoc::OnFileSaveAs()
{
  PathMakrFileType eMakerType = GetPathMakrFileType();
  this->SetPathMakrFileType(CPathMakerDoc::Pathway); // Set to pathway type
  if (!PathDoSave(NULL)) {
    TRACE0("Warning: File save-as failed.\n");
    //Restore the original maker type...
    this->SetPathMakrFileType(eMakerType);
  }

}
void CPathMakerDoc::OnFileSaveAsTemplate()
{
  PathMakrFileType eMakerType = GetPathMakrFileType();
  this->SetPathMakrFileType(CPathMakerDoc::Template); // Set to template type
  // Need to close all the window to prepare for the save...
  this->FindPathwayView()->CloseAll(FALSE);
  if (!PathDoSave(NULL)) {
    TRACE0("Warning: File save-as failed.\n");
    //Restore the original maker type...
    this->SetPathMakrFileType(eMakerType);
  }

}
// Use this funtion to get the project desciption from a pathway file.
// This allows the new file dialog to list the project desc of the template, not
// just the template file name. This function relies on the CPathMakerDoc Serialization
// procedure.
BOOL CPathMakerDoc::GetProjectDesc(const CString& aFileName,CString& aProjDesc)
{
        CFileException fe;
  CFile* pFile;
  try {
        pFile = new CFile(aFileName, CFile::modeRead | CFile::shareDenyWrite);
  }
  catch(...) {
    TRACE("Problem opening File %s",(LPCTSTR) aFileName);
                return FALSE;
        }

CArchive loadArchive(pFile, CArchive::load | CArchive::bNoFlushOnDelete);
        //loadArchive.m_pDocument = this;
        //loadArchive.m_bForceFlat = FALSE;
        try {
    loadArchive >> aProjDesc;
                loadArchive.Close();
```

49

```
                    pFile->Close();
                    delete pFile;
        }
        catch(...) {
    TRACE("Caught and exception %s",(LPCTSTR) aFileName);
                    pFile->Abort(); // will not throw an exception
                    delete pFile;
        }
}

CString CPathMakerDoc::GetProjName()
{
  CPathwayItem* pItem = GetProjectTool();
  CString sName("");
  if ( pItem->GetUpperBound( ) > 1 ) {
    sName = pItem->GetStringAt((int)CProjectTool::ProjectNameIndex);
  }
  return sName;
}

CString CPathMakerDoc::GetTeamMembers()
{
  CPathwayItem* pItem = GetProjectTool();
  CString sName("");
  if ( pItem->GetUpperBound( ) > 2 ) {
    sName = pItem->GetStringAt((int)CProjectTool::TeamMembersIndex);
  }
  return sName;
}
```

Pathitem.h

Defines a generic Pathway Item.

```
#ifndef _PATHITEM_H_
#define _PATHITEM_H_

/*****************************************************************
 *
 *****************************************************************/

//#include "pathdoc.h"
#include "fontlist.h"

class CPathMakerDoc;
class CShapeView;
class CAgendaInfo;

// MeetingPasteMiddle, MeetingPasteEnd is a special case for pasting only. It flags
// pathway item that are being pasted into a meeting that already have the agenda in
// the pasted meeting tool.
enum MeetingStatus { MeetingNone, MeetingOnly, MeetingStart, MeetingMiddle,
            MeetingEnd, MeetingPasteMiddle, MeetingPasteEnd };
enum ToolType    { ToolUninitialized = 0, ProjectLine = 1, MeetingLine = 2,
            StageLine = 3, ToolLine = 4 };

class CWindowInfo : public CObject {
      DECLARE_SERIAL(CWindowInfo)
   public:

CWindowInfo();
     BOOL WinInfoSet();
     void WinInfoUnSet();
     WINDOWPLACEMENT *GetWindowPlacement();
     void SetWindowPlacement(const WINDOWPLACEMENT &a_wp, const CPoint& aScrollPt);
     const CPoint& GetWindowScrollPosition();
     void SetWindowScrollPosition(const CPoint& aScrollPt);

virtual void Serialize(CArchive& ar);

private:
     enum WindowInfoStatus { SET, UNSET };
     WINDOWPLACEMENT m_wp;
     CPoint m_ScrollPt;
     WindowInfoStatus m_status;
};

class CPathwayItem : public CWindowInfo {
    DECLARE_SERIAL(CPathwayItem)
    public:
      virtual void Serialize(CArchive& ar);
```

51

```
public:
  CPathwayItem(CPathMakerDoc* a_pDoc = NULL,
          ToolType a_ToolType = ToolUninitialized);

CPathwayItem(CPathMakerDoc* a_pDoc, CString a_sDescription,
          ToolType a_ToolType, MeetingStatus a_Status = MeetingNone);

~CPathwayItem();
public:
  // ALL SUB-CLASSES OF CPathwayItem MUST DEFINE THESE!!!!
  virtual CMultiDocTemplate* GetDocTemplate() {
    TRACE("Can't call base class' GetDocTemplate!!!\n");
    ASSERT(0);
    return(NULL);  // Make the compiler happy
  } public:
  void SetDefaultDescription(UINT unID) {
    ASSERT(unID);

CString String;
    String.LoadString(unID);
    SetItemDescription(String, NULL);
  } void SetItemDescription(CString a_sString, CPathMakerDoc* pDoc);

CString GetItemDescription() {
    return(m_sDescription);
  }
  void SetMeetingStatus(MeetingStatus a_Status, CPathMakerDoc* pDoc);

MeetingStatus GetMeetingStatus() {
    return(m_MeetingStatus);
  } void SetComplete(BOOL a_bFlag, CPathMakerDoc* pDoc);

BOOL IsComplete() {
    return(m_Complete);
  }
public:
  ToolType GetToolType() {
    return(m_ToolType);
  } int GetCount() {
    return(GetUpperBound() + 1);
  }
  int GetUpperBound() {
    return(m_aStrings.GetUpperBound());
  }
```

52

```
  CString GetStringAt(int a_nIndex) {
    return(m_aStrings.GetAt(a_nIndex));
  } void SetStringAt(int a_nIndex, CString& a_String,
          CShapeView* pShapeView);
  int AddString(CString& a_String, CShapeView* pShapeView);
  void InsertStringAt(int a_nIndex, CString& a_String,
          CShapeView* pShapeView);
  void RemoveStringAt(int a_nIndex, CShapeView* pShapeView);
  CStringArray *GetStringArray() { return &m_aStrings;}
  virtual UINT GetPathwayButtonID() {
    TRACE("Shouldn't ask for GetPathwayButtonID on base PathwayItem!\n");
    ASSERT(0);
    return(0);
  }
  CPathMakerDoc* GetDocument() {
    return(m_pDoc);
  }
  CFontAttribPtrArray* GetFontAttribArrPtr() { return &m_FontAttribArray;}
  int GetFontAttribSize() { return m_FontAttribArray.GetSize();}
  void DumpFonts();
  CAgendaInfo* GetAgendaInfo();
protected:
  CString m_sDescription;
  MeetingStatus m_MeetingStatus;
  BOOL m_Complete;
  CStringArray m_aStrings;
  ToolType m_ToolType;
  CPathMakerDoc* m_pDoc;
  CFontAttribPtrArray m_FontAttribArray;
  CAgendaInfo* m_pAgenda;
};

class CPathwayTool : public CPathwayItem {
  DECLARE_SERIAL(CPathwayTool)
public:
  virtual void Serialize(CArchive& ar);
public:
  CPathwayTool()
      : CPathwayItem() {
  } public:
  virtual CMultiDocTemplate* GetDocTemplate() {
    return(m_pPathwayTemplate);
  }
  static CMultiDocTemplate* CreateDocTemplate(CRuntimeClass* pDocClass,
      CRuntimeClass* pFrameClass);
private:
  static CMultiDocTemplate* m_pPathwayTemplate;
};

#endif  // _PATHITEM_H_
```

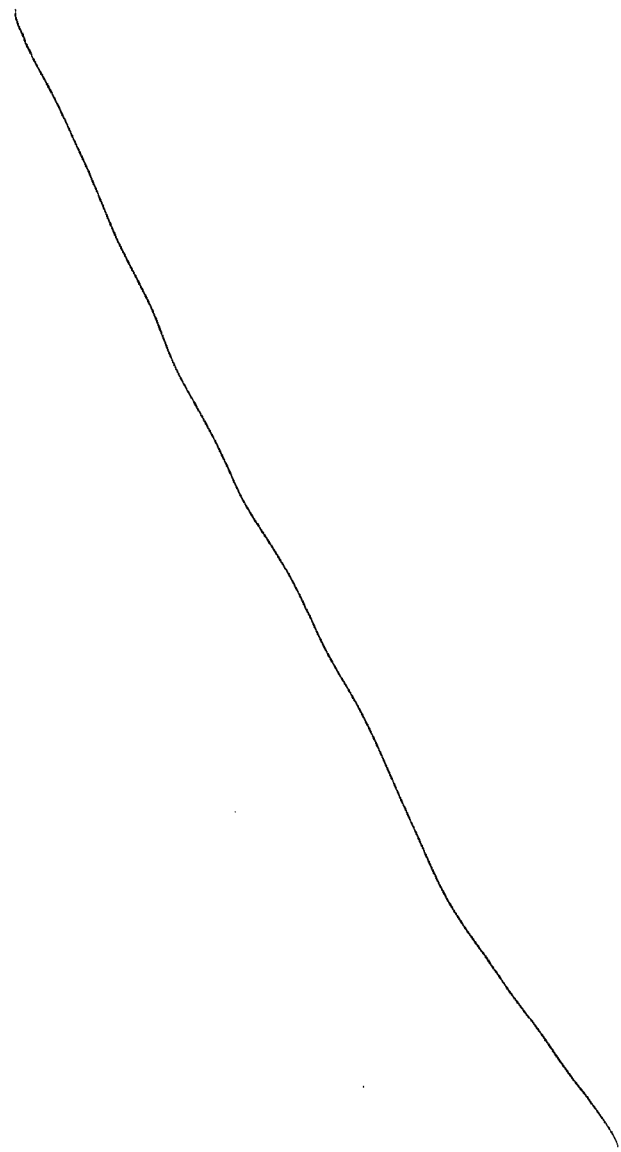

Pathitem.cpp

Implements the generic Pathway item.
```
/****************************************************************
 *
 ****************************************************************/

// pathitem.cpp : implementation file
// include "stdafx.h"
include "pathmakr.h"

#include "pathitem.h"
#include "pathvw.h"
#include "agendoc.h"
#include "shape.h"
#include "serhelp.h"

static const UINT CWindowInfoSchema = 0;
IMPLEMENT_SERIAL( CWindowInfo, CObject, CWindowInfoSchema)

static const UINT CPathwayItemSchema = 0;
IMPLEMENT_SERIAL( CPathwayItem, CObject, CPathwayItemSchema)

static const UINT CPathwayToolSchema = 0;
IMPLEMENT_SERIAL( CPathwayTool, CPathwayItem, CPathwayToolSchema)

#ifdef _DEBUG
undef THIS_FILE
static char BASED_CODE THIS_FILE[] = __FILE__;
endif define new DEBUG_NEW
///////// CLASS CWindowInfo /////////////////////
CWindowInfo::CWindowInfo()
{
  m_status = UNSET;
  m_ScrollPt = CPoint(0,0);
}
BOOL CWindowInfo::WinInfoSet()
{
  if ( m_status == UNSET )
    return FALSE;
  else
    return TRUE;
} void CWindowInfo::WinInfoUnSet()
{
  m_status = UNSET;
```

55

```
}

WINDOWPLACEMENT* CWindowInfo::GetWindowPlacement()
{
  return &m_wp;
} const CPoint& CWindowInfo::GetWindowScrollPosition()
{
  return m_ScrollPt;
} void CWindowInfo::SetWindowScrollPosition(const CPoint& aScrollPt)
{
  m_ScrollPt = aScrollPt;
} void CWindowInfo::SetWindowPlacement(const WINDOWPLACEMENT &a_wp, const CPoint& aScrollPt)
{
  m_status = SET;
  m_wp = a_wp;
  m_ScrollPt = aScrollPt;
} void CWindowInfo::Serialize(CArchive& ar)
{

CObject::Serialize(ar);
  if ( ar.IsStoring()) {
    ar << (WORD) m_status;
    ar << m_wp.length;
    ar << m_wp.flags;
    ar << m_wp.showCmd;
    ar << m_wp.ptMinPosition.x;
    ar << m_wp.ptMinPosition.y;
    ar << m_wp.ptMaxPosition.x;
    ar << m_wp.ptMaxPosition.y;
    ar << m_wp.rcNormalPosition.left;
    ar << m_wp.rcNormalPosition.top;
    ar << m_wp.rcNormalPosition.right;
    ar << m_wp.rcNormalPosition.bottom;
    //ar << m_ScrollPt;
  } else {
    WORD tmp_word;
    ar >> tmp_word;
    m_status = (WindowInfoStatus) tmp_word;
    ar >> m_wp.length;
    ar >> m_wp.flags;
    ar >> m_wp.showCmd;

ar >> m_wp.ptMinPosition.x;
    ar >> m_wp.ptMinPosition.y;
    ar >> m_wp.ptMaxPosition.x;
```

```
    ar >> m_wp.ptMaxPosition.y;
    ar >> m_wp.rcNormalPosition.left;
    ar >> m_wp.rcNormalPosition.top;
    ar >> m_wp.rcNormalPosition.right;
    ar >> m_wp.rcNormalPosition.bottom;
    //ar >> m_ScrollPt;
  }

}

////////////////////////////////////////////////////////////

CMultiDocTemplate* CPathwayTool::m_pPathwayTemplate = NULL;

CMultiDocTemplate* CPathwayTool::CreateDocTemplate(CRuntimeClass* pDocClass,
  CRuntimeClass* pFrameClass)
{
  ASSERT(m_pPathwayTemplate == NULL);
  m_pPathwayTemplate = new CMultiDocTemplate(IDR_PATHWAY,
                          pDocClass,
                          pFrameClass,
                          RUNTIME_CLASS(CPathwayView));

return(m_pPathwayTemplate);
}

////////////////////////////////////////////////////////////
CPathwayItem::CPathwayItem(CPathMakerDoc* a_pDoc,
            ToolType a_ToolType)
      :
      m_sDescription(),
      m_MeetingStatus(MeetingNone),
      m_Complete(FALSE),
      m_aStrings(),
      m_ToolType(a_ToolType),
      m_pDoc(a_pDoc)
{
  m_pAgenda = new CAgendaInfo(CAgendaInfo::PathwayItem);
}

CPathwayItem::CPathwayItem(CPathMakerDoc* a_pDoc, CString a_sDescription,
          ToolType a_ToolType, MeetingStatus a_Status)
      :
      m_sDescription(a_sDescription),
      m_MeetingStatus(a_Status),
      m_Complete(FALSE),
      m_aStrings(),
      m_ToolType(a_ToolType),
      m_pDoc(a_pDoc)
{
  m_pAgenda = new CAgendaInfo(CAgendaInfo::PathwayItem);
}
```

```
CPathwayItem::~CPathwayItem() {
    // The string memory is automatically freed
    m_aStrings.RemoveAll();

int nCount = m_FontAttribArray.GetSize();
    while (nCount-- > 0) {
      delete (m_FontAttribArray.GetAt(0));  // Remove the contents of the item
      m_FontAttribArray.RemoveAt(0);
    }
  if ( m_pAgenda != NULL ) {
    delete m_pAgenda;
  }

} int CPathwayItem::AddString(CString& a_String, CShapeView* pShapeView) {
  CPathMakerDoc* pDoc = pShapeView->GetDocument();
  ASSERT_VALID(pDoc);

pDoc->SetModifiedFlag();
  int nRet = m_aStrings.Add(a_String);
  pDoc->UpdateAllViews(pShapeView, MAKELONG(HINT_ADD_STRING, nRet), this);
  return(nRet);
} void CPathwayItem::InsertStringAt(int a_nIndex, CString& a_String,
            CShapeView* pShapeView) {
  CPathMakerDoc* pDoc = pShapeView->GetDocument();
  ASSERT_VALID(pDoc);

pDoc->SetModifiedFlag();
  m_aStrings.InsertAt(a_nIndex, a_String);
  pDoc->UpdateAllViews(pShapeView, MAKELONG(HINT_INSERT_STRING_AT, a_nIndex),
               this);
} void CPathwayItem::RemoveStringAt(int a_nIndex, CShapeView* pShapeView) {
  CPathMakerDoc* pDoc = pShapeView->GetDocument();
  ASSERT_VALID(pDoc);
  pDoc->SetModifiedFlag();
  m_aStrings.RemoveAt(a_nIndex);
  pDoc->UpdateAllViews(pShapeView, MAKELONG(HINT_REMOVE_STRING_AT, a_nIndex),
               this);
} void CPathwayItem::SetStringAt(int a_nIndex, CString& a_String,
                CShapeView* pShapeView) {
  if (m_aStrings.GetAt(a_nIndex) != a_String) {
    CPathMakerDoc* pDoc = pShapeView->GetDocument();
    ASSERT_VALID(pDoc);

pDoc->SetModifiedFlag();
    m_aStrings.SetAt(a_nIndex, a_String);
```

58

```
    pDoc->UpdateAllViews(pShapeView, MAKELONG(HINT_SET_STRING_AT, a_nIndex),
            this);
  }
} void CPathwayItem::SetItemDescription(CString a_sString, CPathMakerDoc* pDoc)
{
  if (m_sDescription != a_sString) {
    m_sDescription = a_sString;
    if (pDoc != NULL) {
      pDoc->SetModifiedFlag();
      pDoc->UpdateAllViews(NULL, MAKELONG(HINT_PATHWAY_SET_ITEM_DESCRIPTION,
                    0), this);
    }
  }
} void CPathwayItem::SetMeetingStatus(MeetingStatus a_Status,
                    CPathMakerDoc* pDoc) {
  if (m_MeetingStatus != a_Status) {
    m_MeetingStatus = a_Status;
    if (pDoc != NULL) {
      pDoc->SetModifiedFlag();
      pDoc->UpdateAllViews(NULL, MAKELONG(HINT_PATHWAY_SET_MEETING_STATUS,
                    (WORD) a_Status), this);
    }
  }
} void CPathwayItem::SetComplete(BOOL a_bFlag, CPathMakerDoc* pDoc) {
  if (m_Complete = a_bFlag) {
    m_Complete = a_bFlag;
    if (pDoc != NULL) {
      pDoc->SetModifiedFlag();
      pDoc->UpdateAllViews(NULL, MAKELONG(HINT_PATHWAY_SET_COMPLETE,
                    (WORD) a_bFlag), this);
    }
  }
} void CPathwayItem::Serialize(CArchive& ar)
{
  CPathMakerDoc* pDoc = (CPathMakerDoc*)ar.m_pDocument;
  if ( ! pDoc->IsKindOf(RUNTIME_CLASS(CPathMakerDoc)) ) {
    ASSERT(0);
    return;
  }
  CPathMakerDoc::PathMakrFileType ePathType = pDoc->GetPathMakrFileType();

CWindowInfo::Serialize(ar);
  // Serialize only if a pathway
  if ( ePathType == CPathMakerDoc::Template ) {
    m_aStrings.RemoveAll();
```

```
    }
    m_aStrings.Serialize(ar);
    m_FontAttribArray.Serialize(ar);

// Set the agenda desc to blank for templates
    if ( ePathType == CPathMakerDoc::Template ) {
      m_pAgenda->SetPathwayDesc("");
    }
    m_pAgenda->Serialize(ar);

if ( ar.IsStoring()) {
      ar << m_sDescription;
      ar << (WORD) m_MeetingStatus;
      // Set the completion status for template item to FALSE;
      if ( ePathType == CPathMakerDoc::Template ) {
        m_Complete = FALSE;
      }
      ar << m_Complete;
      ar << (WORD) m_ToolType;

} else {
      WORD temp;
      ar >> m_sDescription;
      ar >> temp;
      m_MeetingStatus = (MeetingStatus) temp;
      ar >> m_Complete;
      ar >> temp;
      m_ToolType = (ToolType) temp;
      m_pDoc = (CPathMakerDoc *) ar.m_pDocument;

}
} void CPathwayItem::DumpFonts()
{
  int nCount = m_FontAttribArray.GetSize();
  while (nCount-- > 0) {
    delete (m_FontAttribArray.GetAt(0));  // Remove the contents of the item
    m_FontAttribArray.RemoveAt(0);
  }

}
CAgendaInfo* CPathwayItem::GetAgendaInfo()
{
  m_pAgenda->SetPathwayDesc(m_sDescription);
  // Need to delete the bitmap before reloading...
  //m_pAgenda->GetBitmap()->LoadBitmap(this->GetPathwayButtonID());
  return m_pAgenda;
} void CPathwayTool::Serialize(CArchive& ar)
{
    CPathwayItem::Serialize(ar);
}
```

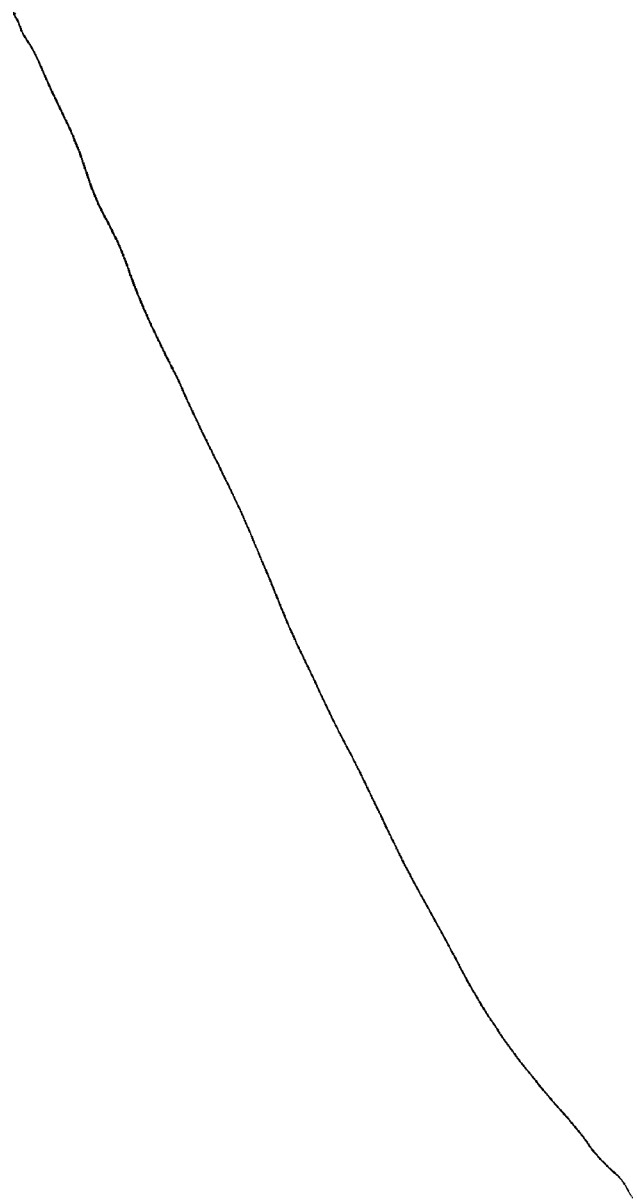

61

Pathfrm.h

*Defines the Pathway frame window.*

```
#ifndef _PATHFRM_H_
#define _PATHFRM_H_
// pathfrm.h : header file
//
/******************************************************************
 *
 *****************************************************************/

/////////////////////////////////////////////////////////////
// CPathMakerFrame frame class CPathMakerFrame : public CMDIChildWnd
{
        DECLARE_DYNCREATE(CPathMakerFrame)
protected:
        CPathMakerFrame();      // protected constructor used by dynamic creation // Attributes
public:

// Operations
public:
  void OnUpdateFrameTitle(BOOL bAddToTitle);

// Overrides
        // ClassWizard generated virtual function overrides
        //{{AFX_VIRTUAL(CPathMakerFrame)
        protected:
        virtual BOOL PreCreateWindow(CREATESTRUCT& cs);
        //}}AFX_VIRTUAL // Implementation
protected:
        virtual ~CPathMakerFrame();

// Generated message map functions
        //{{AFX_MSG(CPathMakerFrame)
        afx_msg void OnSysCommand(UINT nID, LPARAM lParam);
        //}}AFX_MSG
        DECLARE_MESSAGE_MAP()
};

/////////////////////////////////////////////////////////////
#endif // _PATHFRM_H_
```

Pathfrm.cpp

Implements the Pathway frame window.

```cpp
#include "stdafx.h"
include "pathmakr.h"
#include "shape.h"
#include "pathfrm.h"
#include "filevw.h"

#ifdef _DEBUG
undef THIS_FILE
static char BASED_CODE THIS_FILE[] = __FILE__;
endif /////////////////////////////////////////////////////////////////
// CPathMakerFrame IMPLEMENT_DYNCREATE(CPathMakerFrame, CMDIChildWnd)

CPathMakerFrame::CPathMakerFrame()
{
}

CPathMakerFrame::~CPathMakerFrame()
{
}

BEGIN_MESSAGE_MAP(CPathMakerFrame, CMDIChildWnd)
        //{{AFX_MSG_MAP(CPathMakerFrame)
        ON_WM_SYSCOMMAND()
        //}}AFX_MSG_MAP
END_MESSAGE_MAP()

/////////////////////////////////////////////////////////////////
// CPathMakerFrame message handlers BOOL CPathMakerFrame::PreCreateWindow(CREATESTRUCT& cs)
{
                // By turning off the default MFC-defined FWS_ADDTOTITLE style,
        // the framework will use first string in the document template
        // STRINGTABLE resource instead of the document name.

// SOUP cs.style &= ~(LONG)FWS_ADDTOTITLE;

// Have to determine wether or not this is the first window.
// If it is, set the WS_MAXIMIZE bit, otherwise, don't change it.

cs.style |= WS_MAXIMIZE;
```

63

```
        return CMDIChildWnd::PreCreateWindow(cs);
} void CPathMakerFrame::OnSysCommand(UINT nID, LPARAM lParam)
{
        // This should be eliminated
  if (nID == ID_COMPILE) {
            TRACE("In compile code\n");
    CFileView* pFileView = (CFileView*) this->GetActiveView();
    pFileView->CompileOpenFile();
        }

CMDIChildWnd::OnSysCommand(nID, lParam);
} void CPathMakerFrame::OnUpdateFrameTitle(BOOL bAddToTitle)
{
  CMDIChildWnd::OnUpdateFrameTitle(bAddToTitle);
  CString sTitle;
  CDocument* pDocument = GetActiveDocument();
  if ( pDocument == NULL ) { // Can't do much if the doc is empty
    return;
  }
  CString sName = pDocument->GetPathName();
  if ( sName.IsEmpty() ){
    sName = pDocument->GetTitle();
  }
  sTitle.Format("Project Pathway:%s",sName);
  this->SetWindowText((LPCTSTR)sTitle);
}
```

Pathwv.h

Defines the Pathway window.

```
#ifndef _PATHVW_H_
#define _PATHVW_H_

/******************************************************************
 *
 * $Log: /Pathmakr/Source/Pathmakr/pathvw.h $
 *
 * 9     9/18/95 9:28a Soup
 * Applied M.Mills changes.
 *
 * 8     9/18/95 12:03a Soup
 * B1 Changes...File format with rev and scroll position.
 *
 * 7     9/16/95 12:07p Soup
 * B1 Update including revamped includes, et. al.
 *
 * 6     8/28/95 4:00p Soup
 * B1 Updates. Bug fixes etc.
 *
 * 5     8/07/95 1:25p Soup
 * Agenda/Printing/Etc.
 *
 * 4     4/13/95 2:17p Soup
 * Added Meeting Inclusion
 *
 * 3     3/20/95 12:29p Johna
 * Added Cause & Effect.
 * Removed default case in OnUpdate().
 *
 * 2     3/17/95 3:32p Soup
 * Brainstorm Cut Copy Paste First Pass (Node Paste not working)
 *
 * 1     1/26/95 6:12p Johna
 * Initial Check In.
 *
 *****************************************************************/ class CPathwayView;

include "shape.h"
//#include "pathlb.h"
//#include "filedoc.h"
// pathway.h : header file
//
class CPathwayListBox;
enum ToolType;

typedef CMap<UINT,UINT,CBitmap*,CBitmap*&> CMapUINTToCBitmapPtr;
```

////////////////////////////////////////////////////////////////
// CPathwayView view

```
class CPathwayView : public CShapeView
{
// JTC
protected:
  void CopySelectedToClip();
  void DeleteSelected();

protected:
        CPathwayView();         // protected constructor used by dynamic creation
        DECLARE_DYNCREATE(CPathwayView)
    virtual UINT GetSlideFile();

// Attributes
public:

// Operations
public:

// Overrides
        // ClassWizard generated virtual function overrides
        //{{AFX_VIRTUAL(CPathwayView)
        public:
        virtual void OnPrepareDC(CDC* pDC, CPrintInfo* pInfo = NULL);
        protected:
        virtual void OnDraw(CDC* pDC);      // overridden to draw this view
        virtual void OnInitialUpdate();     // first time after construct
        virtual void OnActivateView(BOOL bActivate, CView* pActivateView, CView*
pDeactiveView);
        virtual void OnUpdate(CView* pSender, LPARAM lHint, CObject* pHint);
        virtual void OnPrint(CDC* pDC, CPrintInfo* pInfo);
        virtual BOOL OnPreparePrinting(CPrintInfo* pInfo);
        virtual void OnEndPrinting(CDC* pDC, CPrintInfo* pInfo);
        virtual void OnBeginPrinting(CDC* pDC, CPrintInfo* pInfo);

//}}AFX_VIRTUAL virtual void SetCaptureShape(CShape* pShape, const CRect& Rect,
                    const CPoint& Point);
// Implementation public:
  CPathwayListBox* GetPtrListBox() {
    return(m_pListBox);
  }
  int GetLBCaretIndex();
  CBitmap* GetBitmapPtr(UINT unButtonID);
  virtual void OnRightButtonMenu();
protected:
```

```
        virtual ~CPathwayView();
#ifdef _DEBUG
        virtual void AssertValid() const;
        virtual void Dump(CDumpContext& dc) const;
endif
    void AddToolToPathway(CPathwayItem* a_pPathwayItem, int nSTFileID = 0,BOOL a_bEdit=TRUE);
    BOOL IsCuttable();
    void ChangePathwayFont(ToolType a_ToolType);

// Generated message map functions
        //{{AFX_MSG(CPathwayView)
        afx_msg void OnPathwayAddmeeting();
        afx_msg void OnUpdatePathwayAddmeeting(CCmdUI* pCmdUI);
        afx_msg void OnPathwayAddslideshow();
        afx_msg void OnUpdatePathwayAddslideshow(CCmdUI* pCmdUI);
        afx_msg void OnPathwayAddform();
        afx_msg void OnUpdatePathwayAddform(CCmdUI* pCmdUI);
        afx_msg void OnPathwayAddstage();
        afx_msg void OnUpdatePathwayAddstage(CCmdUI* pCmdUI);
        afx_msg void OnPathwayAddforcefield();
        afx_msg void OnUpdatePathwayAddforcefield(CCmdUI* pCmdUI);
        afx_msg void OnPathwayAddbrainstorm();
        afx_msg void OnUpdatePathwayAddbrainstorm(CCmdUI* pCmdUI);
        afx_msg void OnSize(UINT nType, int cx, int cy);
        afx_msg void OnSetFocus(CWnd* pOldWnd);
        afx_msg void OnEditCopy();
        afx_msg void OnUpdateEditCopy(CCmdUI* pCmdUI);
        afx_msg void OnEditCut();
        afx_msg void OnUpdateEditCut(CCmdUI* pCmdUI);
        afx_msg void OnEditDelete();
        afx_msg void OnUpdateEditDelete(CCmdUI* pCmdUI);
        afx_msg void OnEditPaste();
        afx_msg void OnUpdateEditPaste(CCmdUI* pCmdUI);
        afx_msg void OnViewProjectfont();
        afx_msg void OnViewMeetingfont();
        afx_msg void OnViewStagefonts();
        afx_msg void OnViewStepfonts();
        afx_msg void OnPathwayEditdescription();
        afx_msg void OnDestroy();
        afx_msg void OnPathwayAddcauseeffect();
        afx_msg void OnUpdatePathwayAddcauseeffect(CCmdUI* pCmdUI);
        afx_msg void OnPathwayAddconsensusbuilder();
        afx_msg void OnUpdatePathwayAddconsensusbuilder(CCmdUI* pCmdUI);
        afx_msg void OnPathwayAdddataanalyst();
        afx_msg void OnUpdatePathwayAdddataanalyst(CCmdUI* pCmdUI);
        afx_msg void OnPathwayAddflowchart();
        afx_msg void OnUpdatePathwayAddflowchart(CCmdUI* pCmdUI);
        afx_msg void OnPathpuFont();
        afx_msg void OnUpdatePathpuFont(CCmdUI* pCmdUI);
        //}}AFX_MSG
        DECLARE_MESSAGE_MAP()
private:
    CPathwayListBox* m_pListBox;
    CMapUINTToCBitmapPtr* m_pMapList;
```

67

```
};
/////////////////////////////////////////////////////////////
#endif  // _PATHVW_H_
```

Pathwv.cpp

Implements the Pathway window

```
/********************************************************************
 *
 * $Log: /Pathmakr/Source/Pathmakr/pathvw.cpp $
 *
 * 20    12/19/95 10:18a Soup
 * DA update w/ ifdef graphics stuff
 *
 * 19    11/29/95 10:00a Soup
 * VC++ 4.0 conversion
 *
 * 18    11/07/95 10:50a Anthony
 * Checkin some initial Consensus Builder stuff
 *
 * 17    9/25/95 4:16p Soup
 * Final B1 update. Turned printing off, fixed meeting CCP, etc.
 *
 * 16    9/18/95 9:27a Soup
 * Applied M.Mills changes.
 *
 * 15    9/18/95 12:02a Soup
 * B1 Changes...File format with rev and scroll position.
 *
 * 14    9/16/95 12:06p Soup
 * B1 Update including revamped includes, et. al.
 *
 * 13    9/12/95 8:51a Soup
 * B1 fixes
 *
 * 12    9/08/95 6:13p Soup
 * B1 Bug Update
 *
 * 11    8/31/95 11:29a Soup
 * B1 Updates, Flow CCP
 *
 * 10    8/28/95 3:59p Soup
 * B1 Updates. Bug fixes etc.
 *
 * 9     8/07/95 1:25p Soup
 * Agenda/Printing/Etc.
 *
 * 8     4/13/95 2:17p Soup
 * Added Meeting Inclusion
 *
 * 7     3/24/95 10:15a Johna
 * Added Consensus Builder, Data Analyst and, Flow Chart.
 *
 * 6     3/20/95 12:29p Johna
 * Added Cause & Effect.
```

69

```
* Removed default case in OnUpdate().
*
* 5    3/17/95 3:32p Soup
* Brainstorm Cut Copy Paste First Pass (Node Paste not working)
*
* 4    2/16/95 1:52p Johna
* Added Brainstorm to the system.
*
* 3    2/16/95 12:08p Soup
* Pathway and Form CCP
*
* 2    1/27/95 9:22a Johna
* Set default description of tool in constructor not when added to the
* pathway.
*
* 1    1/26/95 6:12p Johna
* Initial Check In.
*
*******************************************************************/

// pathway.cpp : implementation file
// include "stdafx.h"
include "pathmakr.h"
#include "pathvw.h"
#include "pathlb.h"

#include "pathccp.h"

#include "pathitem.h"
#include "slidedoc.h"
#include "formdoc.h"
#include "forcedoc.h"
#include "meetdoc.h"
#include "stagedoc.h"
#include "braindoc.h"
#include "causedoc.h"
#include "flowdoc.h"
#include "condoc.h"
#include "datadoc.h"

#include "filevw.h"

#include "toolbar.h"

#include "helpcard.h"

// JTC
static UINT sg_PathwayClipFormat =
        (UINT)::RegisterClipboardFormat(_T("Pathway Native Format"));
// end JTC ifdef _DEBUG
```

70

```
#undef THIS_FILE
static char BASED_CODE THIS_FILE[] = __FILE__;
endif const UINT PathwayButtons[] =
{
  ID_FILE_SAVE,
  ID_FILE_PRINT,
    ID_SEPARATOR,
  ID_EDIT_CUT,
  ID_EDIT_COPY,
  ID_EDIT_PASTE,
    ID_SEPARATOR,
    ID_SEPARATOR,
  ID_PATHWAY_ADDMEETING,
    ID_SEPARATOR,
  ID_PATHWAY_ADDSTAGE,
    ID_SEPARATOR,
  ID_PATHWAY_ADDFORM,
  ID_PATHWAY_ADDFLOWCHART,
  ID_PATHWAY_ADDBRAINSTORM,
  ID_PATHWAY_ADDCAUSEEFFECT,
  ID_PATHWAY_ADDFORCEFIELD,
  ID_PATHWAY_ADDCONSENSUSBUILDER,
  ID_PATHWAY_ADDDATAANALYST,
  ID_PATHWAY_ADDSLIDESHOW,
    ID_SEPARATOR,
    ID_SEPARATOR,
  ID_HELP_SLIDESVIEWER,
  ID_CONTEXT_HELP,
};

class CPathMakerPathwayToolbar : public CPathMakerToolbar
{
  public:
    virtual PathMakerToolbar_p GetToolbar() const {
      return (&m_PathMakerToolbar);
    } private:
    static PathMakerToolbar_t m_PathMakerToolbar;
};

PathMakerToolbar_t CPathMakerPathwayToolbar::m_PathMakerToolbar =
{
  IDR_PATHWAY,
  sizeof(PathwayButtons)/sizeof(*PathwayButtons),
  PathwayButtons,
};

CPathMakerPathwayToolbar PathwayToolbar;

//////////////////////////////////////////////////////////////
// CPathwayView
```

71

```
IMPLEMENT_DYNCREATE(CPathwayView, CShapeView)

#define new DEBUG_NEW

CPathwayView::CPathwayView() : CShapeView()
{
  m_pMapList = new CMapUINTToCBitmapPtr();

SetPathwayItem((CPathwayItem*) 0xFFFFFFFF);

m_pListBox = new CPathwayListBox;
}

CPathwayView::~CPathwayView()
{
  POSITION position;
  UINT unID;
  CBitmap* pBitmap;

position = m_pMapList->GetStartPosition();
  while (position) {
    m_pMapList->GetNextAssoc(position, unID, pBitmap);
    delete(pBitmap);
  }
  m_pMapList->RemoveAll();
  delete m_pMapList;
  delete m_pListBox;
}

CBitmap* CPathwayView::GetBitmapPtr(UINT unButtonID)
{
  CBitmap* pBitmap = NULL;
  if (!m_pMapList->Lookup(unButtonID, pBitmap)) {
    pBitmap = new CBitmap;
    if (pBitmap->LoadBitmap(unButtonID)) {
      m_pMapList->SetAt(unButtonID, pBitmap);
    } else {
      delete pBitmap;
      pBitmap = NULL;
      TRACE("Button %d not found in resource file\n", unButtonID);
      ASSERT(0);
    }
  }
  return(pBitmap);
} void CPathwayView::SetCaptureShape(CShape* pShape, const CRect& Rect,
                   const CPoint& Point)
{
  ASSERT(!m_pCaptureShape);
  m_pCaptureShape = pShape;
  m_pListBox->SetCapture();
  SetCaptureRect(Rect);
```

72

```
    SetCapturePoint(Point);
    m_pCaptureShape->OnSetCapture(Point);
}

BEGIN_MESSAGE_MAP(CPathwayView, CShapeView)
        //{{AFX_MSG_MAP(CPathwayView)
        ON_COMMAND(ID_PATHWAY_ADDMEETING, OnPathwayAddmeeting)
        ON_UPDATE_COMMAND_UI(ID_PATHWAY_ADDMEETING,
OnUpdatePathwayAddmeeting)
        ON_COMMAND(ID_PATHWAY_ADDSLIDESHOW, OnPathwayAddslideshow)
        ON_UPDATE_COMMAND_UI(ID_PATHWAY_ADDSLIDESHOW,
OnUpdatePathwayAddslideshow)
        ON_COMMAND(ID_PATHWAY_ADDFORM, OnPathwayAddform)
        ON_UPDATE_COMMAND_UI(ID_PATHWAY_ADDFORM, OnUpdatePathwayAddform)
        ON_COMMAND(ID_PATHWAY_ADDSTAGE, OnPathwayAddstage)
        ON_UPDATE_COMMAND_UI(ID_PATHWAY_ADDSTAGE, OnUpdatePathwayAddstage)
        ON_COMMAND(ID_PATHWAY_ADDFORCEFIELD, OnPathwayAddforcefield)
        ON_UPDATE_COMMAND_UI(ID_PATHWAY_ADDFORCEFIELD,
OnUpdatePathwayAddforcefield)
        ON_COMMAND(ID_PATHWAY_ADDBRAINSTORM, OnPathwayAddbrainstorm)
        ON_UPDATE_COMMAND_UI(ID_PATHWAY_ADDBRAINSTORM,
OnUpdatePathwayAddbrainstorm)
        ON_WM_SIZE()
        ON_WM_SETFOCUS()
        ON_COMMAND(ID_EDIT_COPY, OnEditCopy)
        ON_UPDATE_COMMAND_UI(ID_EDIT_COPY, OnUpdateEditCopy)
        ON_COMMAND(ID_EDIT_CUT, OnEditCut)
        ON_UPDATE_COMMAND_UI(ID_EDIT_CUT, OnUpdateEditCut)
        ON_COMMAND(ID_EDIT_DELETE, OnEditDelete)
        ON_UPDATE_COMMAND_UI(ID_EDIT_DELETE, OnUpdateEditDelete)
        ON_COMMAND(ID_EDIT_PASTE, OnEditPaste)
        ON_UPDATE_COMMAND_UI(ID_EDIT_PASTE, OnUpdateEditPaste)
        ON_COMMAND(ID_VIEW_PROJECTFONT, OnViewProjectfont)
        ON_COMMAND(ID_VIEW_MEETINGFONT, OnViewMeetingfont)
        ON_COMMAND(ID_VIEW_STAGEFONTS, OnViewStagefonts)
        ON_COMMAND(ID_VIEW_STEPFONTS, OnViewStepfonts)
        ON_COMMAND(ID_PATHWAY_EDITDESCRIPTION, OnPathwayEditdescription)
        ON_WM_DESTROY()
        ON_COMMAND(ID_PATHWAY_ADDCAUSEEFFECT, OnPathwayAddcauseeffect)
        ON_UPDATE_COMMAND_UI(ID_PATHWAY_ADDCAUSEEFFECT,
OnUpdatePathwayAddcauseeffect)
        ON_COMMAND(ID_PATHWAY_ADDCONSENSUSBUILDER,
OnPathwayAddconsensusbuilder)
        ON_UPDATE_COMMAND_UI(ID_PATHWAY_ADDCONSENSUSBUILDER,
OnUpdatePathwayAddconsensusbuilder)
        ON_COMMAND(ID_PATHWAY_ADDDATAANALYST, OnPathwayAdddataanalyst)
        ON_UPDATE_COMMAND_UI(ID_PATHWAY_ADDDATAANALYST,
OnUpdatePathwayAdddataanalyst)
        ON_COMMAND(ID_PATHWAY_ADDFLOWCHART, OnPathwayAddflowchart)
        ON_UPDATE_COMMAND_UI(ID_PATHWAY_ADDFLOWCHART,
OnUpdatePathwayAddflowchart)
        ON_COMMAND(ID_PATHPU_FONT, OnPathpuFont)
        ON_UPDATE_COMMAND_UI(ID_PATHPU_FONT, OnUpdatePathpuFont)
        //}}AFX_MSG_MAP
```

73

END_MESSAGE_MAP()

///////////////////////////////////////////////////////////
// CPathwayView drawing

```
void CPathwayView::OnInitialUpdate()
{
        CShapeView::OnInitialUpdate();
  CPathMakerDoc* pDoc = GetDocument();

m_pRootShape = new CRootShape(this);
  m_pFontList = new CFontList(this,&(pDoc->m_FontAttribArray));

if (pDoc->m_FontAttribArray.GetSize() == 0 ) {
    int nFontID;

nFontID = m_pFontList->CreateFont(this,IDS_SYSTEM_FONT,NULL);
    ASSERT(0 == nFontID);

nFontID = m_pFontList->CreateFont(this, IDS_PROJECT_FONT,NULL);
    ASSERT(ProjectLine == nFontID);

nFontID = m_pFontList->CreateFont(this, IDS_MEETING_FONT,NULL);
    ASSERT(MeetingLine == nFontID);

nFontID = m_pFontList->CreateFont(this, IDS_STAGE_FONT,NULL);
    ASSERT(StageLine == nFontID);

nFontID = m_pFontList->CreateFont(this, IDS_STEP_FONT,NULL);
    ASSERT(ToolLine == nFontID);
  }

CString String = pDoc->GetPathName();
  if (String == "") {
    String = pDoc->GetTitle();
  }
  String.MakeUpper();
  GetParent()->SetWindowText("Project Pathway: " + String);

CRect Rect;
  GetClientRect(&Rect);
  if (m_pListBox->Create (WS_CHILD | WS_VSCROLL | LBS_NOTIFY | LBS_EXTENDEDSEL |
              LBS_NOINTEGRALHEIGHT | LBS_OWNERDRAWVARIABLE, Rect,
              this, 31415)) {
    int nCount = pDoc->GetPathwayItemCount();
    CRootShape* pRoot = GetRootShape();
    for (int nIndex = 0; nIndex < nCount; nIndex++) {
      m_pListBox->InsertString(nIndex, (LPCSTR) new CPathwayShape(
        pDoc->GetPathwayItem(nIndex), pRoot));
    }
    m_pListBox->SetSel(-1, FALSE);
    m_pListBox->SetSel(nCount - 1, TRUE);
    m_pListBox->SetCaretIndex(nCount - 1);
```

74

```
    m_pListBox->ShowWindow(SW_SHOW);
  }
  pDoc->SetModifiedFlag(FALSE);
  m_pListBox->SetCaretIndex(pDoc->GetLBCaretIndex());
  m_pListBox->SetSel(-1,FALSE);
  m_pListBox->SetSel(pDoc->GetLBCaretIndex(),TRUE);
  CPoint pt = pDoc->GetWindowInfo()->GetWindowScrollPosition();
  this->ScrollToPosition(pt);
} int CPathwayView::GetLBCaretIndex()
{
  return m_pListBox->GetCaretIndex();
} void CPathwayView::OnDraw(CDC* pDC)
{
}

//////////////////////////////////////////////////////////
// CPathwayView diagnostics ifdef _DEBUG
void CPathwayView::AssertValid() const
{
        CShapeView::AssertValid();
} void CPathwayView::Dump(CDumpContext& dc) const
{
        CShapeView::Dump(dc);
}
endif //_DEBUG void CPathwayView::ChangePathwayFont(ToolType a_ToolType)
{
  if (GetFontList()->ChangeFontDialog(this, a_ToolType)) {
    StopEditing();
    int nFontHeight = GetFontHeight(a_ToolType);
    CPathwayListBox* pListBox = GetPtrListBox();
    int nCount = pListBox->GetCount();
    CPathwayShape* pShape;
    BOOL bChanged = FALSE;
    int nNewHeight;
    for (int nIndex = 0; nIndex < nCount; nIndex++) {
      pShape = pListBox->GetPathwayShape(nIndex);
      if (pShape->GetPathwayItem()->GetToolType() == a_ToolType) {
        bChanged = TRUE;
        nNewHeight = pShape->GetLineHeight(nFontHeight);
        pShape->SetHeight(nNewHeight);
        pListBox->SetItemHeight(nIndex, nNewHeight);
      }
    }
    if (bChanged) {
```

```
      pListBox->Invalidate();
    }
  }
}

///////////////////////////////////////////////////////////////
// CPathwayView message handlers void CPathwayView::OnActivateView(BOOL bActivate, CView* pActivateView, CView*
pDeactiveView)
{
        CShapeView::OnActivateView(bActivate, pActivateView, pDeactiveView);
    PathwayToolbar.OnActivateView(bActivate, pActivateView, pDeactiveView);
    if (bActivate) {
      CFrameWnd* pMainFrame = this->GetTopLevelFrame()->GetTopLevelFrame();
      ASSERT(pMainFrame!=NULL);
      pMainFrame->PostMessage(WM_USER_SHOW_HELP_CARD,CHelpCard::Pathway);
    }
} void CPathwayView::OnUpdate(CView* pSender, LPARAM lHint, CObject* pHint)
{
  if (pHint == NULL) {
    CPathMakerDoc* pDoc = GetDocument();
    switch (LOWORD(lHint)) {
      case HINT_PATHWAY_ADD_TOOL:
      {
        if (m_pListBox->m_hWnd) {
          int nIndex = HIWORD(lHint);   // HIWORD is index of new tool
          m_pListBox->InsertString(nIndex, (LPCSTR) new CPathwayShape(
            pDoc->GetPathwayItem(nIndex), GetRootShape()));
          m_pListBox->UpdateWindow();
          m_pListBox->SetSel(-1, FALSE);
          m_pListBox->SetSel(nIndex, TRUE);
          m_pListBox->SetCaretIndex(nIndex);
        }
        break;
      }
      case HINT_PATHWAY_DELETE_TOOL:
      {
        if (m_pListBox->m_hWnd) { int nIndex = HIWORD(lHint);   // HIWORD is index of new tool
          CShape* pShape = (CShape*) m_pListBox->GetItemData(nIndex);
          m_pListBox->DeleteString(nIndex);
          m_pListBox->SetSel(-1, FALSE);

pShape->RemoveFromParent();

delete pShape;
        }
        break;
      }
```

```
      default:
         CShapeView::OnUpdate(pSender, lHint, pHint);
         break;
      }
   } else {
     CShapeView::OnUpdate(pSender, lHint, pHint);
   }
} void CPathwayView::OnSize(UINT nType, int cx, int cy)
{
         CShapeView::OnSize(nType, cx, cy);

if ((m_pListBox->m_hWnd) && (nType != SIZE_MINIMIZED)) {
    m_pListBox->MoveWindow(0, 0, cx, cy);
  }
} void CPathwayView::OnSetFocus(CWnd* pOldWnd)
{
  if ( m_pFocusShape != NULL ) {
    CShapeView::OnSetFocus(pOldWnd);
    return;
  }
  if (m_pListBox->m_hWnd) {
    m_pListBox->SetFocus();
  }
}

BOOL CPathwayView::IsCuttable()
{
  return (!((Editing()) || (m_pListBox->GetSelCount() < 1)));
}

//
// Proc:CPathwayView::CopySelectedToClip()
//
// Notes:
//     Meeting make copying trick for two reasons. First, Say you have a meeting
// with 5 items in it. If you select the meeting, the second item in the meeting, and the
// fourth item in the meeting, the new meeting should have only 2 items in it the second
// item having the closeing bracket. We handle this by set the meeting status to the value
// that should be copied, and then reset it after we are finished copying.
// The second problem comes from the meeting agenda. In the meetingtool there exists
// an array that handles the mixing of manual steps and pathway tools agenda. Basicly
// the array in the meetingtool point to the tool's agenda class for non manual steps, and IS
// the agenda class for manual steps. There is a word document call MeetingAgenda that
// should be in the design section of source control that explains this better. (with pictures)

void CPathwayView::CopySelectedToClip()
{
  int count = m_pListBox->GetSelCount();
  LPINT selected = new int[count];
```

77

```
LPINT meetingStatus = new int[count]; // record the meeting stats
if ( m_pListBox->GetSelItems(count,selected) != count ) {
  // Throw an error
  delete [] selected;
  delete [] meetingStatus;
  return;
}

// Now, copy each selected item into an array
CObArray c_ob_copy_array;
CPathMakerDoc* pDoc = GetDocument();
CPathwayItem* pPathItem;
int nMeetingEnd=-1;

CObArray AgendaArray; // We have to do some tricky stuff we the meeting
                     // tool so, we'll make a copy of it and then destory
                     // it later. See above for details.
int nAgendMeetingEnd;

int nIndex;

CMeetingTool* pMeetingTool; // = (CMeetingTool*) pDoc->GetPathwayItem(nMeetingIndex);

// Remember not to copy the project information
for(nIndex=selected[0]==0?1:0;nIndex<count;++nIndex) {
    pPathItem = pDoc->GetPathwayItem(selected[nIndex]);
    ASSERT(pPathItem!=NULL);
    meetingStatus[nIndex] = pPathItem->GetMeetingStatus();
    switch(meetingStatus[nIndex]) {
      case MeetingStart:
        nAgendMeetingEnd = nMeetingEnd = pDoc->GetMeetingEnd(selected[nIndex]);
        if (nIndex+1<count) { // do we have at least one more item
          if (selected[nIndex+1] > nMeetingEnd) {
            pPathItem->SetMeetingStatus(MeetingOnly,pDoc);
            nMeetingEnd=-1;
          }
        } else {
          pPathItem->SetMeetingStatus(MeetingOnly,pDoc);
          nMeetingEnd=-1;
        }
        { // To avoid errors
        // Lets get rid of the agenda steps in the meeting for
        // tools not selected to copy.
          CObArray* pObArray = new CObArray;
          AgendaArray.Add(pObArray);
          pMeetingTool = (CMeetingTool*)pPathItem;
          pMeetingTool->DuplicateAgendaArray(*pObArray);

// Now Get rid of all agenda item that aren't selected.
          int nSelIdx = count-1;
          int nMeetingIdx = selected[nIndex];
          int nItemIdx;
          for ( nItemIdx = nAgendMeetingEnd; nItemIdx > nMeetingIdx; nItemIdx--) {
            while ( selected[nSelIdx] > nItemIdx ) {
```

78

```
          nSelIdx--;
        }
        if ( selected[nSelIdx] == nItemIdx ) {
          nSelIdx--;
        } else {
          pMeetingTool->DeletePathwayMeetingItem(nItemIdx,FALSE);
        }
      }
      //pMeetingTool->PrintAgendaItems();
    } break;
  case MeetingMiddle:
    if (nMeetingEnd==-1) {
      pPathItem->SetMeetingStatus(MeetingNone,pDoc);
    } else {
      if (nIndex+1>=count) {
        pPathItem->SetMeetingStatus(MeetingPasteEnd,pDoc);
      } else {
        if (selected[nIndex+1] > nMeetingEnd ) {
          pPathItem->SetMeetingStatus(MeetingPasteEnd,pDoc);
          nMeetingEnd=-1;
        } else {
          pPathItem->SetMeetingStatus(MeetingPasteMiddle,pDoc);
        }
      }
    }
    break;
  case MeetingEnd:
    if (nMeetingEnd==-1) {
      pPathItem->SetMeetingStatus(MeetingNone,pDoc);
    }
    break;
  }
  c_ob_copy_array.Add(pPathItem);
}

CPathClip pathClip(GetDocument());
pathClip.Open();
pathClip.RegisterNativeFormat(sg_PathwayClipFormat,&c_ob_copy_array);
m_pRootShape->CopyToTextClipboard(&pathClip,FALSE);
pathClip.Close();

// reset the meetingstatus
int nAgendaIndex=0;
for(nIndex=selected[0]==0?1:0;nIndex<count;++nIndex) {
  pPathItem = pDoc->GetPathwayItem(selected[nIndex]);
  ASSERT(pPathItem!=NULL);
  pPathItem->SetMeetingStatus((MeetingStatus)meetingStatus[nIndex],pDoc);
  if (pPathItem->GetMeetingStatus() == MeetingStart ) {
    ((CMeetingTool*)pPathItem)-
>AssignAgendaArray((CObArray*)AgendaArray.GetAt(nAgendaIndex++));
    ((CMeetingTool*)pPathItem)->ResetPathwayOffSets(0);
    //((CMeetingTool*)pPathItem)->PrintAgendaItems();
```

```
      }
    }

// Clear out the temp agenda array.
    int nAgenArrCount = AgendaArray.GetSize();
    for(nIndex=0;nIndex<nAgenArrCount;nIndex++) {
      delete AgendaArray.GetAt(nIndex);
    }
    AgendaArray.RemoveAll();

delete [] selected;
    delete [] meetingStatus;
} void CPathwayView::DeleteSelected()
{
  int count = m_pListBox->GetSelCount();
  LPINT selected = new int[count];
  if ( m_pListBox->GetSelItems(count,selected) != count ) {
    // Throw an error
    delete [] selected;
    return;
  }
  CPathMakerDoc* pDoc = GetDocument();
  CShapeView* pShapeView;

CPathwayItem *pPathwayItem;
  CPathwayItem *pOtherPathwayItem;
  // Set focus on one less than the first item, remember
  // even if they have item 0 selected, it will not be deleted.
  this->SetFocusShape(NULL);
  m_pListBox->SetCaretIndex(selected[0]-1<0?0:selected[0]-1);
  for(int ii=count-1;ii>=0;--ii) {
    if ( selected[ii] != 0 ) {
      if ( (pShapeView = pDoc->FindView(pDoc->GetPathwayItem(selected[ii]))) != NULL ) {
        pShapeView->CloseView(FALSE);
      }
      pPathwayItem = pDoc->GetPathwayItem(selected[ii]);
      // If the item to be delete is in a meeting, tell the CMeetingTool
      // about the deletion.
      if (pPathwayItem->GetMeetingStatus() == MeetingMiddle ||
          pPathwayItem->GetMeetingStatus() == MeetingEnd ) {
        int nMeetingIndex = pDoc->GetMeetingStart(selected[ii]);
        ASSERT(nMeetingIndex!=-1);
        CMeetingTool* pMeetingTool = (CMeetingTool*) pDoc->GetPathwayItem(nMeetingIndex);
        pMeetingTool->DeletePathwayMeetingItem(selected[ii]);
      }

// if the deleted item is the end of the meeting, set the
      // previous item to its correct value.
      if (pPathwayItem->GetMeetingStatus() == MeetingEnd ) {
        pOtherPathwayItem = pDoc->GetPathwayItem(selected[ii]-1);
```

80

```
        if (pOtherPathwayItem->GetMeetingStatus() == MeetingStart ) {
          pOtherPathwayItem->SetMeetingStatus(MeetingOnly,pDoc);
        } else {
          pOtherPathwayItem->SetMeetingStatus(MeetingEnd,pDoc);
        }
      } else {
      // If the item to be deleted is a meeting, reset the meeting
      // status of the the objects in the meeting
        if (pPathwayItem->GetMeetingStatus() == MeetingStart ) {
          int nIndex;
          int nTotalRows = m_pListBox->GetCount();
          for(nIndex = selected[ii] + 1;nIndex < nTotalRows;++nIndex) {
            pOtherPathwayItem = pDoc->GetPathwayItem(nIndex);
            if (pOtherPathwayItem->GetMeetingStatus() == MeetingEnd ) {
              // This condition should alway be met.
              pOtherPathwayItem->SetMeetingStatus(MeetingNone,pDoc);
              break;
            } else {
              pOtherPathwayItem->SetMeetingStatus(MeetingNone,pDoc);
            }
          }
        }
      }
      pDoc->DeletePathwayItem(selected[ii]);
    }
  }
  delete [] selected;
} void CPathwayView::OnEditCopy()
{
  if (IsCuttable()) {
    // JTC
    CopySelectedToClip();
  } else {
    CShapeView::OnEditCopy();
  }
} void CPathwayView::OnUpdateEditCopy(CCmdUI* pCmdUI)
{
  if (IsCuttable()) {
    pCmdUI->Enable(TRUE);
  } else {
    CShapeView::OnUpdateEditCopy(pCmdUI);
  }
} void CPathwayView::OnEditCut()
{
  if (IsCuttable()) {
    // JTC
    CopySelectedToClip();
    DeleteSelected();
```

81

```
  } else {
    CShapeView::OnEditCut();
  }
} void CPathwayView::OnUpdateEditCut(CCmdUI* pCmdUI)
{
  if (IsCuttable()) {
    pCmdUI->Enable(TRUE);
  } else {
    CShapeView::OnUpdateEditCut(pCmdUI);
  }
} void CPathwayView::OnEditDelete()
{
  if (IsCuttable()) {
    // JTC
    DeleteSelected();
  } else {
    CShapeView::OnEditDelete();
  }
} void CPathwayView::OnUpdateEditDelete(CCmdUI* pCmdUI)
{
  if (IsCuttable()) {
    pCmdUI->Enable(TRUE);
  } else {
    CShapeView::OnUpdateEditDelete(pCmdUI);
  }
} void CPathwayView::OnEditPaste()
{
  if (m_Edit.Editing()) {
    m_Edit.Paste();
  } else {
    // JTC
    CObArray clip_list;
    CPathClip clip(GetDocument());
    clip.GetNativeFormat(sg_PathwayClipFormat,&clip_list);

int size = clip_list.GetSize();
    int nCaretIndex = m_pListBox->GetCaretIndex();
    CPathMakerDoc* pDoc = GetDocument();
    CPathwayItem* pCaretItem = pDoc->GetPathwayItem(m_pListBox->GetCaretIndex());
    ASSERT(pCaretItem!=NULL);
    int nIndex;
    BOOL bPasteIntoMeeting = FALSE;

if (pCaretItem->GetMeetingStatus() == MeetingStart ||
        pCaretItem->GetMeetingStatus() == MeetingMiddle){
      // If we are pasteing into a meeting, we need to
```

```
            // check to see if there is a meeting in the paste
            // group.
         bPasteIntoMeeting = TRUE;
         MeetingStatus eMeetStat;
         for(nIndex=0; nIndex < size ; ++nIndex) {
            eMeetStat = ((CPathwayItem *) clip_list[nIndex])->GetMeetingStatus();
            if (eMeetStat == MeetingStart || eMeetStat == MeetingOnly ) {
               int Answer = AfxMessageBox(IDS_PASTE_MEETING_MSG, MB_OKCANCEL);
               if (Answer == IDCANCEL) {
                  return;
               } else {
                  break;
               }
            }
         }
      }

CPathwayItem* pPasteItem;
      m_pListBox->SetRedraw(FALSE);
      for(nIndex=0; nIndex < size ; ++nIndex) {
         pPasteItem = (CPathwayItem *) clip_list[nIndex];
         if (bPasteIntoMeeting==TRUE) {
            if (pPasteItem->GetMeetingStatus() == MeetingStart ||
               pPasteItem->GetMeetingStatus() == MeetingOnly ) {
               // Ignore starts of meetings
               delete pPasteItem;
               pPasteItem = NULL;
               continue;
            } else {
               pPasteItem->SetMeetingStatus(MeetingMiddle,NULL);
            }
         }
         AddToolToPathway(pPasteItem,0,FALSE);
      }
      m_pListBox->SetRedraw(TRUE);
      m_pListBox->Invalidate();
      // Highlight the range.
   }
} void CPathwayView::OnUpdateEditPaste(CCmdUI* pCmdUI)
{
   if (Editing()) {
      pCmdUI->Enable(::IsClipboardFormatAvailable(CF_TEXT));
      // What format is needed
   } else {
      // JTC
      pCmdUI->Enable(::IsClipboardFormatAvailable(sg_PathwayClipFormat));
   }
} void CPathwayView::AddToolToPathway(CPathwayItem* a_pPathwayItem,
                 int nSTFileID,BOOL a_bEdit)
{
```

83

```
if (Editing()) {
  StopEditing();
}
int nCaretIndex = m_pListBox->GetCaretIndex();
int nIndex = nCaretIndex;
if (nIndex < 0) {
  nIndex = m_pListBox->GetCount();
  nCaretIndex = nIndex -1; // Set to the last item
} else {
  nIndex++;
}
CPathMakerDoc* pDoc = GetDocument();
ASSERT(nCaretIndex >= 0 && nCaretIndex < pDoc->GetPathwayItemCount());

// if pasteing into a meeting, make the meeting status middle
CPathwayItem* pCaretItem = pDoc->GetPathwayItem(nCaretIndex);
ASSERT(pCaretItem!=NULL);
if ( a_pPathwayItem->GetMeetingStatus() == MeetingNone &&
    (pCaretItem->GetMeetingStatus() == MeetingStart ||
     pCaretItem->GetMeetingStatus() == MeetingMiddle) ) {
       a_pPathwayItem->SetMeetingStatus(MeetingMiddle,NULL);
} pDoc->CreatePathwayItem(nIndex, a_pPathwayItem, FALSE);

if ( a_pPathwayItem->GetMeetingStatus() == MeetingMiddle ) {
  int nMeetingIndex = pDoc->GetMeetingStart(nIndex);
  ASSERT(nMeetingIndex!=-1);
  CMeetingTool* pMeetingTool = (CMeetingTool*) pDoc->GetPathwayItem(nMeetingIndex);
  pMeetingTool->InsertAgendaInfo(nIndex);
} if ( a_pPathwayItem->GetMeetingStatus() == MeetingPasteMiddle ) {
  a_pPathwayItem->SetMeetingStatus(MeetingMiddle,NULL);
} if ( a_pPathwayItem->GetMeetingStatus() == MeetingPasteEnd ) {
  a_pPathwayItem->SetMeetingStatus(MeetingEnd,NULL);
} if (nSTFileID) {
  CFileTool* pFileTool = (CFileTool*) m_pListBox->GetPathwayShape(nIndex)->
           GetPathwayItem();
  if (CFileView::SelectFile(nSTFileID, pFileTool, pDoc)) {
    pFileTool->SetItemDescription(pFileTool->GetName(), NULL);
  }
}
if ( a_bEdit ) {
  PostMessage(WM_COMMAND, ID_PATHWAY_EDITDESCRIPTION, 0);
}
} void CPathwayView::OnPathwayAddmeeting()
{
```

```
   AddToolToPathway(new CMeetingTool(GetDocument()));
#if 0
  CPathMakerDoc* pDoc = GetDocument();
  ASSERT_VALID(pDoc);
  CPathwayItem* pPathwayItem = pDoc->GetPathwayItem(0);
  CString String = pPathwayItem->GetItemDescription();
  String = String + "0";
  pPathwayItem->SetItemDescription(String, pDoc);
#endif
} void CPathwayView::OnUpdatePathwayAddmeeting(CCmdUI* pCmdUI)
{
   int nCaretIndex = m_pListBox->GetCaretIndex();
   if (nCaretIndex < 0 || nCaretIndex > m_pListBox->GetCount()){
     pCmdUI->Enable(TRUE);
     return;
   }

CPathMakerDoc* pDoc = GetDocument();

if (pDoc->GetPathwayItem(nCaretIndex)->GetMeetingStatus() != MeetingStart &&
       pDoc->GetPathwayItem(nCaretIndex)->GetMeetingStatus() != MeetingMiddle ) {
       pCmdUI->Enable(TRUE);
   } else {
       pCmdUI->Enable(FALSE);
   }
} void CPathwayView::OnPathwayAddstage()
{
   AddToolToPathway(new CStageTool(GetDocument()));
#if 0
  CPathMakerDoc* pDoc = GetDocument();
  ASSERT_VALID(pDoc);
  CPathwayItem* pPathwayItem = pDoc->GetPathwayItem(1);
  CString String = pPathwayItem->GetItemDescription();
  String = String + "0";
  pPathwayItem->SetItemDescription(String, pDoc);
#endif
} void CPathwayView::OnUpdatePathwayAddstage(CCmdUI* pCmdUI)
{
   pCmdUI->Enable(TRUE);
} void CPathwayView::OnPathwayAddslideshow()
{
   AddToolToPathway(new CSlideShowTool(GetDocument()), IDS_SLIDE_SHOW_TYPE);
} void CPathwayView::OnUpdatePathwayAddslideshow(CCmdUI* pCmdUI)
{
```

```
  pCmdUI->Enable(TRUE);
} void CPathwayView::OnPathwayAddform()
{
  AddToolToPathway(new CFormTool(GetDocument()), IDS_FORM_TYPE);
} void CPathwayView::OnUpdatePathwayAddform(CCmdUI* pCmdUI)
{
  pCmdUI->Enable(TRUE);
} void CPathwayView::OnPathwayAddforcefield()
{
  AddToolToPathway(new CForceTool(GetDocument()));
} void CPathwayView::OnUpdatePathwayAddforcefield(CCmdUI* pCmdUI)
{
  pCmdUI->Enable(TRUE);
} void CPathwayView::OnPathwayAddbrainstorm()
{
  AddToolToPathway(new CBrainTool(GetDocument()));
} void CPathwayView::OnUpdatePathwayAddbrainstorm(CCmdUI* pCmdUI)
{
  pCmdUI->Enable(TRUE);
} void CPathwayView::OnPathwayAddcauseeffect()
{
  AddToolToPathway(new CCauseTool(GetDocument()));
} void CPathwayView::OnUpdatePathwayAddcauseeffect(CCmdUI* pCmdUI)
{
  pCmdUI->Enable(TRUE);
} void CPathwayView::OnViewProjectfont()
{
  ChangePathwayFont(ProjectLine);
} void CPathwayView::OnViewMeetingfont()
{
  ChangePathwayFont(MeetingLine);
} void CPathwayView::OnViewStagefonts()
```

86

```
{
  ChangePathwayFont(StageLine);
} void CPathwayView::OnViewStepfonts()
{
  ChangePathwayFont(ToolLine);
} void CPathwayView::OnPathwayAddconsensusbuilder()
{
  AddToolToPathway(new CConsensusTool(GetDocument()));
} void CPathwayView::OnUpdatePathwayAddconsensusbuilder(CCmdUI* pCmdUI)
{
  pCmdUI->Enable(TRUE);
} void CPathwayView::OnPathwayAdddataanalyst()
{
  AddToolToPathway(new CDataTool(GetDocument()));
} void CPathwayView::OnUpdatePathwayAdddataanalyst(CCmdUI* pCmdUI)
{
  pCmdUI->Enable(TRUE);
} void CPathwayView::OnPathwayAddflowchart()
{
  AddToolToPathway(new CFlowTool(GetDocument()));
} void CPathwayView::OnUpdatePathwayAddflowchart(CCmdUI* pCmdUI)
{
  pCmdUI->Enable(TRUE);
} void CPathwayView::OnPathwayEditdescription()
{
  int nIndex = m_pListBox->GetCaretIndex();

if (nIndex >= 0) {
    m_pListBox->GetPathwayShape(nIndex)->GetPathwayStringShape()->SetFocus();
  }
}

// CPathwayView::OnDestroy overrides the behavior of that shapeview OnDestory.
// Since when CPathway view is destoryed we don't need to record the window placement
// We don't want to execute the code, plus it will cause an error if we do.
void CPathwayView::OnDestroy()
{
        CScrollView::OnDestroy();   // Simple call the normal behavior for the ScrollView.
```

```
} void CPathwayView::OnRightButtonMenu()
{
        // Display the popup menu...
    this->DisplayPopupMenu(IDR_PATHWAY_RMENU);
}

// Font popup menu item
void CPathwayView::OnPathpuFont()
{
    int nCaretIndex = m_pListBox->GetCaretIndex();
    CPathMakerDoc* pDoc = GetDocument();
    CPathwayItem* pCaretItem = pDoc->GetPathwayItem(m_pListBox->GetCaretIndex());
    this->ChangePathwayFont(pCaretItem->GetToolType());
}

// Font popup menu item
void CPathwayView::OnUpdatePathpuFont(CCmdUI* pCmdUI)
{
        // TODO: Add your command update UI handler code here
        pCmdUI->Enable();
}

UINT CPathwayView::GetSlideFile()
{
    return(IDS_PATHWAY_SLIDE);
}

BOOL CPathwayView::OnPreparePrinting(CPrintInfo* pInfo)
{
        return CShapeView::OnPreparePrinting(pInfo);
} void CPathwayView::OnBeginPrinting(CDC* pDC, CPrintInfo* pInfo)
{
        // here we map the extents of the rootshape to our printable area;
        // we'll use TWIPS for better granularity... assume Rect.left==0.

// get RootShape
        CRootShape* pRootShape = GetRootShape();

// get RootShape coords
        CRect Rect;
        pRootShape->GetPosition(&Rect);

// get page extents
        int nHorzRes = ((pDC->GetDeviceCaps(HORZRES)*TWIPS_PER_INCH)/pDC-
>GetDeviceCaps(LOGPIXELSX));
        int nVertRes = ((pDC->GetDeviceCaps(VERTRES)*TWIPS_PER_INCH)/pDC-
>GetDeviceCaps(LOGPIXELSY));
```

88

```
        // calculate horiz adjustment factor
        // **TEMP 13800 is Rect.right+space of shape one which we insert manually because the
        // RootShape for the project pathway is NOT the page shape as in other modules...
        double xExtAdj = (double)(nHorzRes/(13800.0));

// recurse through the shapes, format the printable ones, and build our CObList int lastY     = 0;
        int yOffset   = 0;
        int lastOffset = 0;
        int shapeID   = -1;

CShapeView::BuildShapeList(pRootShape, lastY, yOffset, lastOffset, xExtAdj, shapeID);

// map coords to our page extents
        int totalPages = CShapeView::FitToPage(nVertRes);

pInfo->SetMaxPage(totalPages);

CScrollView::OnBeginPrinting(pDC, pInfo);
} void CPathwayView::OnPrint(CDC* pDC, CPrintInfo* pInfo)
{
        CShapeView::OnPrint(pDC, pInfo);
} void CPathwayView::OnEndPrinting(CDC* pDC, CPrintInfo* pInfo)
{
        CShapeView::OnEndPrinting(pDC, pInfo);
}
void CPathwayView::OnPrepareDC(CDC* pDC, CPrintInfo* pInfo)
{
        CShapeView::OnPrepareDC(pDC, pInfo);
}
```

Pathlb.h

Defines the Pathway Listbox

```
#ifndef _PATHLB_H_
#define _PATHLB_H_

/******************************************************************
 *
 * $Log: /Pathmakr/Source/Pathmakr/pathlb.h $
 *
 * 4     9/16/95 12:03p Soup
 * B1 Update including revamped includes, et. al.
 *
 * 3     8/07/95 1:25p Soup
 * Agenda/Printing/Etc.
 *
 * 2     4/13/95 2:15p Soup
 * Added Meeting Inclusion
 *
 * 1     1/26/95 6:12p Johna
 * Initial Check In.
 *
 ******************************************************************/

// brainlb.h : header file
// class CPathwayShape;
class CPathwayListBox;
class CPathwayStringShape;

#include "pathvw.h"

const UINT MEETING_TIMER_ID = 101;
const UINT MEETING_TIMER_INTERVAL = 50; // in msec enum MeetingStatus;
/////////////////////////////////////////////////////////////////
// CPathwayMeetingShape class CPathwayMeetingShape : public CShape {
  DECLARE_SERIAL(CPathwayMeetingShape)
  protected:
    CPathwayMeetingShape()
        : CShape() { }
  public:
    CPathwayMeetingShape(const CRect& a_Rect, CShape* a_pParent)
        : CShape(a_Rect, a_pParent, COLOR_WINDOW) { }
  public:
    virtual void Serialize(CArchive& a_ar);
    virtual void Draw(CDC* a_pDC, CRect& a_FigureRect,
```

90

```
                 CRect& a_ClipIntersect);

virtual int OnLButtonDown(UINT nFlags, CPoint point,
                 CRect* pParent = NULL);
  virtual HCURSOR OnMouseMove(UINT nFlags, CPoint point,
                 CRect* pCaptureRect);
  virtual BOOL OnLButtonUp(UINT nFlags, CPoint point,
                 CRect* pCaptureRect);
  void DrawRubberMeeting(int a_nOldIndex, CPoint a_point);

CPathwayListBox* GetPtrListBox();
  virtual CWnd* GetParentWnd();
  CPathwayShape* GetPathwayShape();

MeetingStatus GetMeetingStatus();
  void SetMeetingStatus(MeetingStatus a_Status,
                 CPathwayItem* a_pPathwayItem = NULL);
 private:
   static int m_nMeetingStart;
   static int m_nMeetingCurrent;
   static int m_nMeetingEnd;
   static int m_nMeetingMax;
   static int m_nMeetingCaptureIndex;
   static int m_nMeetingTopYvalue;
   static int m_nMeetingBottomYValue;
};

//////////////////////////////////////////////////////////////
// CPathwayCheckBoxShape class CPathwayCheckBoxShape : public CBorderShape {
  DECLARE_SERIAL(CPathwayCheckBoxShape)
 protected:
   CPathwayCheckBoxShape()
       : CBorderShape() {
   }
 public:
   CPathwayCheckBoxShape(const CRect& Rect, CShape* pParent) :
       CBorderShape(Rect, pParent, 1, FALSE, TRUE) {
   }
 public:
   virtual BOOL OnLButtonUp(UINT a_nFlags, CPoint a_point,
                 CRect* a_pCaptureRect);

virtual BOOL OnKeyDown(UINT a_nChar, UINT a_nRepCnt, UINT a_nFlags);
   CPathwayShape* GetPathwayShape();
   CPathwayListBox* GetPtrListBox();
   BOOL IsComplete();
   void SetComplete(BOOL a_bFlag);
};

//////////////////////////////////////////////////////////////
// CPathwayButtonShape
```

91

```
class CPathwayButtonShape : public CButtonShape {
  DECLARE_SERIAL(CPathwayButtonShape);
protected:
  CPathwayButtonShape()
      : CButtonShape(), m_pBitmap(NULL) {
    SetBitmapPtr();
  }
public:
  CPathwayButtonShape(CRect& a_Rect, CPathwayShape* a_pParent)
      : CButtonShape(a_Rect, (CShape*) a_pParent), m_pBitmap(NULL) {
    SetBitmapPtr();
  }
  virtual BOOL OnLButtonUp(UINT a_nFlags, CPoint a_point,
              CRect* a_pCaptureRect);
          virtual BOOL OnKeyDown(UINT a_nChar, UINT a_nRepCnt, UINT a_nFlags);
          void ProcessPathwayButton();
  CPathwayShape* GetPathwayShape();
          virtual void Draw(CDC* pDC, CRect& FigureRect, CRect& ClipIntersect);
  virtual void OnSetFocus(CShape* a_pOldShape = NULL,
      void* a_pParam = NULL);
private:
  void SetBitmapPtr();

private:
  CBitmap* m_pBitmap;
  int m_nBitmapWidth;
  int m_nBitmapHeight;
};

//////////////////////////////////////////////////////////////
// CPathwayStringShape class CPathwayStringShape : public CStringShape {
  DECLARE_SERIAL(CPathwayStringShape)
protected:
  CPathwayStringShape()
      : CStringShape() { }
public:
  CPathwayStringShape(const CRect& a_Rect, CShape* a_pParent,
            CString a_String, int a_nMaxLen, int a_nFontIndex,
            WORD a_wFlags = 0,
            int a_nSystemColor = COLOR_WINDOWTEXT)
      : CStringShape(a_Rect, a_pParent, a_String, a_nMaxLen,
            a_nFontIndex, a_wFlags, a_nSystemColor) {
  }
  CPathwayStringShape(const CRect& a_Rect, CShape* a_pParent,
            CString a_String, int a_nMaxLen, int a_nFontIndex,
            WORD a_wFlags, int a_R, int a_G, int a_B)
      : CStringShape(a_Rect, a_pParent, a_String, a_nMaxLen, a_nFontIndex,
            a_wFlags, a_R, a_G, a_B) {
  }
  virtual BOOL NeedsRedrawing(CRect& a_ClippingRect, CRect* a_pFigureRect,
              CRect* a_pParentRect, CRect* a_pIntersection) {
    GetPosition(a_pFigureRect, a_pParentRect);
```

92

```
        *a_pIntersection = *a_pFigureRect;
        return(TRUE);
    }
    virtual void GetPosition(CRect* a_pRect, CRect* a_pParent = NULL,
                BOOL a_bRedraw = TRUE);
    CPathwayListBox* GetPtrListBox();
    virtual CWnd* GetParentWnd();
    CPathwayShape* GetPathwayShape();
    virtual CString GetString(CPathwayItem* a_pPathwayItem = NULL);
    virtual void SetString(CString& a_String,
                CPathwayItem* a_pPathwayItem = NULL);
    virtual void OnSetFocus(CShape* a_pOldShape = NULL, void* a_pParam = NULL);
    virtual void OnKillFocus(CShape* a_pNewShape = NULL,
                BOOL a_bSystemKill = FALSE);
    virtual BOOL OnKeyDown(UINT a_nChar, UINT a_nRepCnt, UINT a_nFlags);
};

class CPathwayShape : public CShape
{
    DECLARE_SERIAL(CPathwayShape)
    protected:
        CPathwayShape()
            : CShape() {
            m_pMeetingShape = NULL;
            m_pCheckBoxShape = NULL;
            m_pButtonShape = NULL;
            m_pStringShape = NULL;
            m_pPathwayItem = NULL;
        } public:
        CPathwayShape(CPathwayItem* a_pPathwayItem, CShape* a_pParent);
    public:
        CPathwayStringShape* GetPathwayStringShape() {
            return(m_pStringShape);
        }
        CPathwayListBox* GetPtrListBox();
        int GetLineHeight(int a_nFontHeight);
        virtual void SetHeight(int a_nNewHeight);
        CPathwayItem* GetPathwayItem() {
            return(m_pPathwayItem);
        }
        virtual BOOL NeedsRedrawing(CRect& a_ClippingRect, CRect* a_pFigureRect,
                    CRect* a_pParentRect,
                    CRect* a_pIntersection) {
            GetPosition(a_pFigureRect, a_pParentRect);
            *a_pIntersection = *a_pFigureRect;
            return(TRUE);
        }
        CPathwayMeetingShape* GetPtrMeetingShape() {
            return(m_pMeetingShape);
        }
        BOOL ProcessKeys(UINT a_nChar, CShape* a_pShape);
    protected:
```

93

```
    //virtual void Draw(CDC* pDC, CRect& FigureRect, CRect& ClipIntersect);
  protected:
    CPathwayMeetingShape* m_pMeetingShape;
    CPathwayCheckBoxShape* m_pCheckBoxShape;
    CPathwayButtonShape* m_pButtonShape;
    CPathwayStringShape* m_pStringShape;
    CPathwayItem* m_pPathwayItem;
};

//////////////////////////////////////////////////////////////////
// CPathwayListBox window class CPathwayListBox : public CListBox
{
  friend class CPathwayShape;
  friend class CPathwayStringShape;

public:
    int GetItemHeight();
  public:

// There are not AFX generated because a windows MeasureItem and
  // Draw Item are different than a ListBoxes...
    virtual void MeasureItem(LPMEASUREITEMSTRUCT lpMeasureItemStruct);
    virtual void DrawItem(LPDRAWITEMSTRUCT lpDrawItemStruct);
  // Generated message map functions
  //{{AFX_MSG(CPathwayListBox)
  afx_msg void OnLButtonDown(UINT nFlags, CPoint point);
  afx_msg void OnMouseMove(UINT nFlags, CPoint point);
  afx_msg void OnLButtonUp(UINT nFlags, CPoint point);
        afx_msg void OnLButtonDblClk(UINT nFlags, CPoint point);
        afx_msg void OnKillFocus(CWnd* pNewWnd);
        afx_msg void OnKeyDown(UINT nChar, UINT nRepCnt, UINT nFlags);
        afx_msg void OnTimer(UINT nIDEvent);
        afx_msg void OnRButtonDown(UINT nFlags, CPoint point);
        //}}AFX_MSG
  DECLARE_MESSAGE_MAP()
  public:
    int GetLineHeight(int a_nFontHeight);
    int GetIndexAtPoint(CPoint a_point, int a_nCount = -1);
    CPathwayShape* GetPathwayShape(int nIndex) {
      ASSERT((nIndex >= 0) && (nIndex < GetCount()));
      return((CPathwayShape*) GetItemData(nIndex));
    }
    CPathwayView* GetPathwayView();
    void StartEditing(int a_nIndex);
    int GetIndexAtYVal(const int a_yVal, const int nStartIndex=0);
    int GetBottomIndex();
    int YValOutsideWin(int a_yValue);
    BOOL DoAutoVerticalScroll(const int a_yValue);
  protected:
    static CShape* m_pCaptureShape;
    static CRect m_CaptureRect;
```

94

```
    static BOOL m_IgnoreDownAndUp;
    static BOOL m_ClickedOn;

static CRect m_MoveRect;
    static BOOL m_bCaptured;
    static BOOL m_bCopying;
    static HCURSOR m_hCursor;
    static int m_nFlags;
    static CSize m_OffsetSize;
    static int m_SelCount;
};

///////////////////////////////////////////////////////
#endif  // _PATHLB_H_
```

Pathlb.cpp

Implements the Pathway Listbox

```
/********************************************************************
 *
 * $Log: /Pathmakr/Source/Pathmakr/pathlb.cpp $
 *
 * 14    11/09/95 11:34a Anthony
 * Various bug fixes / enhancements, notably:
 *   Flowchart text fitting - now shrinks, reposition connections
 *   Flowchart drag-select / scroll fixes
 *   C&E tree/branch menu changes and fixes
 *   Flowchart & C&E right button behaviour
 *
 * 13    11/07/95 10:49a Anthony
 * Checkin some initial Consensus Builder stuff
 *
 * 12    11/06/95 1:14p Soup
 * Obj Grid Init Checkin
 *
 * 11    9/16/95 12:02p Soup
 * B1 Update including revamped includes, et. al.
 *
 * 10    9/08/95 6:09p Soup
 * B1 Bug Update
 *
 * 9     8/28/95 3:55p Soup
 * B1 Updates. Bug fixes etc.
 *
 * 8     8/07/95 1:25p Soup
 * Agenda/Printing/Etc.
 *
 * 7     8/07/95 9:34a Johna
 * Added new flow chart stuff.
 *
 * 6     4/13/95 2:14p Soup
 * Added Meeting Inclusion
 *
 * 5     4/10/95 11:12a Johna
 * Cleaned up OnKillFocus
 *
 * 4     3/22/95 10:57a Johna
 * Added GrayButtons to ini file to force pathway buttons to gray.
 *
 * 3     3/20/95 11:55a Johna
 * Fixed vertical size of buttons.
 * Align stage text with left of activation buttons.
 *
 * 2     2/16/95 1:52p Johna
 * Added Brainstorm to the system.
 *
```

96

```
 *   1     1/26/95 6:12p Johna
 *   Initial Check In.
 *
 *****************************************************************/

// pathlb.cpp : implementation file
// include "stdafx.h"
include "pathmakr.h"
#include "pathvw.h"
#include "pathitem.h"
#include "meetdoc.h"
#include "pathlb.h"

//#define DATAANALPROTO
#ifdef DATAANALPROTO
#include "datadoc.h"
endif define BETAB2
ifdef BETAB1
#include "datadoc.h"
#include "condoc.h"
#endif

IMPLEMENT_SERIAL(CPathwayMeetingShape,CShape,0)
IMPLEMENT_SERIAL(CPathwayButtonShape,CButtonShape,0)
IMPLEMENT_SERIAL(CPathwayStringShape,CStringShape,0)
IMPLEMENT_SERIAL(CPathwayCheckBoxShape,CBorderShape,0)
IMPLEMENT_SERIAL(CPathwayShape,CShape,0)

define new DEBUG_NEW ifdef _DEBUG
undef THIS_FILE
static char BASED_CODE THIS_FILE[] = __FILE__;
endif extern BOOL g_bForceButtonToGray;

const int c_nVerticalSpacing = 4;
const int c_nDlgUnitCheckBoxHeight = 6;
const int c_nDlgUnitButtonHeight = 10;
const int c_nEditWidth = 640;
int g_nButtonHeight = -1;
int g_nButtonWidth = -1;
int g_nCheckBoxWidth = -1;
int g_nCheckBoxHeight = -1;

const int c_nMaxChars = 256;

/////////////////////////////////////////////////////////////////
// CPathwayCheckBoxShape
```

97

```
BOOL CPathwayCheckBoxShape::OnLButtonUp(UINT a_nFlags, CPoint a_point,
                    CRect* a_pCaptureRect)
{
  BOOL bRet = CBorderShape::OnLButtonUp(a_nFlags, a_point, a_pCaptureRect);
  SetComplete(bRet);
  return(bRet);
}

CPathwayShape* CPathwayCheckBoxShape::GetPathwayShape()
{
  return((CPathwayShape*) GetParent());
}

CPathwayListBox* CPathwayCheckBoxShape::GetPtrListBox()
{
  return(GetPathwayShape()->GetPtrListBox());
}

BOOL CPathwayCheckBoxShape::IsComplete()
{
  return(GetPathwayShape()->GetPathwayItem()->IsComplete());
} void CPathwayCheckBoxShape::SetComplete(BOOL a_bFlag) {
  CPathwayItem* pPathwayItem = GetPathwayShape()->GetPathwayItem();
  pPathwayItem->SetComplete(a_bFlag, pPathwayItem->GetDocument());
}

BOOL CPathwayCheckBoxShape::OnKeyDown(UINT a_nChar, UINT a_nRepCnt,
                    UINT a_nFlags)
{
  if (GetPathwayShape()->ProcessKeys(a_nChar, this)) {
    CBorderShape::OnKeyDown(a_nChar, a_nRepCnt, a_nFlags);
  }
  return(FALSE);
}

////////////////////////////////////////////////////////////
// CPathwayButtonShape void CPathwayButtonShape::SetBitmapPtr()
{
  CPathwayShape* pPathwayShape = GetPathwayShape();
  CPathwayView* pPathwayView = (CPathwayView*) (pPathwayShape->GetShapeView());
  CPathwayItem* pPathwayItem = pPathwayShape->GetPathwayItem();
  m_pBitmap = pPathwayView->GetBitmapPtr(pPathwayItem->GetPathwayButtonID());
  BITMAP bm;
  m_pBitmap->GetObject(sizeof(bm), &bm);
  m_nBitmapWidth = bm.bmWidth;
  m_nBitmapHeight = bm.bmHeight;
} void CPathwayButtonShape::Draw(CDC* pDC, CRect& pRect,
```

98

```
                    CRect& ClipIntersect)
{
    CButtonShape::Draw(pDC, pRect, ClipIntersect);
    ASSERT(m_pBitmap);
    ASSERT(m_pBitmap->m_hObject);
    int x = (Width() - m_nBitmapWidth) / 2;
    int y = (Height() - m_nBitmapHeight) / 2;
    if (Selected()) {
        x++;
        y++;
    }
    CDC dcMem;
    dcMem.CreateCompatibleDC(pDC);
    CBitmap* pBitmapOld = dcMem.SelectObject(m_pBitmap);
    pDC->BitBlt(pRect.left + x, pRect.top + y, m_nBitmapWidth,
            m_nBitmapHeight, &dcMem, 0, 0, SRCCOPY);
    dcMem.SelectObject(pBitmapOld);
    dcMem.DeleteDC();
}

CPathwayShape* CPathwayButtonShape::GetPathwayShape() {
    return((CPathwayShape*) GetParent());
} void CPathwayButtonShape::ProcessPathwayButton()
{
//  SetFocusRect(NULL, TRUE);
    // There is no need to open a window if we are a template,
    // any information they input will be lost anyway.

if ( this->GetShapeView()->GetDocument()->GetPathMakrFileType() == CPathMakerDoc::Template )
    {
        // put up the message
        (void) AfxMessageBox(IDS_CANT_LAUNCH_TEMP, MB_OK);
        return;
    }
    Select(FALSE);
    Invalidate();
    CPathwayShape* pPathwayShape = GetPathwayShape();
    CPathwayItem* pPathwayItem = pPathwayShape->GetPathwayItem();

#ifdef BETAB1
    CDataTool* pDataTool = (CDataTool*) pPathwayItem;
    CConsensusTool* pConTool = (CConsensusTool*) pPathwayItem;
    if (pDataTool->IsKindOf(RUNTIME_CLASS(CDataTool)) ||
        pConTool->IsKindOf(RUNTIME_CLASS(CConsensusTool)) ) {
        AfxMessageBox(IDS_BETAB1_UNAVAIL, MB_OK);
        return;
    }
endif ifdef DATAANALPROTO
    // The Steve Demo Hack
    CDataTool* pDataTool = (CDataTool*) pPathwayItem;
```

99

```
    if ( pDataTool->IsKindOf(RUNTIME_CLASS(CDataTool)) ) {
      // Launch the prototype
      HWND hWnd = ::FindWindow("ThunderMDIForm","Pathmaker - [ChartChoice]");
      if ( hWnd) {
        ::ShowWindow(hWnd,SW_SHOWMAXIMIZED);
      } return;
    }
    #endif

ASSERT(pPathwayItem->GetToolType() != StageLine);
    pPathwayItem->GetDocument()->ActivateView(pPathwayItem);
}

BOOL CPathwayButtonShape::OnLButtonUp(UINT a_nFlags, CPoint a_point,
                    CRect* a_pCaptureRect)
{
  BOOL bRet = CButtonShape::OnLButtonUp(a_nFlags, a_point, a_pCaptureRect);
  if (bRet) {
    ProcessPathwayButton();
  }
  return(bRet);
}

BOOL CPathwayButtonShape::OnKeyDown(UINT a_nChar, UINT a_nRepCnt,
                    UINT a_nFlags)
{
  if (GetPathwayShape()->ProcessKeys(a_nChar, this)) {
    CButtonShape::OnKeyDown(a_nChar, a_nRepCnt, a_nFlags);
    if ((a_nChar == VK_SPACE) && (Selected())) {
      ProcessPathwayButton();
    }
  }
  return(FALSE);
} void CPathwayButtonShape::OnSetFocus(CShape* a_pOldShape, void* a_pParam)
{
  CButtonShape::OnSetFocus(a_pOldShape, a_pParam);
}

/////////////////////////////////////////////////////////////
// CPathwayMeetingShape CPathwayShape* CPathwayMeetingShape::GetPathwayShape() {
  return((CPathwayShape*) GetParent());
}

CWnd* CPathwayMeetingShape::GetParentWnd() {
  return(GetPtrListBox());
}

CPathwayListBox* CPathwayMeetingShape::GetPtrListBox() {
```

100

```
  return(GetPathwayShape()->GetPtrListBox());
}

MeetingStatus CPathwayMeetingShape::GetMeetingStatus()
{
  return(GetPathwayShape()->GetPathwayItem()->GetMeetingStatus());
} void CPathwayMeetingShape::SetMeetingStatus(MeetingStatus a_Status,
               CPathwayItem* a_pPathwayItem)
{
  if (a_pPathwayItem == NULL) {
    a_pPathwayItem = ((CPathwayShape*) GetParent())->GetPathwayItem();
  }
  a_pPathwayItem->SetMeetingStatus(a_Status, a_pPathwayItem->GetDocument());
} define MEETING_DIVIDE_WIDTH 3

// Project Pathway shapes void CPathwayMeetingShape::Serialize(CArchive& ar)
{
  CShape::Serialize(ar);
} void CPathwayMeetingShape::Draw(CDC* pDC, CRect& a_rect,
               CRect& ClipIntersect)
{
  MeetingStatus MeetingStatus = GetMeetingStatus();
  if (MeetingStatus != MeetingNone) {
    CPen Pen0(PS_SOLID, 1, GetSysColor(COLOR_BTNSHADOW));
    CPen Pen1(PS_SOLID, 1, GetSysColor(COLOR_WINDOWFRAME));
    CPen Pen2(PS_SOLID, 1, GetSysColor(COLOR_BTNHIGHLIGHT));
    CPen* PenA;
    CPen* PenB;
    CPen* pOldPen;
    BOOL bAdjustTop = TRUE;
    BOOL bAdjustBottom = TRUE;

pOldPen = pDC->SelectObject(&Pen1);

int nWidth2 = a_rect.Width() / MEETING_DIVIDE_WIDTH;
    int nX0 = a_rect.left;
    int nX1 = nX0 + nWidth2 - 1;
    int nX2 = a_rect.right - 1;
    int nY0 = a_rect.top;
    int nY1 = nY0 + nWidth2 - 1;
    int nY2 = a_rect.bottom - nWidth2;
    int nY3 = a_rect.bottom - 1;

for (int nIndex = 0; nIndex < 2; nIndex++) {
      if (nIndex == 0) {
```

101

```
    PenA = &Pen1;
    PenB = &Pen0;
} else {
    PenA = &Pen0;
    PenB = &Pen2;
}
switch (MeetingStatus) {
  case MeetingOnly:
    pDC->SelectObject(PenA);
    pDC->MoveTo(nX0+1, nY3);
    pDC->LineTo(nX2, nY3);
    pDC->LineTo(nX2, nY2);
    pDC->MoveTo(nX1, nY2);
    pDC->LineTo(nX1, nY1);
    pDC->LineTo(nX2, nY1);
    pDC->LineTo(nX2, nY0);

pDC->SelectObject(PenB);
    pDC->MoveTo(nX0, nY3);
    pDC->LineTo(nX0, nY0);
    pDC->LineTo(nX2 + 1, nY0);
    pDC->MoveTo(nX2, nY2);
    pDC->LineTo(nX1, nY2);
    break;
  case MeetingStart:
    pDC->SelectObject(PenA);
    pDC->MoveTo(nX1, a_rect.bottom - 1);
    pDC->LineTo(nX1, nY3);
    pDC->LineTo(nX2, nY3);
    pDC->LineTo(nX2, nY2);
    pDC->MoveTo(nX1, nY2);
    pDC->LineTo(nX1, nY1);
    pDC->LineTo(nX2, nY1);
    pDC->LineTo(nX2, nY0);

pDC->SelectObject(PenB);
    pDC->MoveTo(nX0, a_rect.bottom - 1);
    pDC->LineTo(nX0, nY0);
    pDC->LineTo(nX2 + 1, nY0);
    pDC->MoveTo(nX2, nY2);
    pDC->LineTo(nX1, nY2);
    break;
  case MeetingMiddle:
    bAdjustTop = FALSE;
    bAdjustBottom = FALSE;
    pDC->SelectObject(PenA);
    pDC->MoveTo(nX1, nY3);
    pDC->LineTo(nX1, nY0 - 1);

pDC->SelectObject(PenB);
    pDC->MoveTo(nX0, nY3);
    pDC->LineTo(nX0, nY0 - 1);
    break;
  case MeetingEnd:
```

102

```
        bAdjustTop = FALSE;
        pDC->SelectObject(PenA);
        pDC->MoveTo(nX0+1, nY3);
        pDC->LineTo(nX2, nY3);
        pDC->LineTo(nX2, nY2);
        pDC->MoveTo(nX1, nY2);
        pDC->LineTo(nX1, nY0 - 1);

pDC->SelectObject(PenB);
        pDC->MoveTo(nX0, nY3);
        pDC->LineTo(nX0, nY0 - 1);
        pDC->MoveTo(nX2, nY2);
        pDC->LineTo(nX1, nY2);
        break;
    }
    nX0++;
    nX1--;
    nX2--;
    if (bAdjustTop) {
       nY0++;
       nY1--;
    }
    if (bAdjustBottom) {
       nY2++;
       nY3--;
    }
}
pDC->SelectObject(pOldPen);

CBrush Brush(GetSysColor(COLOR_BTNFACE));
CRect FillRect;

switch (MeetingStatus) {
  case MeetingOnly:
     FillRect.left = nX0;
     FillRect.top = nY0;
     FillRect.right = nX2 + 2;
     FillRect.bottom = nY1 + 1;
     pDC->FillRect(&FillRect, &Brush);

FillRect.top = nY1 + 1;
     FillRect.right = nX1 + 1;
     FillRect.bottom = nY2;
     pDC->FillRect(&FillRect, &Brush);

FillRect.top = nY2;
     FillRect.right = nX2 + 2;
     FillRect.bottom = nY3 + 1;
     pDC->FillRect(&FillRect, &Brush);
     break;
  case MeetingStart:
     FillRect.left = nX0;
     FillRect.top = nY0;
     FillRect.right = nX2 + 2;
```

103

```
            FillRect.bottom = nY1 + 1;
            pDC->FillRect(&FillRect, &Brush);

FillRect.top = nY1 + 1;
            FillRect.right = nX1 + 1;
            FillRect.bottom = a_rect.bottom; // nY3 + 1;
            pDC->FillRect(&FillRect, &Brush);

FillRect.left = nX1 + 1;
            FillRect.top = nY2;
            FillRect.right = nX2 + 2;
            FillRect.bottom = nY3 + 1;
            pDC->FillRect(&FillRect, &Brush);
            break;
         case MeetingMiddle:
            FillRect.left = nX0;
            FillRect.top = nY0;
            FillRect.right = nX1 + 1;
            FillRect.bottom = nY3 + 1;
            pDC->FillRect(&FillRect, &Brush);
            break;
         case MeetingEnd:
            FillRect.left = nX0;
            FillRect.top = nY0;
            FillRect.right = nX1 + 1;
            FillRect.bottom = nY2;
            pDC->FillRect(&FillRect, &Brush);

FillRect.top = nY2;
            FillRect.right = nX2 + 2;
            FillRect.bottom = nY3 + 1;
            pDC->FillRect(&FillRect, &Brush);
            break;
      }
   }
} int CPathwayMeetingShape::m_nMeetingStart = -1;
int CPathwayMeetingShape::m_nMeetingCurrent = -1;
int CPathwayMeetingShape::m_nMeetingEnd = -1;
int CPathwayMeetingShape::m_nMeetingMax = -1;
int CPathwayMeetingShape::m_nMeetingCaptureIndex = -1;
int CPathwayMeetingShape::m_nMeetingTopYvalue = -1;
int CPathwayMeetingShape::m_nMeetingBottomYValue = -1;

int ItemHeight;
DWORD g_dw_tickcount;
int CPathwayMeetingShape::OnLButtonDown(UINT a_nFlags, CPoint a_point,
                        CRect* a_pParent)
{
   int nReturn = CShape::OnLButtonDown(a_nFlags, a_point, a_pParent);

if (nReturn == CLICK_IGNORE) {
      MeetingStatus mStatus = GetMeetingStatus();
```

104

```
    if (((mStatus == MeetingEnd) || (mStatus == MeetingOnly)) &&
      (a_point.y > (bottom - (bottom / 4)))) {
      ::SetCursor(AfxGetApp()->LoadStandardCursor(IDC_SIZENS));
      CPathwayListBox* pListBox = GetPtrListBox();

int nIndex = pListBox->FindString(-1, (LPCSTR) GetPathwayShape());
      m_nMeetingEnd = nIndex;
      m_nMeetingCurrent = nIndex;
      m_nMeetingCaptureIndex = nIndex;
      if (mStatus == MeetingOnly) {
        m_nMeetingStart = nIndex;
      } else {
        while (nIndex > 0) {
          if (pListBox->GetPathwayShape(nIndex)->GetPathwayItem()->
              GetMeetingStatus() == MeetingStart) {
            m_nMeetingStart = nIndex;
            break;
          }
          nIndex--;
        }
        ASSERT(nIndex > 0);
      }
      int nCount = pListBox->GetCount();
      nIndex = m_nMeetingEnd + 1;
      while (nIndex < nCount) {
        mStatus = pListBox->GetPathwayShape(nIndex)->GetPathwayItem()->
            GetMeetingStatus();
        if ((mStatus == MeetingStart) || (mStatus == MeetingOnly))
          break;
        nIndex++;
      }
      m_nMeetingMax = nIndex - 1;
      // Compute the top and bottom y CPathwayShape
      CRect Rect0;
      pListBox->GetItemRect(m_nMeetingStart,&Rect0);
      m_nMeetingTopYvalue = Rect0.top;
      pListBox->GetItemRect(m_nMeetingMax,&Rect0);
      m_nMeetingBottomYValue = Rect0.bottom;

g_dw_tickcount = ::GetTickCount();
      SetCapture(*this, a_point);
      pListBox->SetTimer(MEETING_TIMER_ID,MEETING_TIMER_INTERVAL,NULL);
      DrawRubberMeeting(-1, a_point);
    } else {
      nReturn = CLICK_IGNORE;
    }
  }
  return(nReturn);
}

HCURSOR CPathwayMeetingShape::OnMouseMove(UINT a_nFlags, CPoint a_point,
                CRect* a_pCaptureRect)
{
  MeetingStatus mStatus = GetMeetingStatus();
```

105

```
HCURSOR hCursor = NULL;
if (((mStatus == MeetingEnd) || (mStatus == MeetingOnly)) &&
    (a_point.y > (bottom - (bottom / 4))) &&
    !(a_nFlags & (MK_SHIFT | MK_CONTROL))) {
    hCursor = AfxGetApp()->LoadStandardCursor(IDC_SIZENS);
} if (a_pCaptureRect != NULL ) {
    CPathwayListBox* pListBox = GetPtrListBox();
    // Check for scrolling...
    int nScrollDirection = pListBox->YValOutsideWin(a_point.y);
    int nBottomIndex = pListBox->GetBottomIndex();
    int nTopIndex = pListBox->GetTopIndex();
    int nNewCurrentMeeting = -1;
    if ( nScrollDirection != 0 ) {
        if ((::GetTickCount() - g_dw_tickcount) > MEETING_TIMER_INTERVAL) {
            g_dw_tickcount = ::GetTickCount();
            // Autoscroll
            if ( nScrollDirection < 0 ) { // UP
                nTopIndex--;
                nNewCurrentMeeting = nTopIndex;
            } else { // Down
                nTopIndex++;
                nNewCurrentMeeting = nBottomIndex;
            }
            if ( nNewCurrentMeeting >= m_nMeetingStart && nNewCurrentMeeting <= m_nMeetingMax )
{
                DrawRubberMeeting(-1,a_point);
                m_nMeetingCurrent = nNewCurrentMeeting;
                pListBox->SetTopIndex(nTopIndex);
                CRect Rect0;
                pListBox->GetItemRect(m_nMeetingStart,&Rect0);
                m_nMeetingTopYvalue = Rect0.top;
                pListBox->GetItemRect(m_nMeetingMax,&Rect0);
                m_nMeetingBottomYValue = Rect0.bottom;
                DrawRubberMeeting(-1,a_point);
            }
        }
    } else { if (a_point.y < m_nMeetingTopYvalue) {
            nNewCurrentMeeting = m_nMeetingStart;
        } else {
            if ( a_point.y > m_nMeetingBottomYValue ) {
                nNewCurrentMeeting = m_nMeetingMax;
            } else {
                nNewCurrentMeeting = pListBox->GetIndexAtYVal(a_point.y,pListBox->GetTopIndex());
            }
        }
        ASSERT(nNewCurrentMeeting>=0);
        if (!(nNewCurrentMeeting == nBottomIndex &&
            (::GetTickCount() - g_dw_tickcount) < MEETING_TIMER_INTERVAL)) {
            if ( nNewCurrentMeeting != m_nMeetingCurrent ) {
                DrawRubberMeeting(-1,a_point);
```

```
            if (nNewCurrentMeeting == nBottomIndex ) {
                g_dw_tickcount = ::GetTickCount();
                pListBox->SetTopIndex(nTopIndex+1); // Going Down
                CRect Rect0;
                pListBox->GetItemRect(m_nMeetingStart,&Rect0);
                m_nMeetingTopYvalue = Rect0.top;
                pListBox->GetItemRect(m_nMeetingMax,&Rect0);
                m_nMeetingBottomYValue = Rect0.bottom;
            }
            m_nMeetingCurrent = nNewCurrentMeeting;
            DrawRubberMeeting(-1,a_point);
        }
      }
    }
  } // end of a_pCaptureRect != NULL return(hCursor);
}

BOOL CPathwayMeetingShape::OnLButtonUp(UINT a_nFlags, CPoint a_point,
                    CRect* a_pCaptureRect)
{
  DrawRubberMeeting(-1,a_point);
  CPathwayListBox* pListBox = GetPtrListBox();

CMeetingTool* pMeetingTool = (CMeetingTool*)pListBox->GetPathwayShape(m_nMeetingStart)-
>GetPathwayItem();
  pMeetingTool->MeetingSetInclude(m_nMeetingCurrent);
  if ( m_nMeetingStart == m_nMeetingCurrent ) {
      pListBox->GetPathwayShape(m_nMeetingStart)->GetPtrMeetingShape()-
>SetMeetingStatus(MeetingOnly);
      pListBox->GetPathwayShape(m_nMeetingStart)->Invalidate();
  } else {
      pListBox->GetPathwayShape(m_nMeetingStart)->GetPtrMeetingShape()-
>SetMeetingStatus(MeetingStart);
      pListBox->GetPathwayShape(m_nMeetingStart)->Invalidate();
      int nIndex= m_nMeetingStart + 1;
      while(nIndex < m_nMeetingCurrent) {
        pListBox->GetPathwayShape(nIndex)->GetPtrMeetingShape()->SetMeetingStatus(MeetingMiddle);
        pListBox->GetPathwayShape(nIndex)->Invalidate();
        nIndex++;
      }
      pListBox->GetPathwayShape(m_nMeetingCurrent)->GetPtrMeetingShape()-
>SetMeetingStatus(MeetingEnd);
      pListBox->GetPathwayShape(m_nMeetingCurrent)->Invalidate();
  }
  if ( m_nMeetingCurrent < m_nMeetingEnd ) {
     int nIndex;
     for(nIndex=m_nMeetingCurrent+1;nIndex<=m_nMeetingEnd;++nIndex) {
        pListBox->GetPathwayShape(nIndex)->GetPtrMeetingShape()->SetMeetingStatus(MeetingNone);
        pListBox->GetPathwayShape(nIndex)->Invalidate();
     }
  }
  pListBox->KillTimer(MEETING_TIMER_ID);
```

```
  ReleaseCapture(a_point);
  CRect rRefresh;
  pListBox->GetClientRect(&rRefresh);
  rRefresh.left = this->left;
  rRefresh.right = this->right;
  GetShapeView()->InvalidateRect(rRefresh);
  return(CShape::OnLButtonUp(a_nFlags, a_point, a_pCaptureRect));
} void CPathwayMeetingShape::DrawRubberMeeting(int a_nOldIndex, CPoint a_point)
{
  CPathwayListBox* pListBox = GetPtrListBox();
  ASSERT(pListBox != NULL);
  ASSERT(m_nMeetingStart >= 0 && m_nMeetingStart < pListBox->GetCount());
  ASSERT(m_nMeetingCurrent >= 0 && m_nMeetingCurrent < pListBox->GetCount());

CPathwayShape* pCurrentShape = pListBox->GetPathwayShape(m_nMeetingCurrent);
  ASSERT(pCurrentShape != NULL);

CPathwayMeetingShape* pCurrentMeetShape = pCurrentShape->GetPtrMeetingShape();
  ASSERT(pCurrentMeetShape != NULL);

CRect cStartRect;
  pListBox->GetItemRect(m_nMeetingStart,&cStartRect);

CRect cCurrRect;
  pListBox->GetItemRect(m_nMeetingCurrent,&cCurrRect);

CDC* pDC = GetShapeView()->GetDC();
  CRect CaptureRect = GetShapeView()->GetCaptureRect();
  int nOldROP2 = pDC->SetROP2(R2_NOT);

int nWidth2 = pCurrentMeetShape->Width() / MEETING_DIVIDE_WIDTH;

int nX1 = pCurrentMeetShape->left + nWidth2 - 1;
  int nY1 = pCurrentMeetShape->top + nWidth2 - 1;
  int nY2 = pCurrentMeetShape->bottom - nWidth2;

CPoint Points[10];
  Points[0].x = pCurrentMeetShape->left;   Points[0].y = cStartRect.top;
  Points[1].x = pCurrentMeetShape->left;   Points[1].y = cCurrRect.bottom;
  Points[2].x = pCurrentMeetShape->right;  Points[2].y = cCurrRect.bottom;
  Points[3].x = pCurrentMeetShape->right;  Points[3].y = cCurrRect.top + nY2;

Points[4].x = nX1;           Points[4].y = cCurrRect.top + nY2;
  Points[5].x = nX1;           Points[5].y = cStartRect.top + nY1;
  Points[6].x = pCurrentMeetShape->right;  Points[6].y = cStartRect.top + nY1;
  Points[7].x = pCurrentMeetShape->right;  Points[7].y = cStartRect.top;
  Points[8].x = pCurrentMeetShape->left;   Points[8].y = cStartRect.top;
  pDC->Polygon(Points, 9);

pDC->SetROP2(nOldROP2);
  GetShapeView()->ReleaseDC(pDC);
```

108

```
}
//////////////////////////////////////////////////////////
// CPathwayStringShape CPathwayShape* CPathwayStringShape::GetPathwayShape() {
  return((CPathwayShape*) GetParent());
}

CWnd* CPathwayStringShape::GetParentWnd() {
  return(GetPtrListBox());
}

CPathwayListBox* CPathwayStringShape::GetPtrListBox() {
  return(GetPathwayShape()->GetPtrListBox());
} void CPathwayStringShape::GetPosition(CRect* a_pRect, CRect* a_pParentRect,
                  BOOL a_bRedraw)
{
  CShape::GetPosition(a_pRect, a_pParentRect, a_bRedraw);
} void CPathwayStringShape::OnSetFocus(CShape* a_pOldShape, void* a_pParam)
{
  CPathwayListBox* pListBox = GetPtrListBox();
  CPathwayShape* pParentShape = GetPathwayShape();
  int nIndex = pListBox->FindString(-1, (LPCSTR) pParentShape);
  if ((pListBox->GetSelCount() != 1) || (!pListBox->GetSel(nIndex))) {
    pListBox->SetSel(-1, FALSE);
    pListBox->SetSel(nIndex, TRUE);
    pListBox->SetCaretIndex(nIndex);
    pListBox->GetItemRect(nIndex, pParentShape);
  }
  CStringShape::OnSetFocus(a_pOldShape, a_pParam);
} void CPathwayStringShape::OnKillFocus(CShape* a_pNewShape, BOOL a_bSystemKill)
{
  CStringShape::OnKillFocus(a_pNewShape, a_bSystemKill);
}
if 0
  if (!a_bSystemKill) {
    BOOL bDeleteThis = FALSE;
    int len;
    CPathwayView* pView = (CPathwayView*) GetShapeView();
    if (pView->Editing()) {
      len = pView->GetEdit()->GetWindowTextLength();
    } else {
      len = GetString().GetLength();
    }
    CPathwayListBox* pListBox = GetPtrListBox();
    int nIndex = pListBox->FindString(-1, (LPCSTR) this);
```

109

```
        if (nIndex == pListBox->GetCount() - 1) {
          if (len > 0) {
            // At bottom of list
//          pListBox->AddItem(new CPathwayStringShape(this, GetParent(),
//                "", 128, PATHWAY_ITEM_FONT_INDEX));
          }
        } else {
          if (len == 0) {
            bDeleteThis = TRUE;
            pListBox->DeleteString(nIndex);
          }
        }
        CStringShape::OnKillFocus(a_pNewShape, a_bSystemKill);
        if ((a_pNewShape) && (a_pNewShape->GetParent() != GetParent())) {
          pListBox->SetSel(-1, FALSE);
        }
        if (bDeleteThis) {
          RemoveFromParent();
          delete this;
        }
      }
    }
endif BOOL CPathwayStringShape::OnKeyDown(UINT a_nChar, UINT a_nRepCnt, UINT a_nFlags)
{
  int nReturn = FALSE;   // Assume we block it
  if (GetPathwayShape()->ProcessKeys(a_nChar, this)) {
    switch (a_nChar) {
      case VK_ESCAPE:
        GetShapeView()->SetEditShape(NULL, NULL, FALSE);
        GetShapeView()->SetFocusShape(NULL, NULL);
        GetPtrListBox()->SetFocus();
        break;
      default:
        nReturn = TRUE;   // Allow key to be processed
        break;
    }
  }
  return(nReturn);
}

CString CPathwayStringShape::GetString(CPathwayItem* a_pPathwayItem)
{
  if (a_pPathwayItem == NULL) {
    a_pPathwayItem = GetPathwayShape()->GetPathwayItem();
  } return(a_pPathwayItem->GetItemDescription());
} void CPathwayStringShape::SetString(CString& a_String,
                    CPathwayItem* a_pPathwayItem)
{
  if (a_pPathwayItem == NULL) {
```

110

```
    a_pPathwayItem = GetPathwayShape()->GetPathwayItem();
  }
  a_pPathwayItem->SetItemDescription(a_String, a_pPathwayItem->GetDocument());
}
//////////////////////////////////////////////////////////////////
// CPathwayShape message handlers BOOL CPathwayShape::ProcessKeys(UINT a_nChar, CShape* a_pShape)
{
  CShape* pSetFocusTo = NULL;
  BOOL bShifted = FALSE;

if (GetKeyState(VK_SHIFT) < 0) {
    bShifted = TRUE;
  }
  switch (a_nChar) {
    case VK_UP:
    case VK_DOWN:
    case VK_RETURN:
    {
      CPathwayListBox* pListBox = GetPtrListBox();
      if (bShifted) {
        pListBox->GetPathwayView()->StopEditing();
        break;
      }
      if (a_nChar == VK_RETURN) {
        if (a_pShape == (CShape*) m_pStringShape) {
          a_nChar = VK_DOWN;
        } else {
          break;
        }
      }
      int nIndex = pListBox->FindString(-1, (LPCSTR) this);
      int nNewIndex = nIndex;

if (((a_nChar == VK_UP) && (nIndex <= 0)) ||
          ((a_nChar == VK_DOWN) && (nIndex >= pListBox->GetCount() - 1))) {
        MessageBeep(MB_ICONASTERISK);
        break;
      }
      if (a_nChar == VK_UP) {
        nNewIndex--;
      } else {
        nNewIndex++;
      }

CPathwayShape* pNewShape = pListBox->GetPathwayShape(nNewIndex);

pSetFocusTo = pNewShape->m_pStringShape;
      if (a_pShape == (CShape*) m_pCheckBoxShape) {
        if (pNewShape->m_pCheckBoxShape) {
          pSetFocusTo = pNewShape->m_pCheckBoxShape;
        }
```

111

```
    } else {
      if (a_pShape == (CShape*) m_pButtonShape) {
        if (pNewShape->m_pButtonShape) {
          pSetFocusTo = pNewShape->m_pButtonShape;
        }
      }
    } pListBox->SetSel(-1, FALSE);
    pListBox->SetSel(nNewIndex, TRUE);
    pListBox->SetCaretIndex(nNewIndex);
    pListBox->GetItemRect(nNewIndex, pNewShape);
    break;
  } case VK_TAB:
  {
    // BRUTE FORCE - Where do we tab from here;

pSetFocusTo = (CShape*) m_pStringShape;
    if (a_pShape == (CShape*) m_pCheckBoxShape) {
      if ((!bShifted) && (m_pButtonShape)) {
        pSetFocusTo = m_pButtonShape;
      }
    } else {
      if (a_pShape == (CShape*) m_pButtonShape) {
        if ((bShifted) && (m_pCheckBoxShape)) {
          pSetFocusTo = m_pCheckBoxShape;
        }
      } else {
        if (a_pShape == (CShape*) m_pStringShape) {
          if (bShifted) {
            if (m_pButtonShape) {
              pSetFocusTo = m_pButtonShape;
            } else {
              if (m_pCheckBoxShape) {
                pSetFocusTo = m_pCheckBoxShape;
              }
            }
          } else {
            if (m_pCheckBoxShape) {
              pSetFocusTo = m_pCheckBoxShape;
            } else {
              if (m_pButtonShape) {
                pSetFocusTo = m_pButtonShape;
              }
            }
          }
        }
      }
    }
  }
  if ((pSetFocusTo) && (pSetFocusTo != a_pShape)) {
```

112

```
    pSetFocusTo->SetFocus();
  }
  return(pSetFocusTo == NULL);
}

CPathwayListBox* CPathwayShape::GetPtrListBox() {
  return(((CPathwayView*) GetShapeView())->GetPtrListBox());
} int CPathwayShape::GetLineHeight(int a_nFontHeight)
{
  int nHeight;
  if (m_pStringShape) {
    m_pStringShape->SetHeight(a_nFontHeight);
  }
  if (m_pMeetingShape) {
    m_pMeetingShape->SetHeight(a_nFontHeight);
  }
  if (g_nButtonHeight < 0) {
    DWORD dwBaseUnits = GetDialogBaseUnits();
    g_nButtonWidth = (LOWORD(dwBaseUnits) * c_nDlgUnitButtonHeight) / 2;
    g_nButtonHeight = (HIWORD(dwBaseUnits) * c_nDlgUnitButtonHeight) / 8;
    g_nCheckBoxWidth = (LOWORD(dwBaseUnits) * c_nDlgUnitCheckBoxHeight) / 4;
    g_nCheckBoxHeight = (HIWORD(dwBaseUnits) * c_nDlgUnitCheckBoxHeight) / 8;

g_nButtonHeight = 23;
  }
  if (a_nFontHeight > g_nButtonHeight) {
    nHeight = a_nFontHeight + c_nVerticalSpacing + c_nVerticalSpacing;
  } else {
    nHeight = g_nButtonHeight + c_nVerticalSpacing;
  }
  return(nHeight);
} void CPathwayShape::SetHeight(int a_nNewHeight) {
  CShape::SetHeight(a_nNewHeight);
  if (m_pStringShape) {
    m_pStringShape->MoveTop((1 + a_nNewHeight - m_pStringShape->Height())
            / 2);
  }
  m_pMeetingShape->SetHeight(a_nNewHeight);
  if (m_pButtonShape) {
    m_pButtonShape->MoveTop((1 + a_nNewHeight - m_pButtonShape->Height())
            / 2);
  }
  if (m_pCheckBoxShape) {
    m_pCheckBoxShape->MoveTop((1 + a_nNewHeight - m_pCheckBoxShape->Height())
            / 2);
  }
}

CPathwayShape::CPathwayShape(CPathwayItem* a_pPathwayItem, CShape* a_pParent)
  : CShape(CRect(0,0,200,100), a_pParent)
```

113

```
{
  ToolType eToolType = a_pPathwayItem->GetToolType();
  int nDlgUnits = LOWORD(GetDialogBaseUnits());
  CShapeView* pShapeView = a_pParent->GetShapeView();
  m_pPathwayItem = a_pPathwayItem;
  SetColorSelected(COLOR_HIGHLIGHT);
  int nFontIndex = m_pPathwayItem->GetToolType();//Font Assumption
  int nFontHeight = pShapeView->GetFontHeight(nFontIndex);
  m_pStringShape = NULL;
  m_pMeetingShape = NULL;
  int nLineHeight = GetLineHeight(nFontHeight);
  CRect Rect;
  int nX = 10;

Rect.SetRect(nX, 0, nX + (g_nButtonWidth / 4), 10);
  m_pMeetingShape = new CPathwayMeetingShape(Rect, this);

nX = Rect.right + 4;
  Rect.SetRect(nX, 0, nX + g_nCheckBoxWidth, g_nCheckBoxHeight);
  if ((eToolType == StageLine) || (eToolType == MeetingLine)) {
    m_pCheckBoxShape = NULL;
  } else {
    m_pCheckBoxShape = new CPathwayCheckBoxShape(Rect, this);
    m_pCheckBoxShape->Select(m_pPathwayItem->IsComplete());
  } nX = Rect.right + 8;
  Rect.SetRect(nX, 0, nX + g_nButtonWidth, g_nButtonHeight);
  if (eToolType == StageLine) {
    m_pButtonShape = NULL;
  } else {
    m_pButtonShape = new CPathwayButtonShape(Rect, this);
    nX = Rect.right + 8;
    if (g_bForceButtonToGray) {
      m_pButtonShape->ForceToGray();
    }
  }

Rect.SetRect(nX, 0, c_nEditWidth, nFontHeight);
  m_pStringShape = new CPathwayStringShape(Rect, this, "", c_nMaxChars,
                    nFontIndex);
  m_pStringShape->SetColorSelected(COLOR_HIGHLIGHTTEXT);
  SetHeight(nLineHeight);
}

////////////////////////////////////////////////////////////
// CPathwayListBox message handlers BEGIN_MESSAGE_MAP(CPathwayListBox, CListBox)
  //{{AFX_MSG_MAP(CPathwayListBox)
  ON_WM_LBUTTONDOWN()
  ON_WM_MOUSEMOVE()
  ON_WM_LBUTTONUP()
  ON_WM_LBUTTONDBLCLK()
```

114

```
        ON_WM_KILLFOCUS()
        ON_WM_KEYDOWN()
        ON_WM_TIMER()
        ON_WM_RBUTTONDOWN()
    //}}AFX_MSG_MAP
END_MESSAGE_MAP()

CShape* CPathwayListBox::m_pCaptureShape = NULL;
CRect CPathwayListBox::m_CaptureRect = CRect(0,0,0,0);

CRect CPathwayListBox::m_MoveRect = CRect(0,0,0,0);
BOOL CPathwayListBox::m_bCaptured = FALSE;
BOOL CPathwayListBox::m_bCopying = FALSE;
HCURSOR CPathwayListBox::m_hCursor = NULL;
int CPathwayListBox::m_nFlags = 0;
BOOL CPathwayListBox::m_IgnoreDownAndUp = FALSE;
BOOL CPathwayListBox::m_ClickedOn = FALSE;
CSize CPathwayListBox::m_OffsetSize = CSize(0,0);
int CPathwayListBox::m_SelCount = 0;

void CPathwayListBox::MeasureItem(LPMEASUREITEMSTRUCT a_lpMeasureItemStruct)
{ a_lpMeasureItemStruct->itemHeight =
     ((CPathwayShape*) (a_lpMeasureItemStruct->itemData))->Height();
} void CPathwayListBox::DrawItem(LPDRAWITEMSTRUCT a_lpDrawItemStruct)
{
  CDC* pDC = CDC::FromHandle(a_lpDrawItemStruct->hDC);
  if ((a_lpDrawItemStruct->itemAction & ODA_DRAWENTIRE) ||
      (a_lpDrawItemStruct->itemAction & ODA_SELECT)) {
    CPathwayShape* pPathwayShape = (CPathwayShape*)
                 a_lpDrawItemStruct->itemData;

// If item selected, select it
    if (a_lpDrawItemStruct->itemState & ODS_SELECTED) {
      pPathwayShape->Select();
      pPathwayShape->GetPathwayStringShape()->Select();
    } else {
      pPathwayShape->Deselect();
      pPathwayShape->GetPathwayStringShape()->Deselect();
    } if 0
    CRect HoldRect(pPathwayShape->left, pPathwayShape->top,
            pPathwayShape->right, pPathwayShape->bottom);
#endif
    pPathwayShape->SetRect(a_lpDrawItemStruct->rcItem.left,
              a_lpDrawItemStruct->rcItem.top,
              a_lpDrawItemStruct->rcItem.right,
              a_lpDrawItemStruct->rcItem.bottom);
    pPathwayShape->Redraw(pDC);
#if 0
```

```
            pPathwayShape->SetRect(HoldRect.left,
                        HoldRect.top,
                        HoldRect.right,
                        HoldRect.bottom);
#endif
        if (a_lpDrawItemStruct->itemAction & ODA_DRAWENTIRE) {
            // if item has focus, do additional drawing -- dashed border
            if (a_lpDrawItemStruct->itemState & ODS_FOCUS) {
                pDC->DrawFocusRect(&a_lpDrawItemStruct->rcItem);
            }
        }
    } else {
        if (a_lpDrawItemStruct->itemAction & ODA_FOCUS) {
            pDC->DrawFocusRect(&a_lpDrawItemStruct->rcItem);
        }
    }
} int CPathwayListBox::GetIndexAtPoint(CPoint a_point, int a_nCount)
{
    if (a_nCount == -1)
        a_nCount = GetCount();

int nIndex = GetTopIndex();
    CRect Rect;
    while(nIndex < a_nCount) {
        GetItemRect(nIndex, &Rect);
        if (Rect.PtInRect(a_point)) {
            break;
        }
        nIndex++;
    }
    if (nIndex == a_nCount) {
        nIndex = -1;
    }
    return(nIndex);
}
int CPathwayListBox::GetIndexAtYVal(const int a_yVal, const int nStartIndex)
{
    int nTotal = GetCount();

int nIndex = nStartIndex;
    CRect cTopItemRect;
    this->GetItemRect(GetTopIndex(),&cTopItemRect);

CRect Rect;
    while(nIndex < nTotal) {
        GetItemRect(nIndex, &Rect);
        Rect.top += cTopItemRect.top;
        Rect.bottom += cTopItemRect.top;
        if ( a_yVal >= Rect.top && a_yVal <= Rect.bottom) {
            break;
        }
        nIndex++;
```

116

```
    }
    if (nIndex == nTotal) {
      nIndex = -1;
    }
    return(nIndex);
} int CPathwayListBox::GetBottomIndex()
{
  int nBottomIndex = -1;
  CRect cListRect;
  this->GetClientRect(&cListRect);

CRect cTopItemRect;
  this->GetItemRect(this->GetTopIndex(),&cTopItemRect);

nBottomIndex = GetIndexAtYVal(cListRect.bottom + cTopItemRect.top,this->GetTopIndex());
  return nBottomIndex;
} void CPathwayListBox::OnLButtonDown(UINT nFlags, CPoint point)
{
  CPathwayView* pPathwayView = (CPathwayView*) GetParent();
  if (pPathwayView->Editing()) {
    pPathwayView->StopEditing();
  }
  if ((nFlags & (MK_SHIFT | MK_CONTROL)) ||
      (CPathwayListBox::m_IgnoreDownAndUp)) {
    CListBox::OnLButtonDown(nFlags, point);
    return;
  }
  int nIndex = GetIndexAtPoint(point);
  if (nIndex == -1) {
    // Clicked below last item
    CListBox::OnLButtonDown(nFlags, point);
    return;
  }
  if ((GetSelCount() != 1) || (!GetSel(nIndex))) {
    SetSel(-1, FALSE);
    SetSel(nIndex, TRUE);
    SetCaretIndex(nIndex);
    UpdateWindow();
  }

CRect Rect;
  GetItemRect(nIndex, &Rect);
  CPathwayShape* pPathwayShape = GetPathwayShape(nIndex);
  pPathwayShape->SetRect(Rect.left, Rect.top, Rect.right, Rect.bottom);

CPathwayStringShape* pStringShape = pPathwayShape->GetPathwayStringShape();
  pStringShape->SetVisible(FALSE);

pPathwayShape->OnLButtonDown(nFlags, point, NULL);
```

117

```
    m_pCaptureShape = pPathwayView->GetCaptureShape();

pStringShape->SetVisible(TRUE);
  if (m_pCaptureShape) {
    m_CaptureRect = pPathwayView->GetCaptureRect();
  } else {
    CListBox::OnLButtonDown(nFlags, point);
  }
  return;
} void CPathwayListBox::OnMouseMove(UINT nFlags, CPoint point)
{
  if (nFlags & MK_SHIFT) {
    int x = 1;
  }
  HCURSOR hCursor = NULL;
  BOOL bCallListBox = TRUE;
  if (m_pCaptureShape) {
    hCursor = m_pCaptureShape->OnMouseMove(nFlags, point, &m_CaptureRect);
    bCallListBox = FALSE;
  } else {
   if ( GetCapture() != this ) {
    int nIndex = GetIndexAtPoint(point);
    if (nIndex != -1) {
      CPathwayShape* pPathwayShape = GetPathwayShape(nIndex);
      CRect Rect;
      GetItemRect(nIndex, &Rect);
      CPoint newPoint;
      newPoint.x = point.x - Rect.left;
      newPoint.y = point.y - Rect.top;
      CPathwayMeetingShape* pMeeting = pPathwayShape->GetPtrMeetingShape();
      if (pMeeting->PtInRect(newPoint)) {
        hCursor = pMeeting->OnMouseMove(nFlags, newPoint, NULL);
        bCallListBox = FALSE;
      }
    }
   }
  }
  if (bCallListBox) {
    CListBox::OnMouseMove(nFlags, point);
  } else {
    if (hCursor) {
      ::SetCursor(hCursor);
    }
  }
if 0
  if (CPathwayListBox::m_bCaptured){
    if (CPathwayListBox::m_hCursor != NULL) {
      CPathwayShape* pPathway = GetPathwayShape();
      ClientToScreen(&point);
      //point += m_OffsetSize;
      if (pPathway->Droppable(point, CPathwayListBox::m_SelCount)) {
        ::SetCursor(CPathwayListBox::m_hCursor);
```

118

```
      } else {
        ::SetCursor(hNoDropCursorGlobal);
      }
    } else {
      if (!CPathwayListBox::m_MoveRect.PtInRect(point)) {
        CPathwayListBox::m_SelCount = GetSelCount();
        CPathwayListBox::m_bCopying = (nFlags & MK_CONTROL);
        if (CPathwayListBox::m_SelCount > 1) {
          CPathwayListBox::m_hCursor = AfxGetApp()->LoadCursor
            (CPathwayListBox::m_bCopying ? IDC_COPY_MULTI : IDC_MOVE_MULTI);
        } else {
          CPathwayListBox::m_hCursor = AfxGetApp()->LoadCursor
            (CPathwayListBox::m_bCopying ? IDC_COPY : IDC_MOVE);
        }
        ::SetCursor(CPathwayListBox::m_hCursor);
        CRect Rect;
        GetWindowRect(&Rect);
        GetParent()->ScreenToClient(&Rect);
        CPathwayListBox::m_OffsetSize = CSize(Rect.left, Rect.top);
      } else {
        CListBox::OnMouseMove(nFlags, point);
      }
    }
  } else {
    CListBox::OnMouseMove(nFlags, point);
  }
endif
} void CPathwayListBox::OnLButtonUp(UINT nFlags, CPoint point)
{
  if (m_pCaptureShape) {
    m_pCaptureShape->OnLButtonUp(nFlags, point, &m_CaptureRect);
    m_pCaptureShape = NULL;
  } else {
    if (CPathwayListBox::m_IgnoreDownAndUp) {
      CListBox::OnLButtonUp(nFlags, point);
    } else {
      CListBox::OnLButtonUp(nFlags, point);
    }
  }
if 0
  if (CPathwayListBox::m_bCaptured) {
    CPathwayListBox::m_bCaptured = FALSE;
    ReleaseCapture();
    if (CPathwayListBox::m_hCursor) {
      if (!CPathwayListBox::m_MoveRect.PtInRect(point)) {
        CPathwayShape* pPathway = GetPathwayShape();
        ClientToScreen(&point);
        CPathwayShape* pDest = pPathway->GetPathwayAtPoint(point);
        if (pDest) {
          if (pPathway != pDest) {
            CPathwayListBox* pListBox = pDest->GetPtrListBox();
            int nSelCount = GetSelCount();
```

119

```
            int* pInts = new int[nSelCount];
            GetSelItems(nSelCount, pInts);
            CPathwayStringShape* pPathwayString;
            CPathwayStringShape* pPathwayStringNew;
            CRect Rect(0,0,0,0);
            if (pInts[nSelCount - 1] == GetCount() - 1)
               nSelCount--;   // Dont do the last index...
            int nFirst = pListBox->GetCount() - 1;
            pPathwayStringNew =
               (CPathwayStringShape*) pListBox->GetItemData(nFirst);
            for (int nIndex = 0; nIndex < nSelCount; nIndex++) {
               int nItem = pInts[nIndex];
               pPathwayString = (CPathwayStringShape*) GetItemData(nItem);
               pPathwayStringNew->SetString(pPathwayString->GetString());
               pPathwayStringNew = new CPathwayStringShape(Rect, pDest,
                   "", 128, PATHWAY_ITEM_FONT_INDEX);
//             pListBox->AddItem(pPathwayStringNew, FALSE);
            }
            if (!CPathwayListBox::m_bCopying) {
               for (nIndex = nSelCount - 1; nIndex >= 0; nIndex--) {
                  int nItem = pInts[nIndex];
                  pPathwayString = (CPathwayStringShape*) GetItemData(nItem);
                  pPathwayString->RemoveFromParent();
                  DeleteString(nItem);
                  delete pPathwayString;
               }
            }
            delete [] pInts;
            if (!CPathwayListBox::m_bCopying) {
               pPathway->SetLines(-2);
            }
            pListBox->SetSel(-1, FALSE);
            nIndex = pListBox->GetCount() - 2;
            if (nIndex < 0)
               nIndex = 0;
            pListBox->SetCaretIndex(nIndex);
            pDest->SetLines(-2);
         }
      } else {
         MessageBeep(MB_ICONASTERISK);
      }
   }
   ::DestroyCursor(CPathwayListBox::m_hCursor);
   CPathwayListBox::m_hCursor = NULL;
} else {
   if (!CPathwayListBox::m_ClickedOn) {
      CPathwayListBox::m_IgnoreDownAndUp = TRUE;
      SendMessage(WM_LBUTTONDOWN, CPathwayListBox::m_nFlags,
            MAKELPARAM(point.x, point.y));
      SendMessage(WM_LBUTTONUP, CPathwayListBox::m_nFlags,
            MAKELPARAM(point.x, point.y));
      CPathwayListBox::m_IgnoreDownAndUp = FALSE;
      CPathwayListBox::m_ClickedOn = FALSE;
   }
```

120

```
    }
  } else {
    CListBox::OnLButtonUp(nFlags, point);
  }
endif
} void CPathwayListBox::OnLButtonDblClk(UINT nFlags, CPoint point)
{
  int nIndex;
  if ((nIndex = GetIndexAtPoint(point)) >= 0) {
    CPathwayShape* pShape = GetPathwayShape(nIndex);
    CPathwayStringShape* pString = pShape->GetPathwayStringShape();

CRect Rect(*pString);
    Rect.left += pShape->left;
    Rect.right += pShape->left;
    Rect.top += pShape->top;
    Rect.bottom += pShape->top;
    if (Rect.PtInRect(point)) {
      pString->SetFocus(&point);
    }
  }
if 0
  ((CPathwayStringShape*) GetItemData(CPathwayListBox::m_Item))->SetFocus();
#endif
} void CPathwayListBox::OnKillFocus(CWnd* pNewWnd)
{
        CListBox::OnKillFocus(pNewWnd);
}

CPathwayView* CPathwayListBox::GetPathwayView() {
  return((CPathwayView*) GetParent());
} void CPathwayListBox::StartEditing(int a_nIndex)
{
  CPathwayShape* pShape = GetPathwayShape(a_nIndex);
  ASSERT(pShape->GetPathwayStringShape());
  pShape->GetPathwayStringShape()->SetFocus();
} void CPathwayListBox::OnKeyDown(UINT nChar, UINT nRepCnt, UINT nFlags)
{
  CShape* pFocus = GetPathwayView()->GetFocusShape();
  if ((pFocus == NULL) ||
      (pFocus->OnKeyDown(nChar, nRepCnt, nFlags))) {
    // Need to check for the special page down case... VK_NEXT
    int nPreCaret = this->GetCaretIndex();
    int nCount = this->GetCount();
    CListBox::OnKeyDown(nChar, nRepCnt, nFlags);
    int nPostCaret = this->GetCaretIndex();
```

121

```
    if ( nPreCaret == nPostCaret && nPreCaret != nCount -1 && nChar == VK_NEXT) {
      int nTopIndex = this->GetTopIndex();
      this->SetSel(nPostCaret,FALSE);
      this->SetTopIndex(nPostCaret);
      int nNewSel = nPostCaret+(nPostCaret-nTopIndex);
      if ( nNewSel > nCount -1 ) {
        nNewSel = nCount -1;
      }
      this->SetCaretIndex(nNewSel);
      this->SetSel(nNewSel,TRUE);
    }
  }
}

// PointOutsideWin, test to see if a y value is outide the window
// return zero if the point is within the boundries,
// a neg value results in the yvalue being above the window
// a positive value results in the yvalue being below the window
int CPathwayListBox::YValOutsideWin(int a_yValue)
{
  CRect cListRect;
  this->GetClientRect(&cListRect);

int nTopIndex = this->GetTopIndex();
  CRect cTopItemRect;
  this->GetItemRect(nTopIndex,&cTopItemRect);
  cListRect.top    += cTopItemRect.top;
  cListRect.bottom += cTopItemRect.top;

if ( a_yValue < cListRect.top ){
    return (a_yValue - cListRect.top );
  }
  if (a_yValue > cListRect.bottom) {
    return (a_yValue - cListRect.bottom );
  }
  return 0;

}
// DoAutoScroll will scroll up or down based on if a_point
// is above or below the current view window.
// if a_Advance is true, the list box will be moved, else
// it will only return
BOOL CPathwayListBox::DoAutoVerticalScroll(const int a_yValue)
{
  int rv = YValOutsideWin(a_yValue);
  int nTopIndex = GetTopIndex();

if ( rv > 0 ) {
    // Going Down
    this->SetTopIndex(nTopIndex+1);
    return TRUE;
  } if ( rv < 0 ) {
```

122

```
    // Going Up
    this->SetTopIndex(nTopIndex-1);
    return TRUE;
  }
  return FALSE;
} void CPathwayListBox::OnTimer(UINT nIDEvent)
{
  if (m_pCaptureShape) {
    CPoint cpoint;
    ::GetCursorPos(&cpoint);
    ScreenToClient(&cpoint);
    m_pCaptureShape->OnMouseMove(0,cpoint,m_pCaptureShape);
  }
        CListBox::OnTimer(nIDEvent);
} void CPathwayListBox::OnRButtonDown(UINT nFlags, CPoint point)
{
  // If the pathway item is selected, just call tell the shapevw that
  // we received a OnRButtonDown message, if it is not selected,
  // then select it and deselect all others, reguardless of any
  // shift of ctrl key that is pressed.

int nIndex = this->GetIndexAtPoint(point);
  if (nIndex == -1) {
    // Clicked below last item
    CListBox::OnRButtonDown(nFlags, point);
    return;
  }
  if (!this->GetSel(nIndex)) {
    this->SetSel(-1, FALSE);
    this->SetSel(nIndex, TRUE);
    this->SetCaretIndex(nIndex);
    this->UpdateWindow();
  }
        this->GetPathwayView()->OnRightButtonMenu();

//CListBox::OnRButtonDown(nFlags, point);
}
```

Pathccp.h

*Defines Cut, Copy and Paste operations for the Pathway*

```
#ifndef PATHCCP_H
#define PATHCCP_H

/******************************************************************
 *
 * $Log: /Pathmakr/PATHCCP.H $
 *
 * 2     2/16/95 12:04p Soup
 * Pathway and Form CCP
 *
 * 1     1/26/95 6:12p Johna
 * Initial Check In.
 *
 ******************************************************************/ include <afxtempl.h> class CClipData : public CObject {
  DECLARE_SERIAL(CClipData)
  public:
    enum ClipDataType {
      UNKNOWN,
      DESCRIPTION,
      X_VALUE,
      Y_VALUE,
      WIDTH_VALUE,
      HEIGHT_VALUE,
      BASE_STRING,
      CLIPNODE,
      CHILDLIST
    };

CClipData(ClipDataType a_type);
    ClipDataType GetType();
    virtual void Serialize(CArchive& ar);
    virtual int GetSize();
    virtual int IsList();
    virtual void Print(int a_level);

protected:
    CClipData(){}
  private:
    ClipDataType m_type;
};

class CClipDataList : public CClipData {
  DECLARE_SERIAL(CClipDataList)
```

124

```
    public:
        CClipDataList(CClipData::ClipDataType a_type): CClipData(a_type){ }
        ~CClipDataList();
        void Add(CObject *a_object);
        virtual void Serialize(CArchive& ar);
        void Print(int a_level);
        void AddToClip(CClipData::ClipDataType a_type, long a_long);
        void AddToClip(CClipData::ClipDataType a_type, CString a_str);
        void AddToClip(CClipData *a_clip_data);
        virtual int GetSize();
        virtual int IsList();
    protected:
        CClipDataList(){ }
        int FindDataType(CClipData::ClipDataType a_type);
        void Store(CClipData *a_clip_data);

private:
        CObArray m_list;
};

class CClipDataLong : public CClipData {
    DECLARE_SERIAL(CClipDataLong)
    public:
        CClipDataLong(CClipData::ClipDataType a_type,long a_long);
        virtual void Serialize(CArchive& ar);
        void Print(int a_level);
    private:
        CClipDataLong(){ }
        long m_long;
};

class CClipDataString : public CClipData {
    DECLARE_SERIAL(CClipDataString)
    public:
        CClipDataString(CClipData::ClipDataType a_type,CString a_str);
        virtual void Serialize(CArchive& ar);
        void Print(int a_level);
    private:
        CClipDataString(){ }
        CString m_str;
};

class CClipBoard {
    public:
        void LoadShape(CShape *a_shape, CClipDataList* a_parent_node=NULL);
        void CopyToClip(CShape *a_shape);
        void CopyFromClip();
        void Print();
        ~CClipBoard();
    private:
        void ClearArray();
        void PasteNative(COleDataObject& dataObject);

static UINT m_cfPath;
```

125

```
    CObArray m_clip_list;

};

// Function to seralize a list of object to and from the clipboard.
// althought the following function are not part of the cpp classes
void CopyToClip(WORD a_clipformat, CObArray *a_copy_list);
void CopyFromClip(WORD a_clipformat, CObArray *a_copy_list);

#endif
```

126

Pathccp.cpp

Implements Cut, Copy and Paste operations for the Pathway

```
/****************************************************************
 *
 * $Log: /Pathmakr/PATHCCP.CPP $
 *
 * 2     2/16/95 12:04p Soup
 * Pathway and Form CCP
 *
 * 1     1/26/95 6:12p Johna
 * Initial Check In.
 *
 ****************************************************************/ include "stdafx.h"

include "shape.h"
#include "pathccp.h"

#include <afxpriv.h>
#include <afxole.h>

IMPLEMENT_SERIAL( CClipData, CObject, 0)
IMPLEMENT_SERIAL( CClipDataLong, CClipData, 0)
IMPLEMENT_SERIAL( CClipDataString, CClipData, 0)
IMPLEMENT_SERIAL( CClipDataList, CClipData, 0)

define new DEBUG_NEW ifdef _DEBUG
undef THIS_FILE
static char BASED_CODE THIS_FILE[] = __FILE__;
endif UINT CClipBoard::m_cfPath =
        (UINT)::RegisterClipboardFormat(_T("Pathmaker Tool Format"));

CClipData::CClipData(CClipData::ClipDataType a_type)
{
  m_type = a_type;
} void CClipData::Serialize(CArchive& ar)
{
  CObject::Serialize(ar);

if ( ar.IsStoring()) {
    ar << (long) m_type;
  } else {
```

```
   long temp;
   ar >> temp;
   m_type = (ClipDataType) temp;
  }
}

CClipData::ClipDataType CClipData::GetType()
{
  return m_type;
} void CClipData::Print(int a_level)
{
   TRACE("%*s %d\n",a_level*2+8,"ClipData:Type = ",a_level,m_type);
}

//
// Method: GetSize
// If just a single element, its size is one.
//
int CClipData::GetSize()
{
  return 1;
} int CClipData::IsList()
{
  return FALSE;
}

CClipDataLong::CClipDataLong(CClipData::ClipDataType a_type,long a_long)
  : CClipData(a_type)
{
  m_long = a_long;
} void CClipDataLong::Serialize(CArchive& ar)
{
  CClipData::Serialize(ar);

if ( ar.IsStoring()) {
    ar << m_long;
  } else {
    ar >> m_long;
  }
} void CClipDataLong::Print(int a_level)
{
   TRACE("%*s %d value %d\n",a_level*2+8,"CClipDataLong:Type = ",a_level,GetType(),m_long);
}

CClipDataString::CClipDataString(CClipData::ClipDataType a_type,CString a_str)
```

128

```
  : CClipData(a_type)
{
  m_str = a_str;
} void CClipDataString::Serialize(CArchive& ar)
{
  CClipData::Serialize(ar);

if ( ar.IsStoring()) {
    ar << m_str;
  } else {
    ar >> m_str;
  }
} void CClipDataString::Print(int a_level)
{
  const char *str = (LPCTSTR) m_str;
  TRACE("%*s Level=%d Type=%d Value=%s\n",a_level*2+8,"CClipDataString",
    a_level,GetType(),str);
}

CClipDataList::~CClipDataList()
{
  int nElements = m_list.GetSize();
  for(int ii=0; ii<nElements; ii++) {
    delete m_list.GetAt(ii);
  }
} void CClipDataList::Add(CObject *a_object)
{
  m_list.Add(a_object); // Throws a mem exception
} void CClipDataList::Serialize(CArchive& ar)
{
  CClipData::Serialize(ar);
  m_list.Serialize(ar);
} void CClipDataList::Print(int a_level)
{
  TRACE("%*s %d\n",a_level*2+8,"ClipList",a_level);
  int nElements = m_list.GetSize();
  for(int ii=0; ii<nElements; ii++) {
    ((CClipData*) m_list.GetAt(ii))->Print(a_level + 1);
  }
}
//
// Method: GetSize
//
int CClipDataList::GetSize()
```

129

```
{
    return m_list.GetSize();
} int CClipDataList::IsList()
{
    return TRUE;
}

//
// Method FindDataType
// Use: Returns index of data in list, or return -1 to indicate data doesn't
// exist.
int CClipDataList::FindDataType(CClipData::ClipDataType a_type)
{
    int nElements = m_list.GetSize();
    for(int ii=0; ii<nElements; ii++) {
        if ( ((CClipData*) m_list.GetAt(ii))->GetType() == a_type ) {
            return ii;
        }
    }
    return -1;
} void CClipDataList::AddToClip(CClipData::ClipDataType a_type,long a_long)
{
    CClipDataLong *dlong = new CClipDataLong(a_type,a_long);
    this->Store(dlong);
} void CClipDataList::AddToClip(CClipData::ClipDataType a_type,CString a_str)
{
    CClipDataString *dstr = new CClipDataString(a_type,a_str);
    this->Store(dstr);
}
void CClipDataList::AddToClip(CClipData *a_clip_data)
{
    this->Store(a_clip_data);
} void CClipDataList::Store(CClipData *a_clip_data)
{
    // Check to see if the data already exists
    int index = FindDataType(a_clip_data->GetType());
    if ( index < 0 ) {
        // Not Found
        // Add it to the list of data, level 0
        m_list.Add(a_clip_data);
    } else {
        // Check to see if the found object is one data element
        // or a list of elements
        CClipData *curr_clip_data = (CClipData*) m_list[index];
        if ( curr_clip_data->IsList() == TRUE ) { // Already a list
            ((CClipDataList*)curr_clip_data)->Add(a_clip_data);
```

130

```
    } else {
      // Not a list, but there is already one data element of this
      // type in the list. SO...we need to create a list, add the old
      // element and the new element into the list, then add the list
      // into the list of elements.
      m_list.RemoveAt(index);  // Remove the old.
      CClipDataList *new_list = new CClipDataList(a_clip_data->GetType());
      new_list->Add(curr_clip_data);
      new_list->Add(a_clip_data);

}
  }
}

//
// CClipbooardClass
//

CClipBoard::~CClipBoard()
{
  int nElements = m_clip_list.GetSize();
  for(int ii=0; ii<nElements; ii++) {
    delete m_clip_list.GetAt(ii);
  }
}
void CClipBoard::Print()
{
  int nElements = m_clip_list.GetSize();
  for(int ii=0; ii<nElements; ii++) {
    ((CClipData *)m_clip_list[ii])->Print(0);
  }
} void CClipBoard::ClearArray()
{
  int nElements = m_clip_list.GetSize();
  for(int ii=0; ii<nElements; ii++) {
    delete m_clip_list.GetAt(ii);
  }
}
void CClipBoard::CopyToClip(CShape *a_shape)
{
  // Remove all the elements from the array
  ClearArray();

(void) LoadShape(a_shape); // loads all the selected shapes into the array;

CSharedFile file;
      CArchive ar(&file, CArchive::store);

m_clip_list.Serialize(ar);
  ar.Close();
```

131

```
        COleDataSource* pDataSource = NULL;
        TRY
        {
                pDataSource = new COleDataSource;
                // put on local format instead of or in addation to
                pDataSource->CacheGlobalData(m_cfPath, file.Detach());

pDataSource->SetClipboard();
        }
  CATCH(COleException,oleex) {
  }
        CATCH_ALL(e) {
                delete pDataSource;
                THROW_LAST();
        }
        END_CATCH_ALL }
void CClipBoard::CopyFromClip()
{
  COleDataObject dataObject;
        dataObject.AttachClipboard();

if (dataObject.IsDataAvailable(m_cfPath))
        {
                PasteNative(dataObject);
        }

}
void CClipBoard::PasteNative(COleDataObject& dataObject)
{
        // get file refering to clipboard data
        CFile* pFile = dataObject.GetFileData(m_cfPath);
        if (pFile == NULL)
                return;

// connect the file to the archive
        CArchive ar(pFile, CArchive::load);
        TRY
        {
                // read the selection
    m_clip_list.Serialize(ar);
        }
        CATCH_ALL(e)
        {
                ar.Close();
                delete pFile;
                THROW_LAST();
        }
        END_CATCH_ALL ar.Close();
        delete pFile;
```

132

```
}
void CClipBoard::LoadShape(CShape *a_shape, CClipDataList* a_parent_node)
{
  CClipDataList *node = NULL;
  if ( !a_shape->Selected() ) {
    node = new CClipDataList(CClipData::CLIPNODE);
    if ( a_parent_node != NULL ) {
      a_parent_node->AddToClip(node);
    } else {
      m_clip_list.Add(node);
    }
    //a_shape->FillClipNode(node);
  }

// Now check if you have any childern that need to be copied
  CShape *child;
  int num_of_kids = a_shape->GetChildrenCount();
  for(int ii=0; ii<num_of_kids; ii++) {
    child = a_shape->GetChild(ii);
    (void) LoadShape(child,node);
  }
}
void CopyToClip(CLIPFORMAT a_clipformat, CObArray *a_copy_list)
{

CSharedFile file;
        CArchive ar(&file, CArchive::store);

a_copy_list->Serialize(ar);
  ar.Close();

COleDataSource* pDataSource = NULL;
        TRY
        {
                pDataSource = new COleDataSource;
                // put on local format instead of or in addation to
                pDataSource->CacheGlobalData(a_clipformat, file.Detach());

pDataSource->SetClipboard();
        }
  CATCH(COleException,oleex) {
}
        CATCH_ALL(e) {
                delete pDataSource;
                THROW_LAST();
        }
        END_CATCH_ALL }
void CopyFromClip(CLIPFORMAT a_clipformat, CObArray *a_copy_list)
{
  COleDataObject dataObject;
  dataObject.AttachClipboard();
```

133

```
if (dataObject.IsDataAvailable(a_clipformat)) {
  CFile* pFile = dataObject.GetFileData(a_clipformat);
  if (pFile == NULL)
    return;

// connect the file to the archive
        CArchive ar(pFile, CArchive::load);
        TRY
        {
                    // read the selection
    a_copy_list->Serialize(ar);
        }
        CATCH_ALL(e)
        {
          ar.Close();
          delete pFile;
                THROW_LAST();
        }
        END_CATCH_ALL ar.Close();
        delete pFile;
 }

}
```

134

Agendoc.h

Defines Meeting Agenda Information

```
/****************************************************************
 *
 * $Log: /Pathmakr/Source/Pathmakr/agendoc.h $
 *
 * 4    9/16/95 11:48a Soup
 * B1 Update including revamped includes, et. al.
 *
 * 3    8/31/95 11:11a Soup
 * B1 Updates, Flow CCP
 *
 * 2    8/28/95 3:42p Soup
 * B1 Updates. Bug fixes etc.
 *
 * 1    8/07/95 3:32p Soup
 * Agenda Stuff.
 *
 ****************************************************************/
#ifndef _AGENDOC_H
define _AGENDOC_H const int AgendaSize = 5;

class CAgendaInfo : public CObject {
    DECLARE_SERIAL(CAgendaInfo)
  public:
    enum AgendaType { PathwayItem, ManualStep, PathReference };
    CAgendaInfo(AgendaType a_type=ManualStep,WORD aPathIndex=-1);
    CAgendaInfo(CAgendaInfo& a_AgendaInfo);
    inline AgendaType GetAgendaType();
    inline WORD GetPathIndex();
    inline void SetPathIndex(WORD anIndex);
    void Serialize(CArchive& ar);
    void SetPathwayDesc(CString asDesc);
    inline void SetRowHeight(const UINT a_RowHeight);
    inline int GetRowHeight();
    inline CBitmap* GetBitmap();

CString m_sAgenda[AgendaSize];

private:
    AgendaType m_type;
    WORD    m_nPathIndex;  // m_nPathIndex + MeetingStartIndex = PathwayIndex
                // hence the first PathReference = 1;
    CBitmap m_BitMap;
    int     m_RowHeight;

};
```

135

```
// Inlines
inline WORD CAgendaInfo::GetPathIndex()
{
  return m_nPathIndex;
} inline void CAgendaInfo::SetPathIndex(WORD anIndex)
{
   m_nPathIndex = anIndex;
} inline CAgendaInfo::AgendaType CAgendaInfo::GetAgendaType()
{
  return m_type;
} inline CBitmap* CAgendaInfo::GetBitmap()
{
  return &m_BitMap;
} inline void CAgendaInfo::SetRowHeight(const UINT a_RowHeight)
{
  m_RowHeight = a_RowHeight;
} inline int CAgendaInfo::GetRowHeight()
{
  return m_RowHeight;
} endif // _AGENDOC_H
```

Agendoc.cpp

Implements Meeting Agenda Information

```
/****************************************************************
 *
 * $Log: /Pathmakr/Source/Pathmakr/agendoc.cpp $
 *
 * 3     9/16/95 11:48a Soup
 * B1 Update including revamped includes, et. al.
 *
 * 2     8/31/95 11:11a Soup
 * B1 Updates, Flow CCP
 *
 * 1     8/07/95 3:32p Soup
 * Agenda Stuff.
 *
 *
 ****************************************************************/ include "stdafx.h"
include "agendoc.h"
#include "serhelp.h"
static const UINT CAgendaInfoSchema = 0;
IMPLEMENT_SERIAL(CAgendaInfo,CObject,CAgendaInfoSchema)

#ifdef _DEBUG
undef THIS_FILE
static char BASED_CODE THIS_FILE[] = __FILE__;
endif CAgendaInfo::CAgendaInfo(AgendaType a_type,WORD aPathIndex)
{
  m_type = a_type;
  m_nPathIndex = aPathIndex;
  m_RowHeight = 0;
}

CAgendaInfo::CAgendaInfo(CAgendaInfo& a_AgendaInfo)
{
  this->m_type = a_AgendaInfo.m_type;
  this->m_nPathIndex = a_AgendaInfo.m_nPathIndex;
  int nIndex;
  for(nIndex=0;nIndex<AgendaSize;nIndex++) {
    this->m_sAgenda[nIndex] = a_AgendaInfo.m_sAgenda[nIndex];
  }
  m_RowHeight = a_AgendaInfo.m_RowHeight;

} void CAgendaInfo::Serialize(CArchive& ar)
{
```

137

```
CObject::Serialize(ar);
int nIndex;
if ( ar.IsStoring()) {
  ar << (WORD) m_type;
  ar << m_nPathIndex;
  for(nIndex=0;nIndex<AgendaSize;nIndex++) {
    ar << m_sAgenda[nIndex];
  }
} else {
  WORD tmp_word;
  ar >> tmp_word;
  m_type = (AgendaType) tmp_word;
  ar >> m_nPathIndex;
  for(nIndex=0;nIndex<AgendaSize;nIndex++) {
    ar >> m_sAgenda[nIndex];
  }
 }
} void CAgendaInfo::SetPathwayDesc(CString asDesc)
{
  m_sAgenda[0] = asDesc;  // I know that this is were the desc goes...
}
```

Agengrid.h

Defines Agenda Input Grid

```
/******************************************************************
 *
 * $Log: /Pathmakr/Source/Pathmakr/agengrid.h $
 *
 * 3     11/09/95 2:20p Soup
 * Added Graphics Server stuff.
 *
 * 2     8/28/95 3:42p Soup
 * B1 Updates.  Bug fixes etc.
 *
 * 1     8/07/95 3:32p Soup
 * Agenda Stuff.
 *
 ******************************************************************/
#ifndef _AGENGRID_H
#define _AGENGRID_H
////////////////////////////////////////////////////////////////
// Agenda Grid
class CMeetingTool;
class CAgendaGrid : public CPathGrid {
  public:
        // ClassWizard generated virtual function overrides
        //{{AFX_VIRTUAL(CAgendaGrid)
        //}}AFX_VIRTUAL
  protected:
        //{{AFX_MSG(CAgendaGrid)
        afx_msg void OnGridmenuInsertafter();
        afx_msg void OnGridmenuInsertbefore();
        afx_msg void OnGridmenuDeleterow();
        //}}AFX_MSG
        DECLARE_MESSAGE_MAP()

public:
    CAgendaGrid(){}
    ~CAgendaGrid();
    void CreateGrid(CRect rect, CShapeView *pWnd, CShape* pShape, int GridFontID);
    void SetAgendaHeadings();
    void FillAgendaGrid(BOOL abAdjustRowHeights = TRUE);
    void SetGridText(CString aString);
    void EventTopLeftChanged();
    virtual void GridOnPaint(CRect& aPaintRect);
    virtual void GridOnRButtonDown();
    BOOL EditCurrCell();

void InsertManualStep(int anIndex);
    void HandleMessage(LPARAM alHint);
    CMeetingTool* GetMeetingTool();
```

139

```
    void FillAgendaRow(WORD anRow,CMeetingTool* pMeetingTool=NULL,BOOL
abAdjustRowHeights=FALSE);

private:
    CObArray m_BM_list;
};

class CAgendaGridShape : public CShape {
  DECLARE_SERIAL(CAgendaGridShape)
  public:
    CAgendaGridShape(CShape* apParent,CRect aRect, WORD anFontID);
    CAgendaGridShape(){ }
    void CreateGrid(CRect rect, CShapeView *pWnd, int GridFontID);
    void Serialize(CArchive& ar);
    virtual void HandleMessage(LPARAM alHint);
    virtual void OnSetFocus(CShape* pOldShape = NULL,
                void* pParam = NULL);

private:
    WORD m_nFontID;
    CAgendaGrid m_grid;
    long m_XOffSet;
    long m_YOffSet;
};

#endif // _AGENGRID_H
```

140

Agengrid.cpp

Implements Agenda Input Grid

```
/*****************************************************************
 *
 * $Log: /Pathmakr/Source/Pathmakr/agengrid.cpp $
 *
 * 6     11/09/95 2:20p Soup
 * Added Graphics Server stuff.
 *
 * 5     9/25/95 3:54p Soup
 * Final B1 update. Turned printing off, fixed meeting CCP, etc.
 *
 * 4     8/31/95 11:11a Soup
 * B1 Updates, Flow CCP
 *
 * 3     8/28/95 3:42p Soup
 * B1 Updates. Bug fixes etc.
 *
 * 2     8/16/95 9:58a Soup
 * Agenda grid/Brainstorm Fixes
 *
 * 1     8/07/95 3:32p Soup
 * Agenda Stuff.
 *
 *
 *****************************************************************/
// include "stdafx.h"
include "resource.h"
#include "agendoc.h"
#include "shape.h"
#include "vtsswnd.h"
#include "grid.h"
#include "griddoc.h"
#include "meetdoc.h"
#include "agengrid.h"
#include "meetvw.h"

IMPLEMENT_SERIAL(CAgendaGridShape,CShape,0)

#ifdef _DEBUG
undef THIS_FILE
static char BASED_CODE THIS_FILE[] = __FILE__;
endif
BEGIN_MESSAGE_MAP(CAgendaGrid, CPathGrid)
        //{{AFX_MSG_MAP(CAgendaGrid)
        ON_COMMAND(ID_GRIDMENU_INSERTAFTER, OnGridmenuInsertafter)
        ON_COMMAND(ID_GRIDMENU_INSERTBEFORE, OnGridmenuInsertbefore)
```

141

```
        ON_COMMAND(ID_GRIDMENU_DELETEROW, OnGridmenuDeleterow)
    //}}AFX_MSG_MAP
END_MESSAGE_MAP()

CAgendaGrid::~CAgendaGrid()
{
  while ( m_BM_list.GetSize() > 0 ) {
    delete m_BM_list[0];
    m_BM_list.RemoveAt(0);
  }
}

/////////////////////////////////////////////////////////////////
// CAgendaGrid
// Specialization of the CPathGrid class to handle Agenda Grid Issue.
// Agenda grid issues can be broken into to areas, (1) behavior and
// (2) the persistence of data. In (1), we make sure the grid rows cannot
// be resized, as well as other things. In (2) we update the right doc
// area to save the data that is entered in the grid.

void CAgendaGrid::CreateGrid(CRect rect, CShapeView *pView, CShape* pShape, int GridFontID)
{
  CPathGrid::CreateGrid(rect, pView, pShape, GridFontID); // Get the grid created...

// Adjust the grid for the look and feel of the AgendaGrid
  int rc = this->GetCurrRow();
  // No scrollbars
  this->SetShowHScrollBar(FALSE);
  this->SetShowVScrollBar(FALSE);
  // Get rid of the fill handle
  this->SetAllowFillRange(FALSE);
  // I'll set the headers, thank you...
  this->SetAllowEditHeaders(FALSE);

// No Row headers
  //this->SetShowRowHeading(FALSE);

// I'll handle the editing
  this->SetAllowInCellEditing(FALSE);

// Set the right Cell Font to match
  int err = this->SetDefaultFont(pView->GetFontList()->GetFaceName(GridFontID),
                 YPixToTwips(pView->GetFontList()->GetHeight(GridFontID)));

this->SetAgendaHeadings();

int nAgendaItems = 0;
  CMeetingTool* pMeetingTool = this->GetMeetingTool();

nAgendaItems = pMeetingTool->GetMeetingItemCount();

if ( nAgendaItems == 0 ) {
    // If there are no agenda items, insert a manual step.
```

142

```
    this->InsertManualStep(0);
    nAgendaItems = 1;
}

CGridInfo* pGridInfo = pMeetingTool->GetGridInfo();

if ( pGridInfo->GetColCount() == 0 ) { // First time in grid...
       this->FillAgendaGrid(FALSE);
       this->SetColWidthAuto(1,1,nAgendaItems,AgendaSize,TRUE);
       err = this->SetColWidth(5,5,5000,FALSE);
       pGridInfo->RecordGridConfig(this);
    } else {
       pGridInfo->RestoreGridConfig(this);
       this->FillAgendaGrid(TRUE);
    }

// make sure the size of the cshape is the size of the grid.
//CRect ClientRect(0,0,0,0),NewSize(0,0,0,0);
//this->GetClientRect(&ClientRect);
//pShape->right = pShape->left + ClientRect.Width();
//pShape->bottom = pShape->top + ClientRect.Height();

//Word wrap on everything
this->SetSelection(1,1,nAgendaItems,AgendaSize);
this->SetAlignment(1,TRUE,1,0);

//Center the first column
this->SetSelection(1,1,nAgendaItems,1);
this->SetAlignment(1,TRUE,2,0);

this->SetSelection(1,1,1,1);
this->SetMinGridSize(FALSE);
this->ShowWindow(SW_SHOW);
} void CAgendaGrid::SetAgendaHeadings()
{
    CString sHeading;
    sHeading.LoadString(IDS_AGENDA_TOPICS);
    this->SetColText(1,(LPCTSTR) sHeading);

sHeading.LoadString(IDS_AGENDA_TIME);
    this->SetColText(2,(LPCTSTR) sHeading);

sHeading.LoadString(IDS_AGENDA_PREP);
    this->SetColText(3,(LPCTSTR) sHeading);

sHeading.LoadString(IDS_AGENDA_NOTES);
    this->SetColText(4,(LPCTSTR) sHeading);

sHeading.LoadString(IDS_AGENDA_ACTION);
    this->SetColText(5,(LPCTSTR) sHeading);
    int err = this->SetColWidth(5,5,5000,FALSE);
}
```

143

```
void CAgendaGrid::FillAgendaGrid(BOOL abAdjustRowHeights)
{
  // The MeetingTool knows about the agenda
  CMeetingTool* pMeetingTool = this->GetMeetingTool();

int nAgendaItems = pMeetingTool->GetMeetingItemCount();
  this->SetMaxRow(nAgendaItems);
  this->SetMaxCol(AgendaSize);
  int nIndex;
  for(nIndex=0;nIndex<nAgendaItems;nIndex++) {
    // Get the info and fill the grid...
    this->FillAgendaRow(nIndex,pMeetingTool,abAdjustRowHeights);
  }
}

CMeetingTool* CAgendaGrid::GetMeetingTool()
{
  CMeetingTool* pMeetingTool = (CMeetingTool*) this->GetView()->GetPathwayItem();
  if ( ! pMeetingTool->IsKindOf(RUNTIME_CLASS(CMeetingTool)) ) {
    ASSERT(0);
    return NULL;
  }
  return pMeetingTool;
}
// //////////////////////////////////////////
// FillAgendaRow assume that there is an empty grid row
// ready to be filled...
void CAgendaGrid::FillAgendaRow(WORD anRow,CMeetingTool* pMeetingTool,BOOL abAdjustRowHeights)
{
  if ( pMeetingTool == NULL ) {
    pMeetingTool = this->GetMeetingTool();
    if ( pMeetingTool == NULL ) {
      return;
    }
  }
  CAgendaInfo* pAgenda;
  pMeetingTool->GetAgendaInfo(pAgenda,anRow);
  this->SetRowText(anRow+1,"");
  // Add the bitmap to the list...
  UINT nBitmapID = pMeetingTool->GetAgendaBitmapID(anRow);
  CBitmap* pBitMap = new CBitmap;
  pBitMap->LoadBitmap(nBitmapID);
  m_BM_list.InsertAt(anRow,pBitMap);

int nAgendaStrIdx;
  int nMaxRowHeight = 0;

for(nAgendaStrIdx=0;nAgendaStrIdx<AgendaSize;nAgendaStrIdx++) {
      int nLC = GetLineCount(anRow+1,nAgendaStrIdx+1,pAgenda->m_sAgenda[nAgendaStrIdx]);
      if ( nLC > nMaxRowHeight && abAdjustRowHeights ) {
        this->SetRowSizeByLines(anRow+1, nLC);
        nMaxRowHeight = nLC;
```

144

```
      }
      this->SetCellString(anRow+1,nAgendaStrIdx+1,pAgenda-
>m_sAgenda[nAgendaStrIdx],abAdjustRowHeights);
    }
    int nRowH = pMeetingTool->GetRowHeight(anRow);
    if ( nRowH != 0 ) {
      this->SetRowHeight(anRow+1,anRow+1,nRowH,FALSE);
    }

}
void CAgendaGrid::SetGridText(CString aString)
{
  if ( this->GetCurrCol() == 0 ) {
    return;
  }
  CMeetingTool* pMeetingTool = this->GetMeetingTool();
  CAgendaInfo* pAgenda;
  pMeetingTool->GetAgendaInfo(pAgenda,this->GetCurrRow()-1);
  pAgenda->m_sAgenda[this->GetCurrCol()-1] = aString;

}
void CAgendaGrid::EventTopLeftChanged()
{

CMeetingTool* pMeetingTool = this->GetMeetingTool();

CGridInfo* pGridInfo = pMeetingTool->GetGridInfo();
  // Handle this later...

// Record the row heights
  int nNumRows = this->GetRowCount();
  int nRowH,nRowIdx;
  for(nRowIdx=0;nRowIdx < nNumRows; ++nRowIdx) {
    (void) this->GetRowHeight(nRowIdx+1,&nRowH);
    pMeetingTool->SetRowHeight(nRowIdx,nRowH);
  } int nColChanged = pGridInfo->GetChangedCol(this);
  if ( nColChanged != -1 ) { // -1 means it did't detect a changed column
    //TRACE("nColChanged %d\n",nColChanged);
    int nMaxCol = this->GetColCount();
    int nLC;
    CString sCellStr;
    int nMaxEditRow;
    int nRowIdx;
    int nColIdx;
    for(nRowIdx=1;nRowIdx < nNumRows; ++nRowIdx) {
      nMaxEditRow = 1;
      CString str;
      for(nColIdx=1;nColIdx<nMaxCol;nColIdx++) {
        this->GetCellString(nRowIdx,nColIdx,str);
        nLC = this->GetLineCount(nRowIdx,nColIdx,str);
        if ( nLC > nMaxEditRow ) {
```

145

```
            nMaxEditRow = nLC;
         }
      }
      //TRACE("Row %d should be %d\n",nRowIdx,nMaxEditRow);
   }
}

CPathGrid::EventTopLeftChanged();
pGridInfo->RecordGridConfig(this);
// Resize the cshape to match the grid...
} void CAgendaGrid::GridOnPaint(CRect& aPaintRect)
{
   // Need to paint something.
   // Determine if the buttons need painting.
   CRect rect;
   this->GetRowHeadRectInPix(1,this->GetRowCount(),rect);
   CWnd* pFocusWin = this->GetFocus();

if ( rect.IntersectRect(rect,aPaintRect) != 0 ) {
      CDC* pDC = this->GetDC();
      CDC dcMem;
      dcMem.CreateCompatibleDC(pDC);
      CBitmap* pBitmapOld;

int nR1,nR2,nC1,nC2;
      (void) this->GetSelection(0,&nR1,&nC1,&nR2,&nC2);

DWORD dwRop=SRCCOPY;
      int xPos,yPos;
      int nTopIndex;
      (void) this->GetTopRow(&nTopIndex);
      for(int nIndex=nTopIndex-1;nIndex < this->GetRowCount();nIndex++) {
         pBitmapOld = dcMem.SelectObject((CBitmap*)m_BM_list[nIndex]);
         this->GetRowHeadRectInPix(nIndex+1,nIndex+1,rect);
         if (nR1 == nIndex+1 && nC1==1 && nC2==256 && this == pFocusWin ) {
            dwRop=NOTSRCCOPY;
         } else {
            dwRop=SRCCOPY;
         }
         if ( (xPos = (rect.Width()/2)-8 ) < 0 ) {
            xPos = rect.left + 2;
         } else {
            xPos+= rect.left;
         } if ( (yPos = (rect.Height()/2)-8 ) < 0 ) {
            yPos = rect.top + 2;
         } else {
            yPos+= rect.top;
         } pDC->BitBlt(xPos,yPos,
```

146

```
                        rect.Width() > 16 ? 16 : rect.Width()-3,
                        rect.Height() > 16 ? 16 : rect.Height()-3,
                        &dcMem, 0, 0, dwRop);
        }
        dcMem.SelectObject(pBitmapOld);
        dcMem.DeleteDC();
        this->ReleaseDC(pDC);
    }
}

////////////////////////////////////////////////////////////
// CAgendaGridShape
// CShape complient AgendaGrid.  Allows for Serialization, and insertion
// to CShape children // The CRect will always ignore the right and bottom values
CAgendaGridShape::CAgendaGridShape(CShape* apParent,CRect aRect,WORD anFontID)
: CShape(aRect,apParent)
{
    m_nFontID = anFontID;
} void CAgendaGridShape::CreateGrid(CRect rect, CShapeView *pView, int GridFontID)
{
    this->SetTabStop();
    CRect posRect;
    this->GetPosition(&posRect,NULL,FALSE);
    m_grid.CreateGrid(posRect, pView, this, GridFontID);

// Tell the Meeting View who I am; This way if there is a
    // grid message, it will know were to send it.
    CMeetingView* pMeetingView = (CMeetingView*) pView;
    if ( ! pMeetingView->IsKindOf(RUNTIME_CLASS(CMeetingView)) ) {
        ASSERT(0);
        return;
    }
    pMeetingView->SetAgendaGridShape(this);

//m_grid.GetClientRect(&posRect);
    //this->bottom = this->top + posRect.Height();
    //this->right = this->left + posRect.Width();
} void CAgendaGridShape::Serialize(CArchive& ar)
{
    CShape::Serialize(ar);
    if (ar.IsStoring()) {
        ar << m_nFontID;
    } else {
        ar >> m_nFontID;
        this->CreateGrid(CRect(this->left,this->top,0,0), this->GetShapeView(), m_nFontID);
    }
}
```

147

```
void CAgendaGridShape::HandleMessage(LPARAM alHint)
{
  m_grid.HandleMessage(alHint);
} void CAgendaGridShape::OnSetFocus(CShape* pOldShape, void* pParam)
{
  m_grid.SetFocus();
} void CAgendaGrid::GridOnRButtonDown()
{
  if ( this->GetCurrRow() == 0 ) {
    return;
  }
  CWnd* pFocusWin = this->GetFocus();
  if ( this != pFocusWin ) {
    this->SetFocus();
  } int err = this->SetSelection(this->GetCurrRow(),-1,this->GetCurrRow(),-1);
  CMenu GridMenu;
  err = GridMenu.LoadMenu(IDR_GRID_MENU);
  CMenu* pPopup = GridMenu.GetSubMenu(0);
  // Check to see if we can delete the manual step, use currentrow - 1
  // Also, if we only have one manual step, you cannot delete it.
  if ( this->GetMeetingTool()->GetAgendaTopicEdit(this->GetCurrRow()-1) == TRUE &&
       this->GetMeetingTool()->GetMeetingItemCount() > 1 ) {
    pPopup->EnableMenuItem(ID_GRIDMENU_DELETEROW,MF_BYCOMMAND |
MF_ENABLED);
  } else {
    pPopup->EnableMenuItem(ID_GRIDMENU_DELETEROW,MF_BYCOMMAND | MF_GRAYED );
  }
  ASSERT(pPopup != NULL);
  CPoint point;
  ::GetCursorPos(&point);
  err = pPopup->TrackPopupMenu(TPM_RIGHTBUTTON,point.x,point.y,this);

GridMenu.DestroyMenu();

} void CAgendaGrid::InsertManualStep(int anIndex)
{
  CMeetingTool* pMeetingTool = this->GetMeetingTool();
  CAgendaInfo agenda(CAgendaInfo::ManualStep);
  agenda.SetPathwayDesc("Manual Step");
  pMeetingTool->InsertAgendaInfo(agenda,anIndex);
  int err = this->SetSelection(anIndex+1,-1,anIndex+1,-1);
} void CAgendaGrid::OnGridmenuInsertafter()
{
```

148

```
    // Remember index to row data is row -1
    this->InsertManualStep(this->GetCurrRow());

} void CAgendaGrid::OnGridmenuInsertbefore()
{
    // Remember index to row data is row -1
    this->InsertManualStep(this->GetCurrRow()-1);

} void CAgendaGrid::HandleMessage(LPARAM alHint)
{
    CMeetingTool* pMeetingTool = this->GetMeetingTool();
    if (pMeetingTool->GetMeetingDocID() == HIWORD(alHint) ) {
        WORD nRow,nCount;
        int err;
        switch(LOWORD(alHint)) {
            case HINT_GRID_INSERT_ROWS:
                pMeetingTool->GetMessageInfo(nRow,nCount);
                err = this->InsertRange(nRow+1,-1,nRow+nCount,-1,kShiftRows);
                int nIndex;
                for(nIndex=0;nIndex<nCount;nIndex++){
                    this->FillAgendaRow(nRow+nIndex);
                }
                this->SetMaxRow(pMeetingTool->GetMeetingItemCount());
                this->SetMinGridSize();
                //Word wrap on everything
                int nR1,nR2,nC1,nC2;
                this->GetSelection(0,&nR1,&nC1,&nR2,&nC2);

this->SetSelection(nRow+1,1,nRow+nCount,AgendaSize);
                this->SetAlignment(1,TRUE,1,0);

//Center the first column
                this->SetSelection(nRow+1,1,nRow+nCount,1);
                this->SetAlignment(1,FALSE,2,0);

this->SetSelection(nR1,nC1,nR2,nC2);

break;
            case HINT_GRID_DELETE_ROW:
                pMeetingTool->GetMessageInfo(nRow,nCount);
                //TRACE("Deleting Row %d\n",nRow);
                err = this->DeleteRange(nRow+1,-1,nRow+1,-1,kShiftRows);
                delete m_BM_list[nRow];
                m_BM_list.RemoveAt(nRow);
                if (pMeetingTool->GetMeetingItemCount() == 0 ) {
                    this->InsertManualStep(0);
                }
                this->SetMaxRow(pMeetingTool->GetMeetingItemCount());
                this->SetMinGridSize();
            break;
```

```
    }
  }
}

BOOL CAgendaGrid::EditCurrCell()
{
  if ( this->GetCurrCol() == 0 || this->GetCurrRow() == 0) {
    return FALSE; // No editing in row zero or col zero
  }

// Only let edit in col 1 if it is a manual step
  if ( this->GetCurrCol() == 1 &&
       this->GetMeetingTool()->GetAgendaTopicEdit(this->GetCurrRow()-1) == FALSE ) {
    return FALSE;
  }
  return TRUE;
} void CAgendaGrid::OnGridmenuDeleterow()
{
        // TODO: Add your command handler code here
  CMeetingTool* pMeetingTool = this->GetMeetingTool();
        pMeetingTool->DeleteAgendaItem(this->GetCurrRow()-1);
}
```

Meetdoc.h

Defines Meeting Information

```
#ifndef _MEETDOC_H
#define _MEETDOC_H

/*******************************************************************
 *
 * $Log: /Pathmakr/Source/Pathmakr/meetdoc.h $
 *
 * 10   10/04/95 2:10p Soup
 * Added meeting stuff.
 *
 * 9    9/25/95 4:07p Soup
 * Final B1 update. Turned printing off, fixed meeting CCP, etc.
 *
 * 8    8/31/95 11:22a Soup
 * B1 Updates, Flow CCP
 *
 * 7    8/28/95 3:53p Soup
 * B1 Updates. Bug fixes etc.
 *
 * 6    8/07/95 1:25p Soup
 * Agenda/Printing/Etc.
 *
 * 5    2/16/95 2:46p Johna
 * Fixed problems caused by merge conflicts.
 *
 * 4    2/16/95 1:52p Johna
 * Added Brainstorm to the system.
 *
 * 3    2/16/95 12:03p Soup
 * Pathway and Form CCP
 *
 * 2    1/27/95 9:22a Johna
 * Set default description of tool in constructor not when added to the
 * pathway.
 *
 * 1    1/26/95 6:12p Johna
 * Initial Check In.
 *
 *******************************************************************/ include "filedoc.h"
class CGridInfo;

const LPARAM HINT_GRID_INSERT_ROWS =   24;   //A Row[s] was inserted to a GRID
const LPARAM HINT_GRID_DELETE_ROW  =   25;   //A Row was delete to a GRID define MEETING_FILE_NAME "MEETING.CTF"
class CMeetingTool : public CFileTool {
```

151

```
    DECLARE_SERIAL(CMeetingTool)
public:
    virtual void Serialize(CArchive& ar);

public:
    CMeetingTool(CPathMakerDoc* a_pDoc);
    CMeetingTool();
    ~CMeetingTool();
public:
    virtual UINT GetPathwayButtonID() {
      return(IDB_MEETING_BUTTON);
    }
    virtual CMultiDocTemplate* GetDocTemplate() {
      return(m_pMeetingTemplate);
    }
    static CMultiDocTemplate* CreateDocTemplate(CRuntimeClass* pDocClass,
      CRuntimeClass* pFrameClass);

protected:
    void UpdateMeetingAgenda();
private:
    static CMultiDocTemplate* m_pMeetingTemplate;
    enum MeetingToolStringIndex {
      ProjectNameIndex = 0,
      TeamMembersIndex = 5
    };

// The following are specific to the agenda grid
public:
    int GetMeetingItemCount();
    void GetAgendaInfo(CAgendaInfo* &a_pAgenda,int nIndex);
    CGridInfo* GetGridInfo() { return m_pGridInfo;}
    BOOL GetAgendaTopicEdit(int nIndex);
    void InsertAgendaInfo(CAgendaInfo& a_pAgenda,int anIndex);
    void InsertAgendaInfo(CObArray& aObjArr,int anStartingIndex);
    void InsertAgendaInfo(int anPathIndex);
    void DeletePathwayMeetingItem(int nPathwayIndex, BOOL bDeleteAndSendMessage=TRUE); //
Only for pathway items.
    void DeleteAgendaItem(int nAgendaIndex);
    int  GetRowHeight(int a_nIndex);
    void SetRowHeight(int a_nIndex, int a_nRowHeight);

WORD GetMeetingDocID() { return m_ID;}
    inline void GetMessageInfo(WORD& aStart, WORD& aCount);
    void MeetingSetInclude(int nMeetingEndIndex);
    void ResetPathwayOffSets(int anStartingIndex);
    UINT GetAgendaBitmapID(int nAgendaIndex);
    CMeetingTool& operator=(const CMeetingTool &a);
    void DuplicateAgendaArray(CObArray& a_Array);
    void AssignAgendaArray(CObArray* a_pArray);
    void PrintAgendaItems();
private:
    CGridInfo* m_pGridInfo;
    CObArray m_AgendaArr;
```

152

```
    WORD m_ID;
    static WORD m_NextID;
    WORD m_mess_start_row;
    WORD m_mess_new_row_count;
};

inline void CMeetingTool::GetMessageInfo(WORD& aStart, WORD& aCount)
{
 aStart=m_mess_start_row;
 aCount=m_mess_new_row_count;
} endif  // _MEETDOC_H
```

Meetdoc.cpp

*Implements Meeting Information*

```
/****************************************************************
*
* $Log: /Pathmakr/Source/Pathmakr/meetdoc.cpp $
*
* 10    10/04/95 2:10p Soup
* Added meeting stuff.
*
* 9     9/25/95 4:07p Soup
* Final B1 update. Turned printing off, fixed meeting CCP, etc.
*
* 8     9/19/95 9:33p Soup
* Final B1 update.
*
* 7     9/16/95 11:58a Soup
* B1 Update including revamped includes, et. al.
*
* 6     8/31/95 11:22a Soup
* B1 Updates, Flow CCP
*
* 5     8/28/95 3:53p Soup
* B1 Updates. Bug fixes etc.
*
* 4     8/07/95 1:25p Soup
* Agenda/Printing/Etc.
*
* 3     2/16/95 12:03p Soup
* Pathway and Form CCP
*
* 2     1/27/95 9:22a Johna
* Set default description of tool in constructor not when added to the
* pathway.
*
* 1     1/26/95 6:12p Johna
* Initial Check In.
*
****************************************************************/

// meetdoc.cpp : implementation file
// include "stdafx.h"
include "pathmakr.h"

#include "pathitem.h"
#include "shape.h"
#include "vtsswnd.h"
#include "agendoc.h"
#include "griddoc.h"
```

154

```
#include "meetdoc.h"
#include "meetvw.h"
#include "serhelp.h"

static const UINT CMeetingToolSchema = 0;
IMPLEMENT_SERIAL( CMeetingTool, CFileTool, CMeetingToolSchema)

#ifdef _DEBUG
undef THIS_FILE
static char BASED_CODE THIS_FILE[] = __FILE__;
endif define new DEBUG_NEW

WORD CMeetingTool::m_NextID = 0;

CMultiDocTemplate* CMeetingTool::m_pMeetingTemplate = NULL;

CMeetingTool::CMeetingTool(CPathMakerDoc* a_pDoc)
        : CFileTool(a_pDoc, MeetingLine)
{
    SetDefaultDescription(IDS_MEETING_DEF);
    SetFileName(MEETING_FILE_NAME, NULL);
    SetMeetingStatus(MeetingOnly, NULL);
    m_pGridInfo = new CGridInfo;
    m_ID = m_NextID++;
    CStringArray* pStringArr = GetStringArray();
    CString sStr;
    sStr = a_pDoc->GetProjName();
    pStringArr->InsertAt(ProjectNameIndex,sStr);
    sStr = a_pDoc->GetTeamMembers();
    pStringArr->InsertAt(TeamMembersIndex,sStr);
}

CMeetingTool::CMeetingTool()
        : CFileTool(NULL, MeetingLine)
{
    SetDefaultDescription(IDS_MEETING_DEF);
    SetFileName(MEETING_FILE_NAME, NULL);
    SetMeetingStatus(MeetingOnly, NULL);
    m_ID = m_NextID++;
}

CMeetingTool::~CMeetingTool()
{
  if ( m_pGridInfo != NULL ) {
    delete m_pGridInfo;
  }
  int AgendCount = m_AgendaArr.GetSize();
  int nIndex;
  for(nIndex = AgendCount-1;nIndex>-1;nIndex--) {
    delete m_AgendaArr[nIndex];
  }
}
```

```
CMultiDocTemplate* CMeetingTool::CreateDocTemplate(CRuntimeClass* pDocClass,
    CRuntimeClass* pFrameClass)
{
    ASSERT(m_pMeetingTemplate == NULL);
    m_pMeetingTemplate = new CMultiDocTemplate(IDR_MEETING,
                            pDocClass,
                            pFrameClass,
                            RUNTIME_CLASS(CMeetingView));
    return(m_pMeetingTemplate);
} void CMeetingTool::Serialize(CArchive& ar)
{
    CFileTool::Serialize(ar);
    m_AgendaArr.Serialize(ar);
    if ( ar.IsStoring()) {
      ar << m_pGridInfo;
    } else {
      ar >> m_pGridInfo;
    }

} int CMeetingTool::GetMeetingItemCount()
{
    int nCount = m_AgendaArr.GetSize();
    return nCount;
}

// NOTE Should just return the pointer...
void CMeetingTool::GetAgendaInfo(CAgendaInfo* &a_pAgenda,int nIndex)
{
    ASSERT(nIndex>=0&&nIndex<m_AgendaArr.GetSize());

CAgendaInfo* pTmpAgend = (CAgendaInfo*) m_AgendaArr[nIndex];
    if ( pTmpAgend->GetAgendaType() == CAgendaInfo::PathReference ) {
        // Need to go get the agenda from the pathway
        int nMyIdx = GetDocument()->FindPathwayItem(this);
        CPathwayItem* pPathItem = GetDocument()->GetPathwayItem(pTmpAgend-
>GetPathIndex()+nMyIdx);
        ASSERT(pPathItem!=NULL);
        a_pAgenda = pPathItem->GetAgendaInfo();
    } else {
      a_pAgenda = pTmpAgend;
    }
} int CMeetingTool::GetRowHeight(int a_nIndex)
{
    ASSERT(a_nIndex>=0&&a_nIndex<m_AgendaArr.GetSize());

CAgendaInfo* pTmpAgend = (CAgendaInfo*) m_AgendaArr[a_nIndex];
    if ( pTmpAgend->GetAgendaType() == CAgendaInfo::PathReference ) {
```

```
    CAgendaInfo* pAgenda;
    // Need to go get the agenda from the pathway
    int nMyIdx = GetDocument()->FindPathwayItem(this);
    CPathwayItem* pPathItem = GetDocument()->GetPathwayItem(pTmpAgend->GetPathIndex()+nMyIdx);
    ASSERT(pPathItem!=NULL);
    pAgenda = pPathItem->GetAgendaInfo();
    return pAgenda->GetRowHeight();
  } else {
    return pTmpAgend->GetRowHeight();
  }
} void CMeetingTool::SetRowHeight(int a_nIndex, int a_nRowHeight)
{
  ASSERT(a_nIndex>=0&&a_nIndex<m_AgendaArr.GetSize());

CAgendaInfo* pTmpAgend = (CAgendaInfo*) m_AgendaArr[a_nIndex];
  if ( pTmpAgend->GetAgendaType() == CAgendaInfo::PathReference ) {
    CAgendaInfo* pAgenda;
    // Need to go get the agenda from the pathway
    int nMyIdx = GetDocument()->FindPathwayItem(this);
    CPathwayItem* pPathItem = GetDocument()->GetPathwayItem(pTmpAgend->GetPathIndex()+nMyIdx);
    ASSERT(pPathItem!=NULL);
    pAgenda = pPathItem->GetAgendaInfo();
    pAgenda->SetRowHeight(a_nRowHeight);
  } else {
    pTmpAgend->SetRowHeight(a_nRowHeight);
  }
}

BOOL CMeetingTool::GetAgendaTopicEdit(int nIndex)
{
  ASSERT(nIndex>=0&&nIndex<m_AgendaArr.GetSize());
  CAgendaInfo* pAgend = (CAgendaInfo*) m_AgendaArr[nIndex];
  if ( pAgend->GetAgendaType() == CAgendaInfo::PathReference ) {
    return FALSE;
  } else {
    return TRUE;
  }
} void CMeetingTool::UpdateMeetingAgenda()
{
  int nMyIdx = GetDocument()->FindPathwayItem(this);
  int nMeetingEndIdx = GetDocument()->GetMeetingEnd(nMyIdx);
  if (nMyIdx == nMeetingEndIdx) {
    // If there are no items in the meeting add a single manual step;
    CAgendaInfo* pAgendInfo = new CAgendaInfo(CAgendaInfo::ManualStep);
    pAgendInfo->SetPathwayDesc("Manual Step");
    m_AgendaArr.Add(pAgendInfo);
  } else {
    int nIndex;
```

```
    for(nIndex=0;nIndex<nMeetingEndIdx-nMyIdx;nIndex++) {
      m_AgendaArr.Add(new CAgendaInfo(CAgendaInfo::PathReference,nIndex+1));
    }
  }

}

// This will add an AgendaInfo item to the list within the Agendalist.
// The item will place at the index given.
void CMeetingTool::InsertAgendaInfo(CAgendaInfo& a_Agenda,int anIndex)
{
  CAgendaInfo* pAgendaInfo = new CAgendaInfo(a_Agenda);
  CObArray ObjArr;
  ObjArr.Add(pAgendaInfo);
  this->InsertAgendaInfo(ObjArr,anIndex);
} void CMeetingTool::InsertAgendaInfo(int anPathIndex)
{
  int nMyIdx = GetDocument()->FindPathwayItem(this);
  int nOffSet=anPathIndex-nMyIdx;

CAgendaInfo AgendaInfo(CAgendaInfo::PathReference);
  AgendaInfo.SetPathIndex(nOffSet);
  int nListSize = m_AgendaArr.GetSize();
  int nIndex;
  CAgendaInfo* pResetAgendRef;
  for(nIndex=nListSize-1;nIndex>=0;nIndex--){
    pResetAgendRef = (CAgendaInfo*) m_AgendaArr[nIndex];
    if (pResetAgendRef->GetAgendaType() == CAgendaInfo::PathReference
       && pResetAgendRef->GetPathIndex() == nOffSet) {
      this->InsertAgendaInfo(AgendaInfo,nIndex);
    }

}
} void CMeetingTool::ResetPathwayOffSets(int anStartingIndex)
{
  int nOffset=-1;
  int nIndex;
  CAgendaInfo* pResetAgendRef;

for(nIndex=anStartingIndex;nIndex>=0;nIndex--) {
    pResetAgendRef = (CAgendaInfo*) m_AgendaArr[nIndex];
    if ( pResetAgendRef->GetAgendaType() == CAgendaInfo::PathReference ) {
      nOffset = pResetAgendRef->GetPathIndex() + 1;
      break;
    }
  }
  if ( nIndex==-1){
    nOffset = 1;
  }
```

158

```
  int nListSize = m_AgendaArr.GetSize();
  for(nIndex=anStartingIndex+1;nIndex<nListSize;nIndex++){
    pResetAgendRef = (CAgendaInfo*) m_AgendaArr[nIndex];
    if (pResetAgendRef->GetAgendaType() == CAgendaInfo::PathReference ) {
      TRACE("Resetting item %d to %d\n",nIndex,nOffset);
      pResetAgendRef->SetPathIndex(nOffset++);
    }
  }

}
// ///////////////////////////////////////
// InsertAgendaInfo. The CAgendaInfo object in the array must be in the heap
// and I will delete them...
void CMeetingTool::InsertAgendaInfo(CObArray& aObjArr,int anStartingIndex)
{
  m_mess_start_row = anStartingIndex;
  m_mess_new_row_count = aObjArr.GetSize();
  m_AgendaArr.InsertAt(anStartingIndex,&aObjArr);

if ( (((CAgendaInfo*)m_AgendaArr[anStartingIndex])->GetAgendaType() ==
CAgendaInfo::PathReference ) {
    this->ResetPathwayOffSets(anStartingIndex);
  }
  CPathMakerDoc* pDoc = this->GetDocument();
  pDoc->SetModifiedFlag();
  pDoc->UpdateAllViews(NULL, ((WORD) HINT_GRID_INSERT_ROWS) + (m_ID<<16), this);

}

// ///////////////////////////////////////////////////////////////
// MeetingSetInclude is called when pathwayitems are include, exclude into a meeting.
void CMeetingTool::MeetingSetInclude(int nMeetingEndIndex)
{
  // Find the max pathway ref index;
  int nMyIdx = GetDocument()->FindPathwayItem(this);

int nMaxIndex = 0;
  int nListSize = m_AgendaArr.GetSize();
  int nIndex;
  CAgendaInfo* pAgendaInfo;
  for(nIndex=nListSize-1;nIndex>=0;nIndex--){
    pAgendaInfo = (CAgendaInfo*)m_AgendaArr[nIndex];
    if ( pAgendaInfo->GetAgendaType() == CAgendaInfo::PathReference ) {
      nMaxIndex = pAgendaInfo->GetPathIndex();
      break;
    }
  }
  if ( nMaxIndex < nMeetingEndIndex - nMyIdx ) {
    // Growing
    CObArray ObArr;
    int nIndex;
    int nRows2Add = (nMeetingEndIndex-nMyIdx)-nMaxIndex;
    for(nIndex=0;nIndex<nRows2Add;nIndex++){
```

159

```
      CAgendaInfo* pAgendaInfo = new CAgendaInfo(CAgendaInfo::PathReference);
      pAgendaInfo->SetPathIndex(nIndex+nMaxIndex+1);
      ObArr.Add(pAgendaInfo);
    }
    this->InsertAgendaInfo(ObArr,nListSize);
  } else {
    // Srinking
    CPathMakerDoc* pDoc = this->GetDocument();

int nLastOffset = nMeetingEndIndex - nMyIdx;
    int nSize = m_AgendaArr.GetSize();
    int nIndex;
    CAgendaInfo* pResetAgendRef;
    for(nIndex=nSize-1;nIndex>=0;nIndex--) {
      pResetAgendRef = (CAgendaInfo*) m_AgendaArr[nIndex];
      if (pResetAgendRef->GetAgendaType() == CAgendaInfo::PathReference) {
        if (pResetAgendRef->GetPathIndex() > nLastOffset ) {
          m_mess_start_row = nIndex;
          m_AgendaArr.RemoveAt(nIndex);
          delete pResetAgendRef;
          pDoc->SetModifiedFlag();
          pDoc->UpdateAllViews(NULL, ((WORD) HINT_GRID_DELETE_ROW) + (m_ID<<16), this);
        } else {
          break;
        }
      }
    }
  }
}

// Set bDeleteAndSendMessage to false for CCP
void CMeetingTool::DeletePathwayMeetingItem(int nPathwayIndex,BOOL bDeleteAndSendMessage)
{
    int nMyIdx = GetDocument()->FindPathwayItem(this);
    int nSize = m_AgendaArr.GetSize();
    int nOffSet = nPathwayIndex - nMyIdx;
    int nIndex;
    CAgendaInfo* pResetAgendRef;
    CPathMakerDoc* pDoc = this->GetDocument();

for(nIndex=0;nIndex<nSize;nIndex++) {
      pResetAgendRef = (CAgendaInfo*) m_AgendaArr[nIndex];
      if (pResetAgendRef->GetPathIndex() == nOffSet ) {
        m_mess_start_row = nIndex;
        m_AgendaArr.RemoveAt(nIndex);
        this->ResetPathwayOffSets(nIndex-1);
        if ( bDeleteAndSendMessage ) {
          delete pResetAgendRef;
          pDoc->SetModifiedFlag();
          pDoc->UpdateAllViews(NULL, ((WORD) HINT_GRID_DELETE_ROW) + (m_ID<<16), this);
        }
        break;
      }
```

160

```
    }
} void CMeetingTool::PrintAgendaItems()
{
    int nSize = m_AgendaArr.GetSize();
    int nIndex;
    CAgendaInfo* pResetAgendRef;
    TRACE("Start PrintAgendaItems\n");
    for(nIndex=0;nIndex<nSize;nIndex++) {
       pResetAgendRef = (CAgendaInfo*) m_AgendaArr[nIndex];
       if (pResetAgendRef->GetAgendaType() == CAgendaInfo::PathReference) {
          TRACE("PathReference: Index %d PathItem %d\n",nIndex,pResetAgendRef->GetPathIndex());
       } else {
          TRACE("ManualStep: Index %d \n",nIndex);
       }
    }
    TRACE("End PrintAgendaItems\n");
} void CMeetingTool::DeleteAgendaItem(int nAgendaIndex)
{
   CAgendaInfo* pDeleteAgenda = (CAgendaInfo*) m_AgendaArr[nAgendaIndex];
   m_mess_start_row = nAgendaIndex;
   m_AgendaArr.RemoveAt(nAgendaIndex);
   delete pDeleteAgenda;
   this->ResetPathwayOffSets(nAgendaIndex-1);
   CPathMakerDoc* pDoc = this->GetDocument();
   pDoc->SetModifiedFlag();
   pDoc->UpdateAllViews(NULL, ((WORD) HINT_GRID_DELETE_ROW) + (m_ID<<16), this);
}

UINT CMeetingTool::GetAgendaBitmapID(int nAgendaIndex)
{
   CAgendaInfo* pAgenda = (CAgendaInfo*) m_AgendaArr[nAgendaIndex];
   if ( pAgenda->GetAgendaType() == CAgendaInfo::PathReference ) {
      int nMyIdx = GetDocument()->FindPathwayItem(this);
      CPathwayItem* pPathItem = GetDocument()->GetPathwayItem(pAgenda->GetPathIndex()+nMyIdx);
      ASSERT(pPathItem!=NULL);
      if ( pPathItem->GetToolType() == StageLine ) {
         return IDB_STAGE_LINE;
      } else {
         return pPathItem->GetPathwayButtonID();
      }
   } else {
   // Must be a manual Step
   return IDB_MANUAL_STEP;
   }
}

CMeetingTool& CMeetingTool::operator=(const CMeetingTool &a)
```

161

```
{
  m_ID = a.m_ID;
  m_mess_start_row = a.m_mess_start_row;
  m_mess_new_row_count = a.m_mess_new_row_count;
  *m_pGridInfo = *(a.m_pGridInfo);

// First delete any item referenced by the element.
  int AgendCount = m_AgendaArr.GetSize();
  int nIndex;
  for(nIndex = AgendCount-1;nIndex>-1;nIndex--) {
    delete m_AgendaArr[nIndex];
  }
  m_AgendaArr.RemoveAll();
  AgendCount = a.m_AgendaArr.GetSize();
  for(nIndex =0;nIndex<AgendCount;nIndex++) {
    m_AgendaArr.Add(a.m_AgendaArr.GetAt(nIndex));
  }
  return *this;
} void CMeetingTool::DuplicateAgendaArray(CObArray& a_Array)
{
  ASSERT(a_Array.GetSize() == 0);
  int nIndex;
  int AgendCount = m_AgendaArr.GetSize();
  for(nIndex =0;nIndex<AgendCount;nIndex++) {
    a_Array.Add(m_AgendaArr.GetAt(nIndex));
  }

} void CMeetingTool::AssignAgendaArray(CObArray* a_pArray)
{
  m_AgendaArr.RemoveAll();
  int AgendCount = a_pArray->GetSize();
  int nIndex;
  for(nIndex = 0;nIndex<AgendCount;nIndex++) {
    m_AgendaArr.Add(a_pArray->GetAt(nIndex));
  }

}
```

Meetvw.h

Defines Meeting Window

```
#ifndef _MEETVW_H_
#define _MEETVW_H_

/****************************************************************
 *
 * $Log: /Pathmakr/Source/Pathmakr/meetvw.h $
 *
 * 3     8/28/95 3:53p Soup
 * B1 Updates. Bug fixes etc.
 *
 * 2     8/07/95 1:25p Soup
 * Agenda/Printing/Etc.
 *
 * 1     1/26/95 6:12p Johna
 * Initial Check In.
 *
 ****************************************************************/

// Meetingvw.h : header file
// include "filevw.h"

/////////////////////////////////////////////////////////////////
// CMeetingView view class CMeetingView : public CFileView
{
protected:
        CMeetingView();         // protected constructor used by dynamic creation
        DECLARE_DYNCREATE(CMeetingView)
    virtual UINT GetSlideFile();

// Attributes
public:

// Operations
public:

// Overrides
        // ClassWizard generated virtual function overrides
        //{{AFX_VIRTUAL(CMeetingView)
        protected:
        virtual void OnDraw(CDC* pDC);      // overridden to draw this view
        virtual void OnInitialUpdate();     // first time after construct
        virtual void OnActivateView(BOOL bActivate, CView* pActivateView, CView* pDeactiveView);
```

163

```
        virtual void OnUpdate(CView* pSender, LPARAM lHint, CObject* pHint);
        //}}AFX_VIRTUAL // Implementation
protected:
        virtual ~CMeetingView();
#ifdef _DEBUG
        virtual void AssertValid() const;
        virtual void Dump(CDumpContext& dc) const;
endif // Generated message map functions
        //{{AFX_MSG(CMeetingView)
        //}}AFX_MSG
        DECLARE_MESSAGE_MAP()
  public:
    virtual void CMeetingView::LoadFile(CString a_sFileName,
                        WORD a_wPageNumber, BOOL a_bNewFile);

// Agenda Specific stuff
  private:
    CShape* m_pAgendaGrid;
  public:
    void SetAgendaGridShape(CShape* pShape) { m_pAgendaGrid = pShape;}
};

/////////////////////////////////////////////////////////////////
#endif  // _MEETVW_H_
```

Meetvw.cpp

Implements Meeting Window

```
/****************************************************************
 *
 * $Log: /Pathmakr/Source/Pathmakr/meetvw.cpp $
 *
 * 8    12/19/95 10:11a Soup
 * DA update w/ ifdef graphics stuff
 *
 * 7    10/04/95 2:11p Soup
 * Added meeting stuff.
 *
 * 6    9/19/95 9:33p Soup
 * Final B1 update.
 *
 * 5    9/16/95 11:59a Soup
 * B1 Update including revamped includes, et. al.
 *
 * 4    9/06/95 11:20a Johna
 * Finish fonts in flowchart and forms.
 * Save string when it being edited.
 *
 * 3    8/28/95 3:53p Soup
 * B1 Updates. Bug fixes etc.
 *
 * 2    8/07/95 1:25p Soup
 * Agenda/Printing/Etc.
 *
 * 1    1/26/95 6:12p Johna
 * Initial Check In.
 *
 ****************************************************************/

// Meetvw.cpp : implementation file
// include "stdafx.h"
include "pathmakr.h"
#include "shape.h"
#include "meetvw.h"
#include "meetdoc.h"
#include "toolbar.h"
#include "helpcard.h"

#ifdef _DEBUG
undef THIS_FILE
static char BASED_CODE THIS_FILE[] = __FILE__;
endif const UINT MeetingButtons[] =
```

165

```
{
  ID_FILE_SAVE,
  ID_FILE_PRINT,
    ID_SEPARATOR,
  ID_EDIT_CUT,
  ID_EDIT_COPY,
  ID_EDIT_PASTE,
    ID_SEPARATOR,
    ID_SEPARATOR,
  ID_VIEW_RETURNTOPROJECTPATHWAY,
    ID_SEPARATOR,
    ID_SEPARATOR,
  ID_HELP_SLIDESVIEWER,
  ID_CONTEXT_HELP,
};

class CPathMakerMeetingToolbar : public CPathMakerToolbar
{
  public:
    virtual PathMakerToolbar_p GetToolbar() const {
      return (&m_PathMakerToolbar);
    } private:
    static PathMakerToolbar_t m_PathMakerToolbar;
};

PathMakerToolbar_t CPathMakerMeetingToolbar::m_PathMakerToolbar =
{
  IDR_MEETING,
  sizeof(MeetingButtons)/sizeof(*MeetingButtons),
  MeetingButtons,
};

CPathMakerMeetingToolbar MeetingToolbar;

/////////////////////////////////////////////////////////////////
// CMeetingView IMPLEMENT_DYNCREATE(CMeetingView, CFileView)

CMeetingView::CMeetingView()
{
  m_pAgendaGrid = NULL;
}

CMeetingView::~CMeetingView()
{
}

BEGIN_MESSAGE_MAP(CMeetingView, CFileView)
    //{{AFX_MSG_MAP(CMeetingView)
    //}}AFX_MSG_MAP
END_MESSAGE_MAP()
```

166

```
//////////////////////////////////////////////////////////
// CMeetingView drawing void CMeetingView::OnInitialUpdate()
{
        CFileView::OnInitialUpdate();
  GetRootShape()->GetNextTabStop(NULL)->SetFocus();

} void CMeetingView::OnDraw(CDC* pDC)
{
  if (m_pRootShape) {
    CFileView::OnDraw(pDC);
  } else {
    ASSERT(0);
    CRect Rect;
    GetClientRect(&Rect);
    CBrush Brush(::GetSysColor(COLOR_WINDOW));
    pDC->FillRect(&Rect, &Brush);
  }
}

//////////////////////////////////////////////////////////
// CMeetingView diagnostics ifdef _DEBUG
void CMeetingView::AssertValid() const
{
  CFileView::AssertValid();
} void CMeetingView::Dump(CDumpContext& dc) const
{
        CFileView::Dump(dc);
}
endif //_DEBUG //////////////////////////////////////////////////////////
// CMeetingView message handlers void CMeetingView::OnActivateView(BOOL bActivate, CView* pActivateView,
                  CView* pDeactiveView)
{
  CFileView::OnActivateView(bActivate, pActivateView, pDeactiveView);
  MeetingToolbar.OnActivateView(bActivate, pActivateView, pDeactiveView);
  if (bActivate) {
    CFrameWnd* pMainFrame = this->GetTopLevelFrame()->GetTopLevelFrame();
    ASSERT(pMainFrame!=NULL);
    pMainFrame->PostMessage(WM_USER_SHOW_HELP_CARD,CHelpCard::Meeting);
  }
}
```

What is claimed is:

1. A project organization and optimization tool for execution on a computer, the computer comprising a processing unit, a memory for storing information in communicative connection with the processing unit, a display for displaying information to a user in communicative connection with the processing unit, and input means for input of information by the user, the input being in communicative connection with the processing unit, the project optimization tool comprising:

a. means for creating a project pathway to be displayed by the display, the project pathway comprising a sequence of pathway steps inserted by the user at user determined points in the project pathway, each pathway step comprising a link corresponding to one of a plurality of software tools for initiating execution of the corresponding one of the plurality of software tools, the project pathway creating means comprising means for selecting via the input means one of the plurality of software tools and for inserting the link corresponding to the selected software tool on the project pathway to create one of the pathway steps, each software tool being stored in the memory and being executable by the processing unit upon the user selecting any link corresponding to the software tool displayed on the project pathway;

b. means for storing data input and created during execution of the software tools in the memory, the data input and created during execution of the software tool of each pathway step being associated with the corresponding link of the pathway step such that the data can be reviewed and revised upon selection of the corresponding link; and c. means for creating a meeting, the meeting including at least one pathway step selected by the user, a graphical representation of the meeting being displayed on the display and indicating any pathway step selected to be included in the meeting, the meeting having a meeting agenda software tool associated therewith, the meeting agenda software tool being executed by selecting a meeting agenda link corresponding to the meeting, the meeting agenda link being displayed upon the display, the meeting agenda software tool including a list of agenda topics to be addressed in connection with the meeting, the meeting agenda tool comprising means for automatically including the pathway steps selected to be included in the meeting as agenda topics.

2. The tool of claim 1 wherein the meeting agenda tool comprises means for including agenda topics other than the pathway steps selected to be included in the meeting.

3. The tool of claim 1 further comprising means for including a textual description in the project pathway of each of the pathway steps.

4. The tool of claim 1 further comprising means for inserting textual descriptions in the project pathway for the description of a stage of a project, the stage including at least one pathway step.

5. The tool of claim 1 wherein the plurality of software tools comprise total quality management software tools.

6. The tool of claim 5 wherein the total quality management software tools comprise a brainstorm/affinity diagram tool, a cause and effect diagram tool, a force field diagram tool, a flowchart tool, a consensus builder tool, a data analyst/spreadsheet tool and a form creation tool.

7. The tool of claim 1 further comprising means for displaying the status of each pathway step.

8. The tool of claim 7 wherein means for displaying the status of each pathway step indicates a degree to which the pathway step has been completed.

9. The tool of claim 1 further comprising means for indicating the starting date and completion date of each of the pathway steps.

10. A method of for project organization and optimization using a computer, the computer comprising a processing unit, a memory for storing information in communicative connection with the processing unit, a display for displaying information to a user in communicative connection with the processing unit, and an input device to enable input of information by the user, the input device being in communicative connection with the processing unit, the method comprising:

a. creating a project pathway to be displayed by the display, the project pathway comprising a sequence of pathway steps inserted by the user at user determined points in the project pathway, each pathway step comprising a link corresponding to one of a plurality of software tools for initiating execution of the corresponding one of the plurality of software tools, the step of (i) creating the project pathway including the steps of selecting via the input device one of the plurality of software tools and (ii) inserting the link corresponding to the selected software tool on the project pathway to create one of the pathway steps, each software tool being stored in the memory and being executable by the processing unit upon the user selecting any link corresponding to the software tool displayed on the project pathway;

b. storing data input and created during execution of the software tools in the memory, the data input and created during execution of the software tool of each pathway step being associated with the corresponding link of the pathway step such that the data can be reviewed and revised upon selection of the corresponding link; and c. creating a meeting, the meeting including at least one pathway step selected by the user, a graphical representation of the meeting being displayed on the display and indicating any pathway step selected to be included in the meeting, a meeting agenda software tool being associated with the meeting, a meeting agenda link for initiating execution of the meeting agenda software tool being displayed upon the display, the meeting agenda software tool including a list of agenda topics to be addressed in the meeting, the meeting agenda tool comprising a mechanism to automatically include the pathway steps selected to be included in the meeting as agenda topics.

11. The method of claim 10 wherein the meeting agenda tool comprises a mechanism to include agenda topics other than the pathway steps selected to be included in the meeting.

12. The method of claim 10 further comprising the step of inserting a textual description in the project pathway at least one of the pathway steps.

13. The method of claim 10 further comprising the step of inserting textual descriptions in the project pathway for the description of a stage of a project, the stage including at least one pathway step.

14. The method of claim 10 wherein the software tools comprise total quality management software tools.

15. The method of claim 14 wherein the total quality management software tools comprise a brainstorm/affinity diagram tool, a cause and effect diagram tool, a force field diagram tool, a flowchart tool, a consensus builder tool, a data analyst/spreadsheet tool and a form creation tool.

16. The method of claim 10 further comprising the step of displaying on the project pathway the status of at least one of the pathway steps.

17. The method of claim 16 wherein the status of the pathway step indicates a degree to which the pathway step has been completed.

18. The method of claim 10 further comprising the step of indicating on the project pathway the starting date and completion date of at least one of the pathway steps.

* * * * *